(12) United States Patent
Showalter

(10) Patent No.: US 8,458,074 B2
(45) Date of Patent: Jun. 4, 2013

(54) DATA ANALYTICS MODELS FOR LOAN TREATMENT

(75) Inventor: Thomas Showalter, Trabuco Canyon, CA (US)

(73) Assignee: Corelogic Solutions, LLC., Santa Ana, CA (US)

( * ) Notice: Subject to any disclaimer, the term of this patent is extended or adjusted under 35 U.S.C. 154(b) by 268 days.

(21) Appl. No.: 12/771,922

(22) Filed: Apr. 30, 2010

(65) Prior Publication Data

US 2011/0270779 A1    Nov. 3, 2011

(51) Int. Cl.
 *G06Q 40/00*    (2012.01)
(52) U.S. Cl.
 USPC ............... 705/36 R; 705/35; 705/38; 705/37; 705/1.1
(58) Field of Classification Search
 USPC . 705/1.1, 36 R, 38, 35, 37, 30, 306; 717/106; 273/278
 See application file for complete search history.

(56) References Cited

U.S. PATENT DOCUMENTS

| | | |
|---|---|---|
| 7,587,348 B2 | 9/2009 | Liao et al. |
| 7,668,769 B2 | 2/2010 | Baker et al. |
| 7,966,256 B2 | 6/2011 | Liao et al. |
| 8,065,234 B2 | 11/2011 | Liao et al. |
| 8,121,920 B2 | 2/2012 | Liao et al. |
| 2005/0108025 A1 | 5/2005 | Cagan |
| 2007/0033126 A1* | 2/2007 | Cagan et al. ..................... 705/35 |
| 2007/0106582 A1* | 5/2007 | Baker et al. ..................... 705/35 |
| 2007/0185806 A1 | 8/2007 | Serio et al. |
| 2007/0198493 A1 | 8/2007 | Serio |
| 2007/0226129 A1 | 9/2007 | Liao et al. |
| 2007/0294303 A1 | 12/2007 | Harmon et al. |
| 2009/0099959 A1 | 4/2009 | Liao et al. |
| 2010/0042454 A1 | 2/2010 | Liao et al. |
| 2010/0145836 A1 | 6/2010 | Baker et al. |
| 2011/0173116 A1 | 7/2011 | Yan et al. |
| 2011/0184884 A1* | 7/2011 | Lyons et al. ................ 705/36 R |
| 2013/0018776 A1 | 1/2013 | Xie et al. |

OTHER PUBLICATIONS

Moody's Research Labs; "Comparing Loan-Level & Pool-Level Mortgage Portfolio Analysis" by: Shirish Chinchalkar & Roger M. Stein, Jul. 2010.*

* cited by examiner

*Primary Examiner* — John H Holly
(74) *Attorney, Agent, or Firm* — Lempia Summerfield Katz LLC

(57) ABSTRACT

Data analytics are provided in loan treatment. Various sources of data may be used to optimize or predict value for a loan. Using machine-learning and/or statistical analysis, loans or treatment best suited for a particular borrower may be determined. Due to the large amounts of data available, borrower behavior may be learned from previous behavior of others and mapped to a predictive model. Machine-learning indicates the most relevant factors in loan treatment, providing a matrix for predicting loan value or treatment success. A given borrower may be classified into one of many classes of borrower based on credit information, property information, desired loan information, real estate market information, and/or other data. Tens, hundreds, or even thousands of variables may be used to predict the optimum treatment.

11 Claims, 15 Drawing Sheets

ANALYSIS OF WILLCAP MATRIX DEVELOPMENT SAMPLE

ANALYSIS OF LOAN TREATMENT DATABASE
PERFORMANCE DATA OVER 2.5 MILLION DISTRESSED BORROWERS WHO
RECEIVED ONE OF THE FOLLOWING TREATMENTS

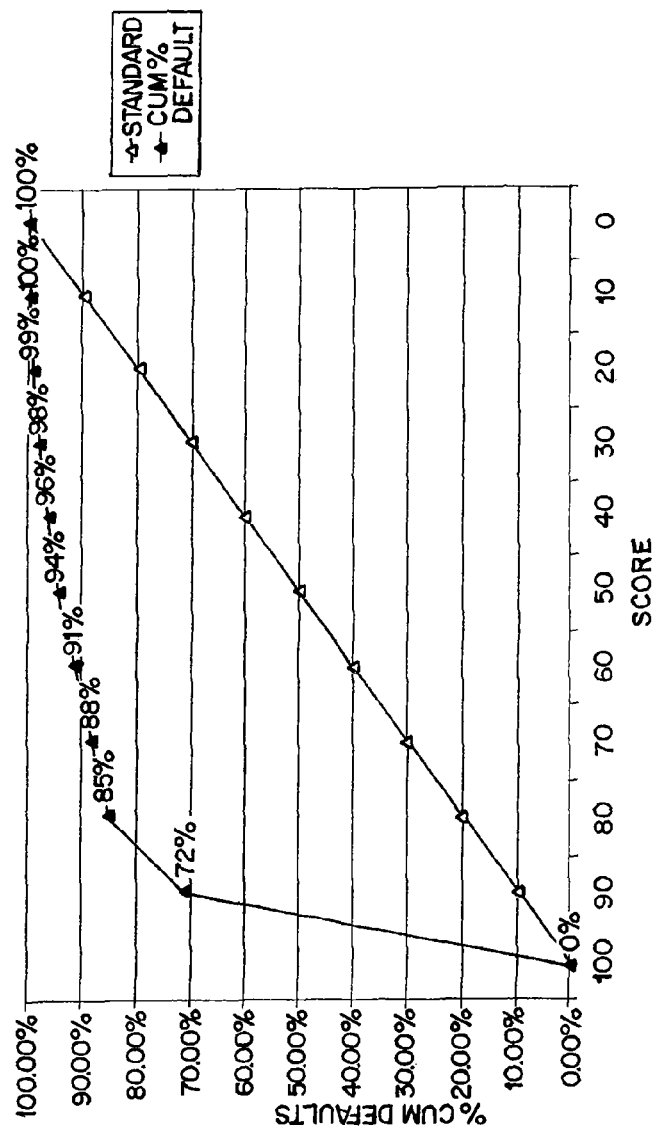
FIG.9 ANALYSIS OF DEFAULT PREDICTIONS BY CLUSTER #
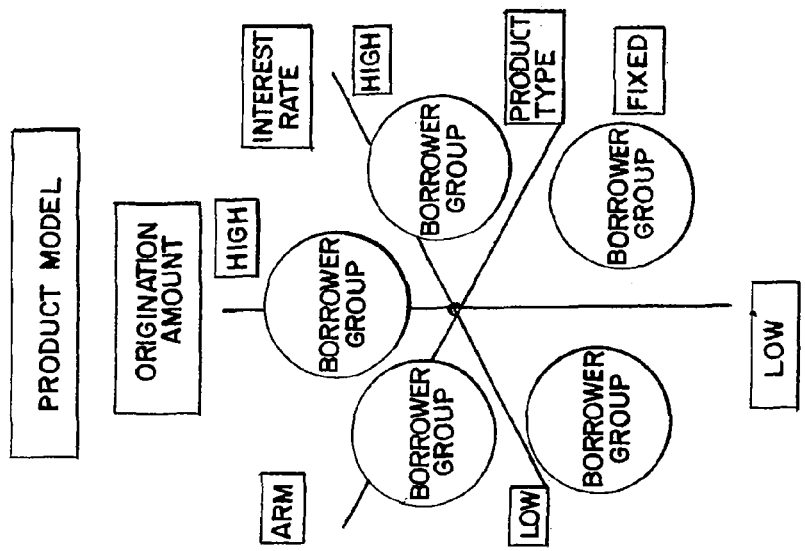
FIG.8

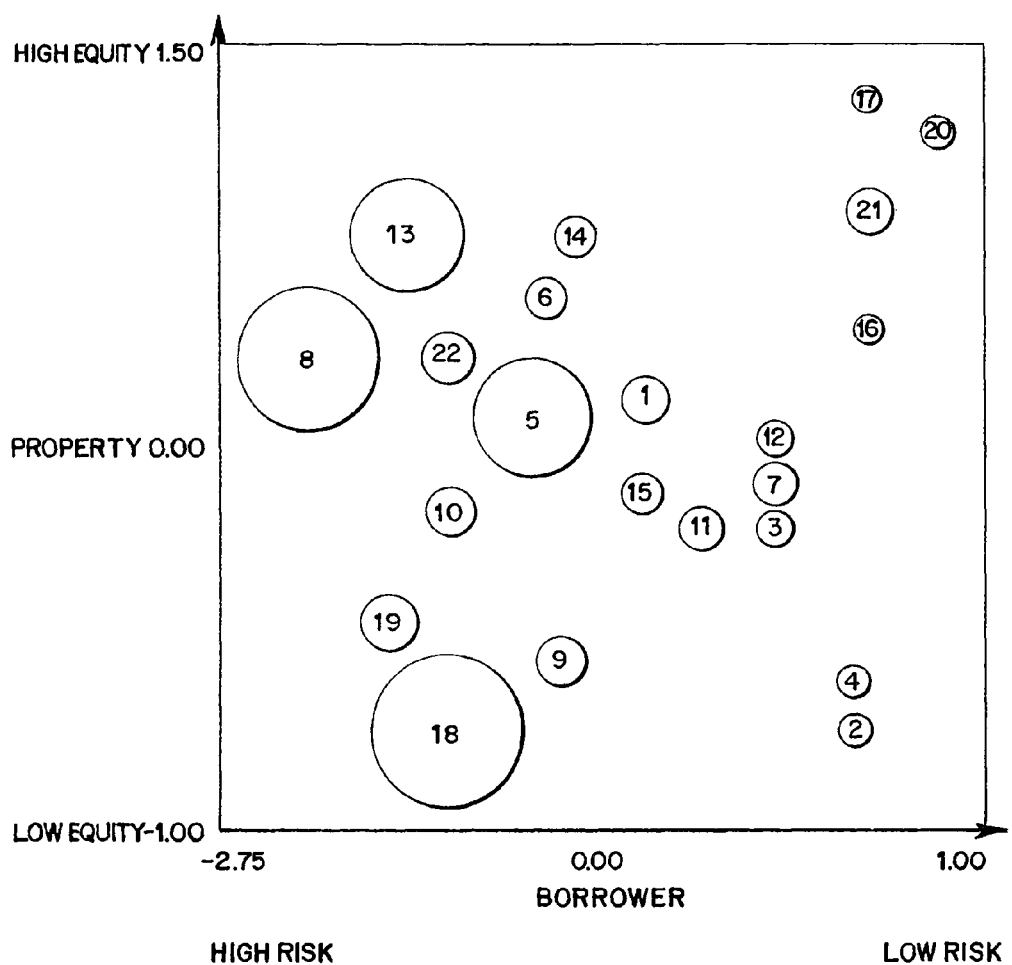

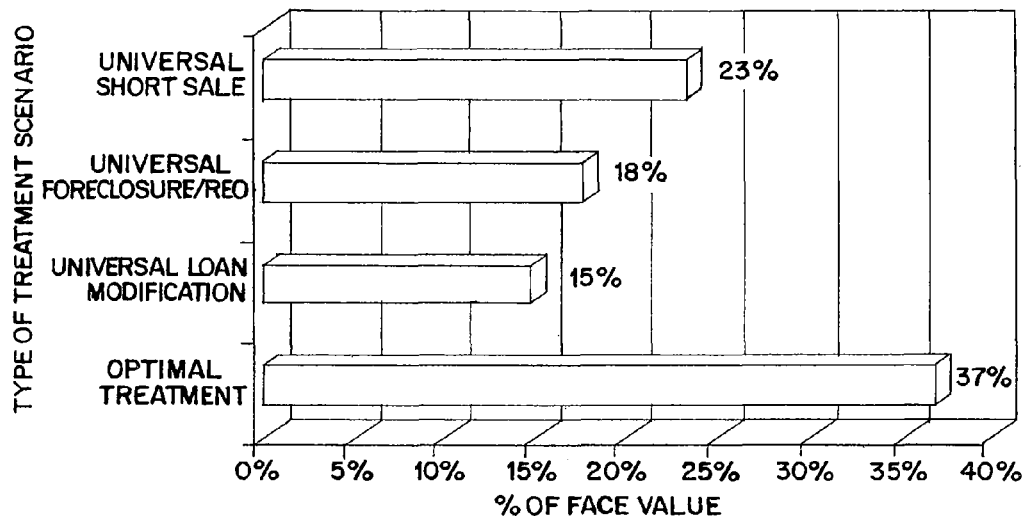
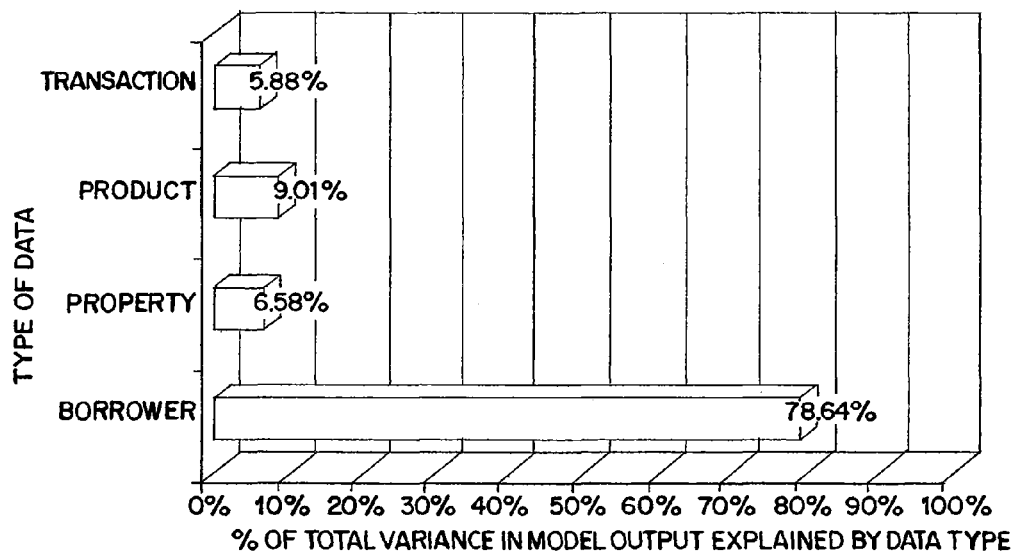

LOAN MODIFICATION BEHAVIORAL AND ECONOMIC ANALYSIS
"TYPICAL" BORROWER IN LOAN MODIFICATION TREATMENT

OVERVIEW OF TREATMENT RECOMMENDATIONS
BASED UPON 500,000+ DISTRESSED LOANS SUBMITTED FOR PROCESSING
TREATMENT RECOMMENDATIONS CHOSEN BASED UPON NET PRESENT VALUE CRITERIA

LOAN MODIFICATION BEHAVIORAL AND ECONOMIC ANALYSIS
WEAK BORROWER WITH A PROBLEM, CLTV-115%

EFFICIENT FRONTIER
LOAN MODIFICATION PAYMENT TERMS v BORROWER PROFILE

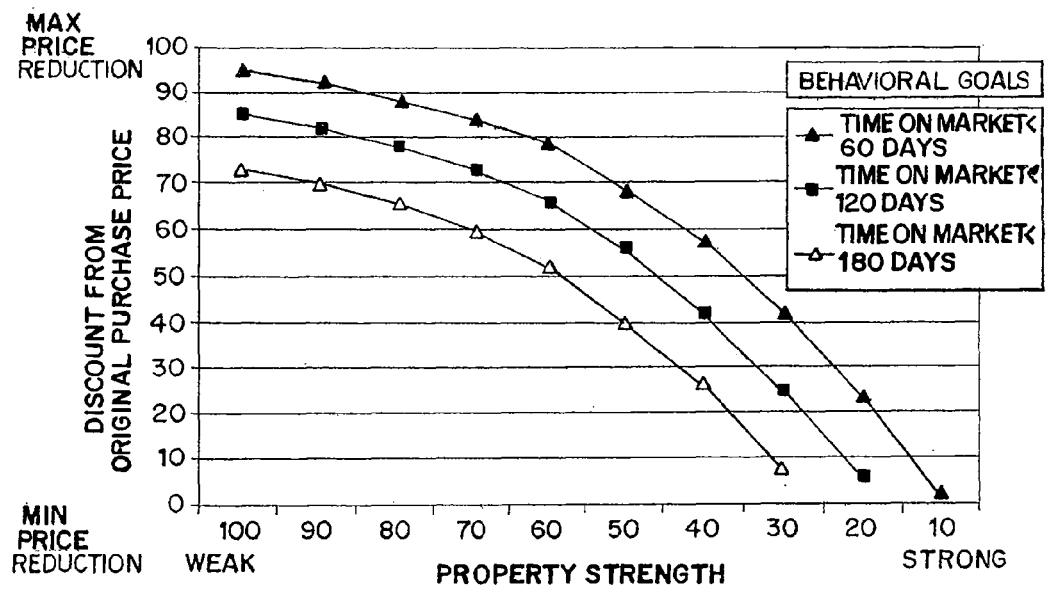
FIG.19 EFFICIENT FRONTIER
SALE PRICE DISCOUNT v BORROWER PROFILE
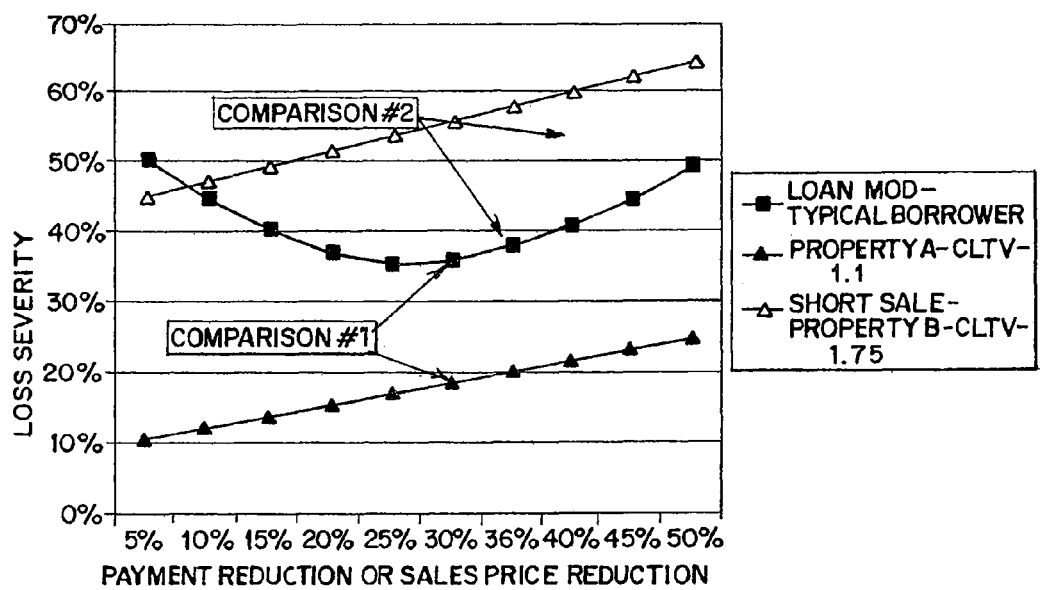
FIG.20
COMPARISON OF TREATMENT TYPES
AS A FUNCTION OF BEHAVIORAL GOALS AND TREATMENT TERMS LOAN MOD POOL REDEFAULT RATE AS A FUNCTION OF BORROWER RISK AND PAYMENT REDUCTION (CLTV PRE MOD-APPROX 115%)

LOAN MOD POOL LOSS SEVERITY AS A FUNCTION OF BORROWER RISK AND PAYMENT REDUCTION (CLTV PRE MOD-APPROX 115%)

DATA ANALYTICS MODELS FOR LOAN TREATMENT

BACKGROUND

The present embodiments relate to loan treatment. For example, whether to provide a mortgage or how to treat an existing mortgage is determined.

Credco has dominated the mortgage origination market by merging the outputs of three credit bureaus (Experian, Equifax and TransUnion). Credit information is used to determine credit scores. These scores are relied on to determine whether or the type of loan to provide. However, credit scores provide an over-simplified view of the borrower that may lead to distress for the borrower and/or default for the lender.

For loan modification, an over-simplified view of the borrower is also used. Presently, the industry views the distressed borrower as a homogenous entity, with simplistic drivers (e.g. "affordability) and an overly simple cause/effect paradigm: once a loan is more "affordable," a borrower can service the loan successfully, avoid foreclosure and remain in his/her home. Given this paradigm, the industry generally treats loan modification as the most appropriate loss mitigation treatment. Loan modification is believed the most likely approach to rescue struggling borrowers and alleviate the financial distress of the mortgage holder. However, the borrower population is not simple and homogenous, but diverse and heterogeneous. A "one size fits all" treatment program, such as loan modification, may be overly simplistic.

SUMMARY

In various embodiments, systems, methods, instructions, and computer readable media are provided for data analytics in loan treatment. Various sources of data may be used to optimize or predict value for a loan. Using machine-learning, loans or treatments best suited for a particular borrower may be determined. The data from many previous situations may be used to predict the outcome for each individual situation. Due to the large amounts of data available, borrower behavior may be learned from previous behavior of others and mapped to a predictive model. Machine-learning indicates the most relevant factors in loan treatment, providing a matrix for predicting loan value or treatment success. A given borrower may be classified into one of many classes of borrower based on credit information, property information, desired loan information, real estate market information, and/or other data. Tens, hundreds, or even thousands of variables may be used to predict the optimum treatment.

In a first aspect, a system is provided for data analytics in loan treatment. An input is configured to receive credit report information for a person associated with a loan, property information for a specific property associated with the loan, loan information for the loan, and real estate market information for a region including the property. A processor is configured to apply a model. The model is includes a machine-learned classifier with or without a portfolio of hazard function models that predict borrower behavior as a function of a machine-learning paradigm. The model is configured to output a loan treatment recommendation for a borrower of the loan. The processor is configured to apply the model as a function of the credit report information, the property information, the loan information, and the real estate market information. A display is configured to output the loan treatment recommendation.

In a second aspect, a non-transitory computer readable storage medium has stored therein data representing instructions executable by a programmed processor for data analytics in loan processing. The instructions include modeling borrower loan behavior from credit values for a borrower, modeling property behavior from property characteristics for a property associated with the borrower, classifying the borrower into one of a plurality of clusters based on the modeled borrower loan behavior and the modeled property behavior, and outputting information based on the one cluster to which the borrower is classified.

In a third aspect, a method is provided for data analytics in loan processing. A computer generates a user interface. A user input of the computer receives an indication of a property value, a loan term, a loan modification, or combinations thereof. The indication is received as part of the user interface. The computer calculates a net present value as a function of a machine-trained model where the received indication is input as a feature of the machine-trained model. The receiving and calculating are repeated for different indications for a same loan of a same property. A display displays the net present value for each of the different indications.

In a fourth aspect, a loan treatment engine receives inputs from a preceding model. The outputs of the preceding model are used in the calculation of the net present value of each potential treatment. The computer calculates a net present value as a function of a Bayesian model. The receiving and calculating are repeated for different indications for a same loan of a same property. The system outputs the net present value of the treatments considered, along with a recommendation regarding which treatment generates the highest net present value.

In a fifth aspect, a system is provided for data analytics in loan treatment. An input is configured to receive credit report information for a person associated with a loan, property information for a specific property associated with the loan, loan information for the loan, and real estate market information for a region including the property. A processor is configured to apply a cluster model and a treatment model. The cluster model includes an unsupervised machine-learned classifier configured to classifying a borrower of the loan and the specific property into one of a plurality of borrower-property clusters. Each of the borrower-property clusters are a function of both the credit report information and the property information. The treatment model includes a supervised machine-learned classifier configured to output a loan treatment recommendation for the borrower of the loan. The processor is configured to apply the treatment model as a function of the one of the borrower-property clusters, the property information, the loan information, and the real estate market information. The loan treatment recommendation is selected from a plurality of possible treatments as one of the possible treatments with a greater value over a period of time. The possible treatments including loan modification and short sale.

In a sixth aspect, a system is provided for data analytics in loan treatment. An input is configured to receive credit report information for a person associated with a loan, property information for a specific property associated with the loan, loan information for the loan, and real estate market information for a region including the property. The real estate market information includes a time on market for a region associated with the specific property. The property information includes a property value, equity, and open lean amount. A processor is configured to extract metrics including a willingness, a capacity and a stress from the credit information of a borrower of the loan and configured to apply a model. The model is a machine-learned classifier configured to output a loan treatment recommendation for the borrower of the loan. The processor is configured to apply the model as a function of the willingness, the capacity, the stress, the time on market, the property value, the equity, the open lean amount, a combined loan-to-value ratio, the loan information, and the real estate market information. A display is configured to output the loan treatment recommendation.

In a seventh aspect, a computer readable storage medium has stored therein data representing instructions executable by a programmed processor for data analytics in loan processing. The instructions include: applying a machine trained model to borrower and property data for a distressed loan; calculating net present value as a function of an output of the application of the machine trained model, the net present value calculated for each of a plurality of loan treatments; and outputting the net present value of at least one of the loan treatments.

In an eighth aspect, a method is provided for data analytics in loan processing. A computer receives a portfolio of loans. The computer extracts borrower and property information for the loans of the portfolio. The computer applies a machined-trained model estimating survivability, for each of the loans of the portfolio, of a plurality of loan treatments. The computer selects loan treatments for the loans as a function of the survivability. The computer calculates a cost for the portfolio as a function of the selected loan treatments. The cost and the selected loan treatments are output.

In a ninth aspect, a computer readable storage medium has stored therein data representing instructions executable by a programmed processor for data analytics in loan processing. The instructions include: determining at least twenty borrower metrics from credit report information for first and second borrowers, the borrower metrics including distress, capacity, and willingness metrics; determining at least eight property metrics about a property associated with first and second loans for the first and second borrowers, respectively, the property metrics including property value, equity, and combined loan-to-value ratio metrics; classifying the first borrower into a first cluster of a plurality of clusters based on the at least twenty borrower metrics and the at least eight property metrics for the first borrower, the metrics for the classifying including the distress, capacity, willingness, property value, equity, and combined loan-to-value ratio metrics for the first borrower; classifying the second borrower into a second cluster of a plurality of clusters based on the at least twenty borrower metrics and the at least eight property metrics for the second borrower, the metrics for the classifying including the distress, capacity, willingness, property value, equity, and combined loan-to-value ratio metrics for the second borrower; wherein the first cluster corresponds to a greater default rate than the second cluster with the equity of the first borrower being higher than the equity of the second borrower; and recommending foreclosure for the first borrower and a different loan treatment for the second borrower based on the classification into the first and second clusters, respectively.

Any one or more of the aspects described above may be used alone or in combination. These and other aspects, features and advantages will become apparent from the following detailed description of preferred embodiments, which is to be read in connection with the accompanying drawings. The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

FIG. 8 is a graphical representation of one embodiment of a product model;

FIG. 9 is an example graph of default prediction;

FIG. 10 illustrates example clustering of borrowers;

FIG. 11 is a graph showing discriminating power for first lien default according to one embodiment;

FIG. 19 is a chart showing sale price discount as a function of property strength in one example;

FIG. 20 is a chart illustrating comparison of different treatment types according to one embodiment;

FIG. 25 is a graph of net present value given type of treatment and face value.

DESCRIPTION OF PREFERRED EMBODIMENTS

Figure 1:
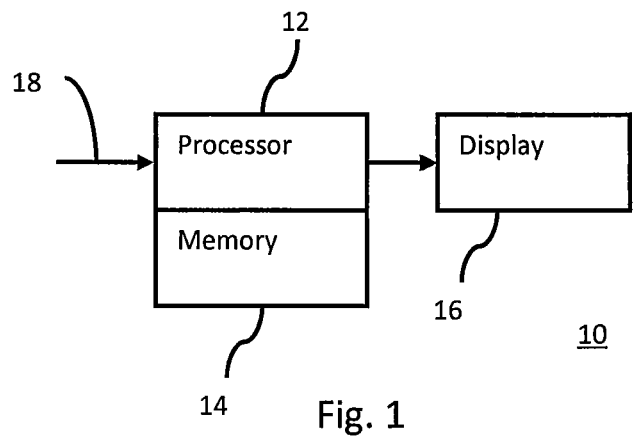
FIG. 1 is a block diagram of one embodiment of a system for data analytics for loan treatment.

New data, analytics and systems technologies may enhance loan treatment. The data analytics analyze key behaviors, such as a borrower's willingness and capacity to pay and relate the behaviors to a range of borrower future behaviors. A likelihood of mortgage default and/or future distress may be predicted. The data analytics model may be applied across a wide range of debt types, such as mortgage, auto, credit card, and finance company debt. The analytics model may be applied to various borrower behaviors.

The data analytics model uses various sources of data and advanced analytics that, when integrated, may improve the efficiency and the outcome of lending and distressed asset treatments. An architecture using the data analytics may efficiently predict successfully across a broad range of target markets and target events, while offering a richer, fuller impression of the borrower, his/her context, and the conditions of his/her assets, such as home and/or auto. The prediction may be used to enhance the value of any loan asset from the lenders perspective. This loan treatment enhancement is provided post origination for the treatment of a distressed asset. The loan treatment enhancement may be provided for non-distressed assets or for origination of a new loan.

The data analytics use machine learning, statistical modeling, or other mathematics based on training data to provide a decision system. The result of the mathematics is both a model for predicting asset behavior as well as an indication of a cause/effect infrastructure. Once the drivers of behavior are in resident in the system, the system may leverage understanding of the borrower, the asset, and the environment based on other examples to improve upon the value of a given specific asset. For example, this kind of decision may be used to recommend what interest rates, loan amounts, terms, conditions, or other loan characteristic enhances the value of the specific asset while also appealing to the borrower and gaining borrower's acceptance.

By beginning with raw data (e.g. Borrower Data) to create a classifier by type of borrower, a matrix is learned. The matrix transforms analysis of a situation from a loan or account centric view to a borrower centric view. The borrower is profiled in depth using the matrix. For example, in a distressed asset situation, the model may be used to transform 100,000 problem loans into 20-30 classes of problems. The loans are clustered based, at least in part, on borrower behavior as represented by tens, hundreds, or thousands of metrics about the borrower. Solutions may be optimized by the class to provide a class specific solution. By classifying into a plurality, such as tens, of classes, decision efficiency, consistency and validity may be provided. The classification may provide an accurate indication of a given borrower and his/her property based on learning from a large number (e.g., thousands or more) of other borrowers and properties. The classification may more likely provide an optimal treatment maximizing value in an asset. An increased return on the value of a distressed asset may be provided.

If the model is applied during loan origination, each applicant may be classified into a number (e.g., 20-30 classes) of applicant. Each class may be modeled to better indicate a prediction of asset behavior. The default rate, severity of loss given default, and/or other behaviors may be better predicted by class than based on a more general approach. Each class may be associated with a different probability of distress in other arenas, willingness to cooperate with a collector, type of home, auto, financial product that most likely purchased, or other characteristics.

Different models may be used based on the class. For example, survivability models are trained separately for each class. Once a given loan is classified, the survivability of the loan given different treatments may be modeled using machine learnt matrices.

Each borrower and property are different. By using one or more matrices learned from training data with a machine, the borrower and property situation may be input to determine a desired loan treatment. The machine trained matrix allows for each different situation to be handled efficiently with a processor. Each borrower is handled differently, but with the same model based on hundreds or more of variables. The model may be updated, such as controlling the time period over which the training data is collected. The retraining or updating allows for current conditions of the economy to more strongly influence the predications provided by the model.

FIG. 1 shows a block diagram of an example system 10 for data analytics in loan treatment. The system 10 is shown as a hardware device, but may be implemented in various forms of hardware, software, firmware, special purpose processors, or a combination thereof. Some embodiments are implemented in software as a program tangibly embodied on a program storage device. By implementing with a system or program, semi-automated or automated workflows are provided to assist a user in generating a prediction of asset value and/or loan treatment outcome. Data representing a borrower is transformed into a classification of the borrower, and further into a model of borrower behavior based on the classification. The system 10, using a machine, allows prediction for many borrowers and training of a model based on large data sets as compared to manual determination. For application, the system 10 transforms data representing characteristics of the borrower into an output useable by lenders in loan treatment after origination or loan treatment for origination (e.g., which type of loan, what loan terms, and/or whether to provide a loan).

In one embodiment, the model is a matrix configured to output information based on an input feature vector. The matrix uses a database of borrower information, property information, real estate information, and loan information to implement a model predicting outcome for each given borrower and corresponding possible loans or loan modifications.

The system 10 may use any of various architectures. In one embodiment, the system 10 is a computer, personal computer, server, network processor, network, or other now known or later developed processing system. The system 10 includes at least one processor (hereinafter processor) 12, at least one memory (hereinafter memory) 14, a display 16, and a user input 18. The processor 12 is implemented on a computer platform having hardware components. The computer platform may also include an operating system and microinstruction code. The various processes, methods, acts, and functions described herein may be either part of the microinstruction code or part of a program (or combination thereof) executed via the operating system. Additional, different, or fewer components may be provided. For example, there is no display nor is there a user input screen, per se. Instead, the user delivers a file for processing to an FTP site, whereupon a programmer captures that file and submits the file through a programming structure that accesses data, applies the models and generates a treatment recommendation.

The system 10 applies a machine-learned matrix associating inputs with outputs. In one embodiment, the system functions by extracting fields from a user input file. The values of the fields are acquired from various sources, such as outside vendors (i.e. consumer credit, property and real estate market data). The values of the fields are used to operate the model. These data are acquired through an Internet interface that connects the matrix to the sources. For example, each vendor responds to a vendor-specific inquiry by supplying the appropriate data (e.g. consumer credit). The acquired data is subjected to another data extraction program, which creates metrics (e.g., calculates values from the data). The metrics are used as inputs to the model. The raw data and the metrics are stored in a data base for input to the model. Once the model is applied, the model outputs are stored in a database before a copy of the output is forwarded to the user's FTP site or other destination.

Figure 2:
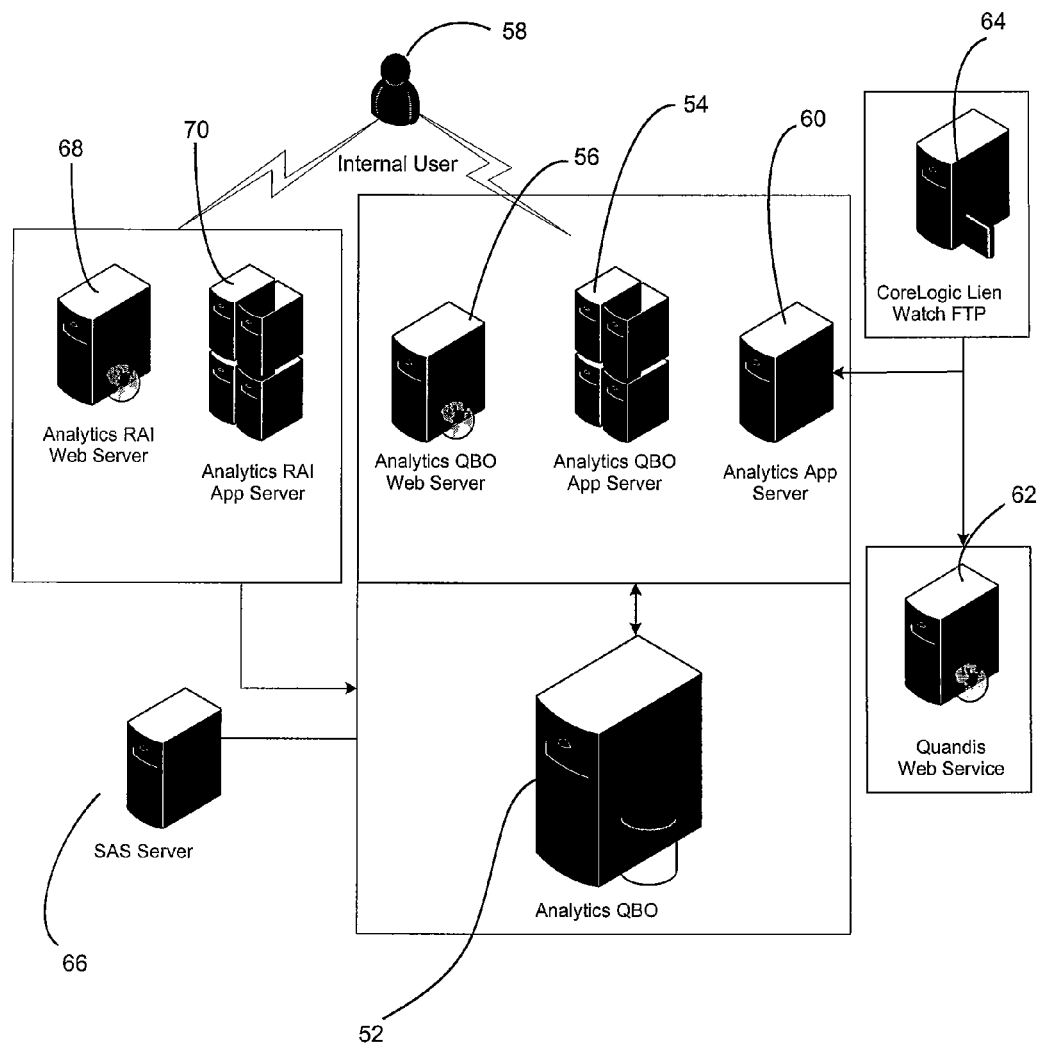
FIGS. 2 and 3 are architecture diagrams of alternative embodiments of systems for data analytics for loan treatment.

FIG. 2 shows another example architecture. A database and database server 52 store raw data for training and/or for application of data analytics. One or more servers 54 acquire data and apply the model. A web server 56 provides the user interface or networking for interfacing between the user 58 and the application servers 54. A data gathering server 60 accesses remote or local databases for populating at least part of the raw data. For example, data from a public records real estate server 62 and a lien records server 64 is gathered. As another example, credit information is gathered from a credit server 66 that accesses credit information directly from the credit bureau. The servers 68 performs survival function prediction, and the servers 70 perform treatment optimization. Other arrangements of servers, databases, and interactions may be provided, such as depending on information arrangements or available sources.

Figure 3:
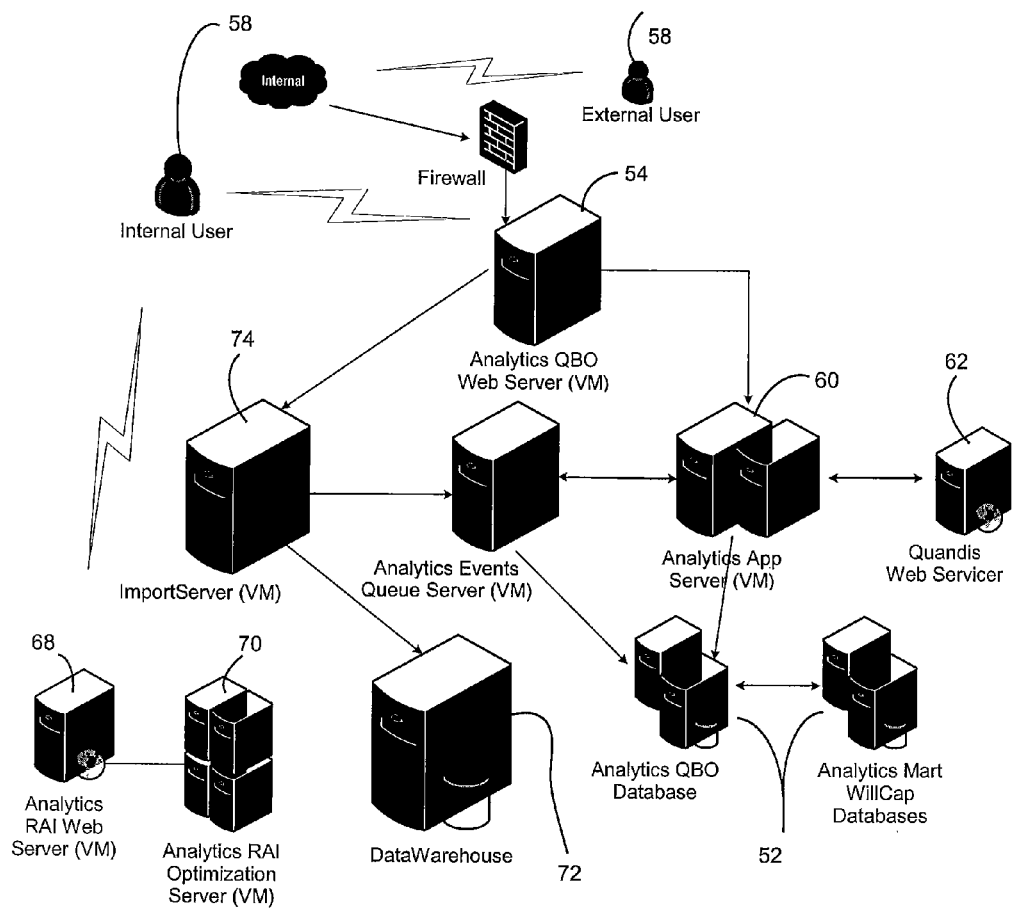

FIG. 3 shows yet another example architecture. Either local or remote access is provided. The database 52 is divided into different databases, such as one for raw data and another for matrix or processed data, such as feature input values calculated from raw data. An additional database 72 is provided for borrower data and a server 74 is provided for importing the borrower data. Other arrangements may be provided.

Below, these architectures are discussed in the context of the more simplistic FIG. 1. Referring again to FIG. 1, the input 18 may be a user input configured to provide data to the system 10. For example, the input 18 is a mouse, keyboard, track ball, touch screen, joystick, touch pad, buttons, knobs, sliders, combinations thereof, or other now known or later developed user input device. The user input may operate as part of a user interface. For example, one or more buttons are displayed on the display 16. The user input is used to control a pointer for selection and activation of the functions associated with the buttons. Alternatively, hard coded or fixed buttons may be used.

In one embodiment, the user input 18 is a selector for user indication of one or more values. For example, a user selector is configured to indicate selection of a value for a variable. The loan rate or other loan information, borrower information, property information, or real estate information may be provided by the user. Any of the user input information may be used to determine the loan treatment. For example, the user interacts with the system 10 to test different loan rates, different options, or otherwise receive different outputs to assist in origination or loan treatment.

The user input 18 may be a value for a loan retention variable. For example, the variable represents a desire or level of commitment to loan retention. The model may be skewed based on the value to more likely provide for a treatment other than foreclosure despite foreclosure being the most valuable treatment for a loan. The value may result in more loans on average being retained. The number or conditions for loans acceptable to be retained may be a function of the value of the loan retention variable. For example, the model is trained with the loan retention variable as an input. Alternatively, the model may be trained with the ground truths altered to more likely retain loans. As another example, the loan retention variable is used to calculate or adjust the output from the model.

The memory 14 is a database or other memory device. The memory 14 stores real estate market information, such as regional property values as a function of number of rooms, square footage, or other market information. The real estate market information is a database or available to the system 10 without remote access. Alternatively, the real estate market information is obtained through the input 18. In other embodiments, different or additional information is provided in the memory 14, such as property, borrower, or loan product information or matrix or model information.

The input 18 may be a network interface. For example, the input 18 is a hard-wired or wireless network interface configured to receive data. A universal asynchronous receiver/transmitter (UART), a parallel digital interface, a software interface, Ethernet, or any combination of known or later developed software and hardware interfaces may be used. The network interface may be linked to various types of networks, including a local area network (LAN), a wide area network (WAN), an intranet, a virtual private network (VPN), and the Internet. The network interface may be linked to the memory 14 or other memory, such as a database of values for borrowers.

The input 18 is an interface to receive data representing one or more characteristics of one or more borrowers, properties, real estate markets, and/or loans. Alternatively or additionally, the input 18 is an interface to receive data derived from other data.

The input 18 receives data in response to a request or data pushed to the input 18. For example, the system 10 harvests, requests, or mines data from one or more sources. Any type of data mining may be used, such as knowledge-based data mining.

Figure 5:
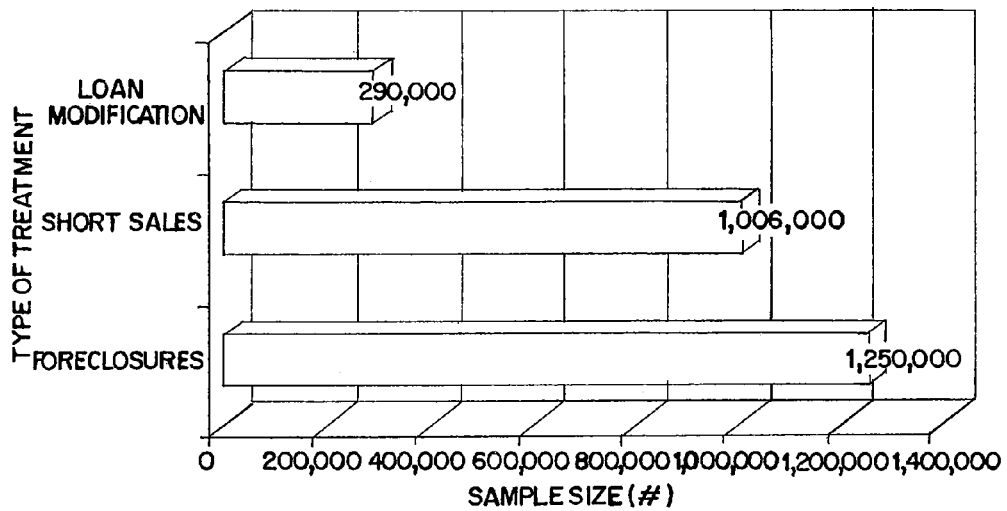
FIG. 5 is a graph representing an example of sample size for different types of treatment.

In one embodiment, training data is obtained. The training data includes treatment effects. Treatment effect indicate how distressed borrowers performed against a loan treatment over a given time period, such as one year. The effect of a treatment designed to either turn a non-performing loan into a performing loan and/or resolve that loan to the mutual benefit of the borrower, the servicer and the investor (owner of the loan) is input. Loan treatments may include loan modifications, short sales and foreclosures. FIG. 5 shows examples of a number of instances or samples representing each of three treatments. Different numbers of samples may be provided. Each sample represents an entire or partial set of values for variables associated with a loan.

Loan modifications are new loans issued to distressed borrowers. In effect, a loan modification is similar to a refinance, except that either the borrower or the property may no longer qualify for refinance. Loan modifications issue a new loan to the borrower in an attempt to make that loan more affordable and/or desirable to the borrower. Loan Modifications include reductions in interest rate, extension of loan maturity date, and/or some form of principal reduction or forbearance.

Short sales are sales where a $3^{rd}$ party purchases the property, but at a much reduced price. The price may be so reduced that the price requires the investor's approval, since the asking price is below the unpaid principal balance (UPB) of the original mortgage. Since the sale comes up short (e.g., too little cash remaining to pay the original mortgage in full), the sale is a "short sale."

The Foreclosure treatment is a short hand for a variety of treatments in which the borrower loses title to the property. The property is then sold by the bank on the open market.

In one embodiment, credit report information is obtained. Credit report information is obtained for each person associated with a loan. The credit report information represents consumer credit or borrower behavior. This borrower data includes of consumer credit information that profiles all or some of a borrower's credit relationships. The information may include mortgage, auto, credit card, finance company and/or other loan information. Any information may be extracted from a credit report. For example, tens, hundreds, or thousands of variable values are extracted and/or calculated from credit reports for each borrower. In one embodiment, 20,000 metrics per borrower are extracted. All or fewer than all of the metrics are used as feature vectors for the model. For example, 1,028 metric values are input into the matrix for modeling borrower behavior.

The credit report may be used to determine time series data for a borrower. All liens or loans by a given borrower are determined. For each given time increment, such as yearly, the loan information is determined.

In one embodiment, property information is obtained. Property information is characteristics of a specific property associated or linked to a loan. For example, the property information represents a house for a mortgage or a car for an auto loan. The property data may includes part or a full property description (e.g. single family home, three bedroom, 2 bath, 2,100 square feet, etc.). The property data may include a transaction history, such as all sales and all liens conducted against this property over time. Any time period may be used, such as since 1995.

In one embodiment, loan information is obtained. The loan information represents one or more characteristics of a loan for the property. The loan may be characterized as product data as the loan is a financial company product. The product data may include mortgage modeling data, which includes information about the loan product (e.g. interest rate, type of product, origination amount, etc.). The product data may include data on the transaction, such as FICO@Origination, Loan-To-Value (LTV)@Origination, appraisal value, and/or sales price of the property.

In one embodiment, real estate market information is obtained. The real estate market represents market information for the region including the property. Any size region may be used, such as by county, city, state, or distance. Real estate market information may include sale prices, length of time for a property on the market before sale, average sale price, average length of time on the market, or other information. The real estate market information may be more granular, such as providing information as a function of property information (e.g., average sale price for a three bedroom house).

The input information, such as the credit report (e.g., borrower) information, the property information, the loan information, and the real estate market information is in the form of metrics. Each metrics is a variable. Any number of metrics may be provided for any type of information. In one embodiment, at least 90% of the metrics used by the model are from the credit report information, reflecting a borrower centric approach. More or less relative amount of credit report information may be used. The model leverages the information from the credit report, the property report, local real estate markets and other data sources.

Figure 4:
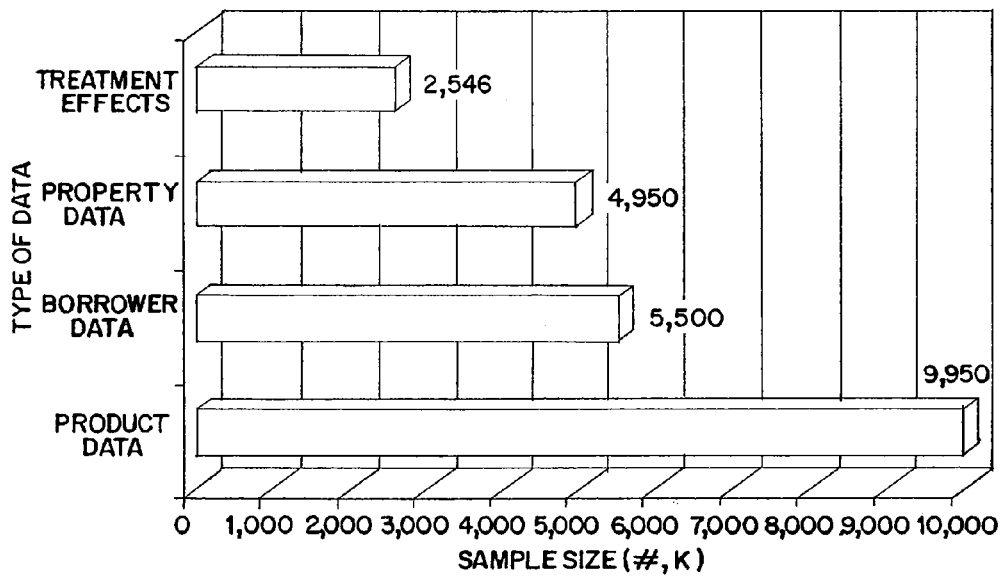
FIG. 4 is a graph representing data sample size in one example.

The matrix database, through the model, links detailed consumer credit information with metrics from property, loan product and loan treatment performance. For training, the any number of sample cases may be acquired. For example, the information is gathered for hundreds, thousands, tens of thousands, hundreds of thousands, millions or more loans. In one embodiment, metrics associated with 10 million subprime and Alt-A (Not-Prime) loans are gathered. FIG. 4 shows a break-down of example samples. Each sample includes a full or mostly complete collection of metrics across one or more of the data categories, such as borrower, product, property and real estate market information.

The processor 12 of FIG. 1 is configured by software and/or hardware to apply a model. The processor 12 has any suitable architecture, such as a general processor, central processing unit, digital signal processor, server, application specific integrated circuit, field programmable gate array, digital circuit, analog circuit, combinations thereof, or any other now known or later developed device for processing data. Likewise, processing strategies may include multiprocessing, multitasking, parallel processing, and the like. A program may be uploaded to, and executed by, the processor 12. The processor 12 implements the program alone or includes multiple processors in a network or system for parallel or sequential processing. The processor 12 is configured by the program or by design to perform the functions, acts, or processes described herein.

The processor 12 creates a model, applies the model, or both creates and applies the model. At least a portion of the model is trained from data. The model may be influenced or structured by manual programming.

In one embodiment, the model is a machine-learned model or classifier. For example, a model predicting net present value, borrower cluster, first lien default, sale value, treatment result, and/or other outcome is machine trained. Any machine-learning algorithm or approach may be used. For example, the matrix is learned by a machine from training data in a supervised or unsupervised manner. In one embodiment, a combination of both supervised and unsupervised is used. For example, clustering is learned using an unsupervised method and hazard functions for predicting an outcome are learned using a supervised method.

Any unsupervised method of machine-learning may be used to construct the classification methodology. In the unsupervised portion of the model development, a model developer may influence or control which metrics are used in the creation of the classification methodology. For example, the programmer inputs metrics for consideration by the classification machine-learning system, then evaluates the output of that process using the statistical outputs of that analysis process and expert judgment. This process of selecting metrics, reviewing output and rescaling existing metrics or selecting new metrics continues until the model developer is satisfied that a robust range of borrower and property behavior has been captured by the classification methodology. The model developer develops his/her initial set of metrics based upon principal component and/or factor analysis methodologies. The output of these methodologies is a set of statistically independent or related factors, which are based upon a statistical and/or algorithmic relationship of the metrics to the factor. From the analysis of these factors, it is possible to identify a subset of metrics that explain the bulk of the borrower and property behavior in this paradigm. This set of metrics forms the initial set of metrics that are input into the development of the classification methodology, the result of which is the winnowing out of less significant variables (as judged by the developer) enroute to creating the final classification methodology that assigns every borrower (and property) to one of a number of different clusters (borrower groups).

The purpose of unsupervised learning is to display the behavior of the players (borrower, property, local real estate market) across as many dimensions as possible with the goal to establish an information rich view of their behavior. For example, less information rich approaches, such as a FICO× LTV matrix, represent behavior using very few dimensions. The FICO×LTV uses just two dimensions: FICO (borrower) and LTV (property related). In this paradigm, if each of those has 3 levels, the total number of possible classifications are 9 ($3^2$). The unsupervised machine learning allows behavior to be predicted across many more metrics, such as employing 28 dimensions where each dimension is one or more metrics. When profiling the borrower, such dimensions as Distress (FICO-like) and a host of not-FICO-like dimensions are used. The not-FICO-like dimensions, which are in the majority, include: Capacity, Willingness, Affordability, Volatility, Estimated Status and many others in one example. To represent the property, example dimensions may include Property Value, Open Lien Amount and Combined Loan to Value (CLTV). The Housing Price Index, Time on Market and other aspects of market behavior may represent the real estate market. Given that each of these dimensions has three levels in one embodiment, the total number of possible classifications using the machine learned classifier is not 9, but $2.28*10^{13}$ or ($3^{28}$). Machine learning allows generation of a much richer (e.g., classification power) view than is typical. The richer view is due to the unsupervised learning techniques used to create the borrower segmentation (e.g., classification or clustering) algorithm.

While the preceding number of classifications is theoretically possible, one example embodiment creates 22 classifications (clusters or borrower segments), which are used to model behavior for a combination of the borrower, property and market information. This more limited view or clustering is far more information rich than a FICO×LTV matrix. The view represents an attempt to model different kinds of borrower in the U.S. mortgage population into any desired number of segments.

In one embodiment, a K-means clustering is used as the unsupervised learning methodology. K-means clustering starts with a random technique to find the first (e.g., possibly the most "unique") cluster (borrower group). From this starting point, K-means clustering attempts to find the next cluster that is most distinct from the first, as defined by the input, such as a 28-dimensional metric-space. This process continues until a number of clusters are reached that seem to represent a holistic look at the borrower population.

Any criteria may be used to determine a completion of the training. Subjective criteria may be used by a person to determine that the clusters created are sufficiently robust (e.g., represent sufficient diversity in borrower, property and market, when viewed across clusters). Moreover, a robust set of clusters also may provide that each cluster contains borrowers, properties and markets that are sufficiently homogeneous as to represent a group. A robust set may exclude those clusters that are not sufficiently distinct to be meaningful. The set may exclude those segments that are "too distinct," that is those clusters that are composed of outliers which are too loosely bound together to represent a distinct group. A distinct group includes only those borrowers, properties, markets that are bounded by a common set of dimensions that are both objective and meaningful. In other embodiments, the criteria may be learned from training data.

For unsupervised learning, there are no "target" events, such as default or loan mod redefault, used to shape the process. The reason for selecting unsupervised learning is partially to eliminate the effects of "target event" modeling methods on the view of the borrower, property and market combination. For example, FICO, a score produced by a target event method, reduces the borrower population to one dimension: likelihood of default (of an original loan) within the next two years. Unfortunately, there is not one kind of FICO 700 borrower, but many kinds, all of which are overlooked by a methodology like FICO. Using a greater number of input metrics may allow for more accurate clustering.

Regarding the hazard function modeling, the hazard functions are supervised machine-learning techniques that are particular to a specific target event. Multiple different models predict a like number of target events, such as default, loan modification failure, short sale likelihood, or other events. Alternatively, one model predicts for different events. The hazard functions provide a probabilistic output that is derived from analysis of a database of training data with known results, such as a database of data with binary or a larger range of possible labeled outcomes. The machine-learning algorithm determines the relationship of different variables or nodes to each other. One of the nodes is the result. The learning may select only a sub-set of variables (i.e., input features) or may use all available input features.

In the hazard function portfolio of the model development, the model developer develops one hazard function for each cluster for each target event (e.g. default, loan mod failure, short sale success, etc.). Alternatively, one or more models may be trained in common for two or more clusters. The model developer submits a broad array of metrics for analysis, and the modeling methodology then determines which metrics are sufficiently predictive to remain in the hazard function prediction. The model developer may influence this process by rescaling existing metrics or by creating new metrics that capture important aspects of borrower or property behavior. The rescaled and/or new metrics along with those already selected are submitted in an iterative process until the hazard function achieves a maximum or sufficient ability to predict the target event (e.g. loan mod failure). The hazard function output is a probabilistic estimate of the likelihood of survival.

For supervised learning, the methodology, not the developer selects the metrics that are used. The predictive value of each metric is determined, and modeling statistics that rate how well the model predicts the target event are provided to the user. The supervised learning may be performed in a specific manner. The models for default, loan mod redefault, short sale, or others are specific to the borrowers, properties and markets represented by each cluster. Hence, for example, there is not one default model, per se, but a model separately trained for each of the clusters (e.g., 22 models for each given loan treatment). The portfolio of models, for example, the 22 models of one per cluster for each target event, attempts to model such an event for all borrowers and properties in the U.S. mortgage market.

The cluster specific target event modeling method enables simpler, more powerful models of behavior. Each model is dealing largely with one kind of circumstance (borrower, property, market) instead of a random mix of circumstances. In other embodiments, less specific modeling may be used.

These target event models are hazard function models that predict how long a borrower (or property) will "survive" until a specific target event occurs, such as default, loan modification redefault, property sale, or other event. A borrower may perform on a loan modification for 8 months, and then become highly likely to default in month 9. One possible methodology used to estimate these hazard functions is the Cox proportional hazard methodology, but others may be used.

The output (probabilistic estimate) is a likelihood for the treatment to satisfy a given criteria, such as survive without default over a year or to have a certain value. The likelihood is modeled from any of the gathered information. Any limitation may be used, such as a one-year, two year, three year, or other term of survival. The model may be specific to each treatment or may be a combined model indicating the survival for a plurality of different treatments.

Different probabilities may be learned based on any input or output levels. The possible values may be grouped, such that a different model is provided for different input ranges and/or output possibilities. For example, probability of positive treatment outcome is determined for each of three treatment options separately with the same or different input features by model and/or cluster. More or fewer levels of increment may be provided.

The probabilities associated with the metrics and relationships are learned or derived from data of other borrowers, training data. Information from the different databases may be secured, kept private, and/or made anonymous (e.g., removal of borrower identifiers) for training.

Input feature information (metrics or metrics calculated from metrics) may be normalized. For example, property values are normalized by real estate market information. The model is trained based on normalized values or non-normalized values.

The training, learning, or development of the model occurs at a developer's facility. In alternative embodiments, the model is updated and/or trained at a customer location. For example, additional training data is made available at a financial institution, such as due to ongoing loan treatment. The model may be relearned, modified, or created again based on the additional data available. The model adapts to information available at a site of use or over a recent time period. The processor 12 applies the model or models. Data for a given borrower or group of borrowers is input for application. The input is by manual entry, transfer, mining, or other input. For example, data from fields in a computerized borrower record is loaded for application to a model for data analytics of loan treatment.

Values for the available variables of the model are input into the model or models. The information may be input according to requirements, such as inputting values in specific units. Alternatively, raw data is input, and the model includes preprocessing to derive the values used to train the model.

Different inputs may be used for different models. For example, different metrics are used for modeling different types of loan treatments or for modeling behavior of different clusters. As another example, different metrics are used for clustering borrowers than used for predicting survival for different loan treatments.

The data for a given borrower and/or loan is input to the model. The model may be a table, matrix, or other data implemented by the processor 12. In one embodiment, the model includes a machine-learned Bayesian network.

Missing data may be substituted with an average, median, default value, or an expectation based on other inputs, or more sophisticated models may be used to impute missing data. For example, the median or mean learned from the training data for a given variable is used. As another example, the probabilities associated with relationships to connected variables and the values of the connected variables are used to calculate the missing value. Alternatively, missing data may be left blank where the model may still provide sufficient accuracy.

The processor 12 is configured to extract values for the metrics. Extraction is performed by requesting data, formatting received data, mining data, searching for data, or otherwise acquiring data from a one or more data sources.

Any number of metrics may be extracted, such as extracting at least one thousand metrics. All or only some of the metrics may be used by the model. The metrics are used for model development and/or model application. For example, metrics may be extracted for later possible use even where the metrics are not to be used for a current version of the model.

As discussed above, the metrics are extracted from the credit report information, the property information, the loan information, and the real estate information. In one embodiment, a majority of the metrics are from the credit report information, but any relative weighting of the types of metrics collected may be used. In one embodiment, 1,028 metrics are used during application of the model with over 800 of the metrics being consumer credit metrics.

The metrics may be used to calculate other values. The metrics, other values, or both are input to the model as a feature vector. For example, component scores, model development factors and metrics are calculated from metrics. Scores include whether a borrower has defaulted, whether a borrower has made prepayments, or other indicators of status. The model development factors are information vectors obtained from the reduction of borrower, property and product information into a set of vectors. The development factors are a subset of the metrics. These vectors are used to adjust survival function outputs, which impacts net present value or other result. The metrics are logical combinations of metrics or determinations from a data field, such as a value for a variable. For example, a distress metric is calculated by counting the number of any 60 days past due instances in the last two years.

The model may include one or more stages or parts, such as a hierarchal model or multi-class model. For example, the model has a classifier or cluster stage for classifying borrowers and their properties into specific borrower groups, which contain a rich and multi-dimensional view of the borrower, his/her property and other key characteristics and behaviors. The model also includes a predictive stage where the survival or other results are predicted based, at least in part, on the classification.

The classifier stage may be characterized as personalization modeling. When making personalization models, the developers model the actual players, not the target events. In the real estate transaction, that means the borrower, the property, the loan product and the local real estate market are modeled, not the results provided in the second stage (e.g., default, prepayment, or loan modification failure, per se). In another type of transaction, such as auto lending, personalization models model the borrower, the asset (the car), the transaction and the auto marketplace. Personalization models provide information about behavior of the player, such as the borrower. Whereas a typical score predicts only one kind of target event (e.g. FICO, default), the personalization models simultaneously predict a portfolio of target events across a wide range of borrower, asset and local market behaviors.

The classifier stage may use one or more specific models. For example, the classifier stage includes three types of models—a borrower model, a property model, and a product model. These models determine the input feature vector used for clustering the borrower into the appropriate portfolio of target events.

The borrower model is formed from credit factors. The credit factors are input feature vectors extracted from metrics of the credit report information. One or more credit factors are used. Each credit factor may include one or more metrics. For example, a plurality of credit factors is calculated. The credit factors are calculated for each of a plurality of types of debt from the credit report information. For example, the processor 12 determines three factors—distress, capacity to pay, and willingness to pay. Additional, different or fewer factors may be used. Each factor represents a collection of metrics indicative of the factor.

Figure 6:
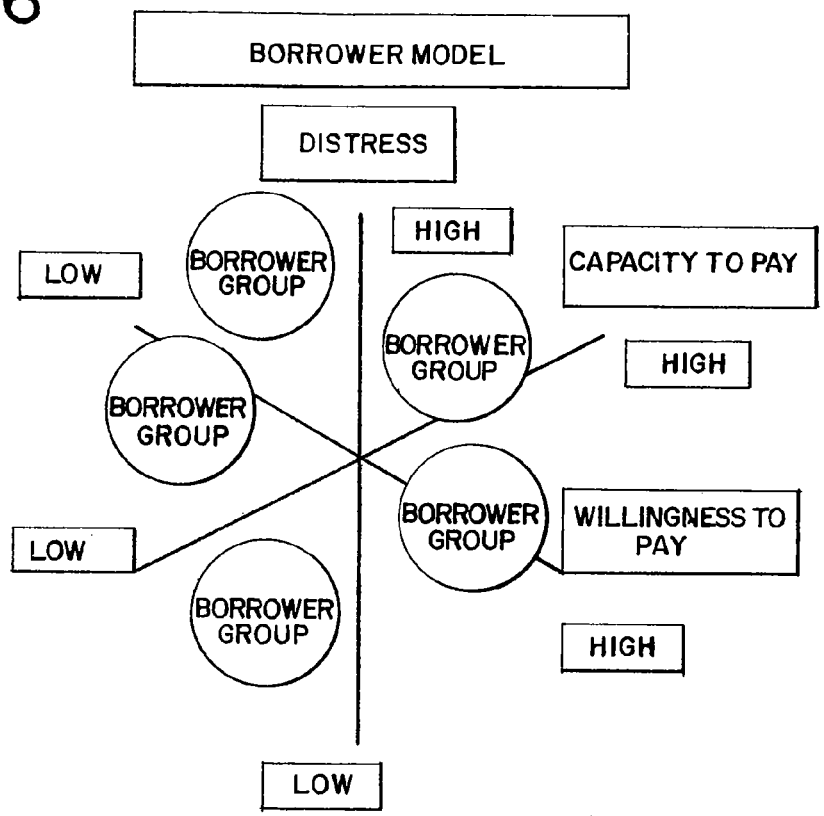
FIG. 6 is a graphical representation of one embodiment of a borrower model.

FIG. 6 shows the borrower model in one example embodiment. The borrower model is bounded by three factors: distress, capacity and willingness. These factors represent borrower states that have many more dimensions (e.g., a plurality of metrics for each factor) than are captured by a typical attribute. Factors capture a broader and deeper array of behaviors and demonstrate an ability to explain a wider array of outcomes (e.g. default, prepayment, loan modification success, short sale, etc.). The three shown factors are the most heavily correlated with the results (e.g., with clustering outcome). While three primary factors are shown, other factors may be provided. For example, four or more (e.g., twenty eight) factors may be provided. The factors to use are based on a factor analysis. Different metrics may similarly correlate with a given outcome, so are grouped together as a factor. Any correlation resolution may be used, resulting in any desired number of factors.

The metrics to include in a given factor are determined by unsupervised machine-learning techniques. Machine learning may indicate a correlation of each attribute with the desired result, such as cluster assignment. The distress factor indicates difficulty in servicing debt. Those borrowers who have a high distress rating have and will continue to have difficulty successfully servicing debt. The distress factor includes data over any period of time, such as behavior from up to two years ago to that occurring very recently. The distress factor may include information from one or more types of different credit relationships (e.g., credit report trade lines). The positioning of the borrower on this factor may indicate of his/her current state and his/her propensity to incur additional debt servicing distress in the future. The distress factor may include metrics, which indicate borrower debt servicing distress, ranging from overall distress (an attribute rating performance across all credit relationships) to more specific forms of distress such as: revolving credit, auto credit, finance company credit and so forth. For example, distress is measured across a borrower's 20+ credit relationships, not just mortgage. It is not unusual in the distressed mortgage population to find borrowers who have over 50% of their credit relationships in distress. Addressing their mortgage helps with only 1 in 10 of their credit problems, leaving them poorly positioned to succeed at loan modification. In one embodiment, the distress factor correlates the most highly as compared to other factors with survivability of loan modification.

The capacity factor indicates how many dollars the borrower can muster per month and apply to debt servicing. Those who rank low on the capacity factor have a limited ability to generate and apply cash to debt servicing obligations. Capacity factor includes metrics that measure capacity overall (e.g., cash velocity—an estimate of the amount of money produced to service debt calculated by payments for active trade lines), capacity per specific types of debt, home affordability, cash to cover (e.g., does this borrower have the cash on hand to cover his/her distressed debts) and other capacity-related metrics. In this context, capacity may not be income or debt-to-Income, but may be correlated with such attributes. For example, the capacity metric includes metrics indicating how much cash a borrower is putting forth to service debt. A capacity of $2,000 means a borrower is currently producing $2,000 per month to service debt. If, for example, he/she must produce $2,700 per month post modification, the capacity metric would indicate an increase in redefault risk even though the income stats (income, DTI) suggest this payment is "affordable."

The willingness factor indicates a borrower's willingness to cure problem debt and avoid future problems. The high willingness borrower is likely to accept a collector's call, likely to self cure a delinquent account, and likely to avoid those situations where he/she may be financially distressed. This borrower, despite a circumstance that may dissuade other borrowers (low Capacity, high Distress) may demonstrate skill and persistence at curing problem debts. This kind of borrower may more likely succeed with an appropriately tailored loan modification. On the other hand, those with low willingness allow almost any problem debt roll to default and charge off, including their modified loan. Many distressed borrowers rate a willingness score of less than 2 on a 1-100 point scale. This means that, on average, this kind of borrower fixes less than 1 problem debt per 100 problems. The metrics used in determining willingness calculate the borrower's track record at fixing problem debts; that is curing a seriously delinquent loan from 90 days past due to current.

Another possible factor is affordability. Affordability includes metrics indicating how much capacity the borrower has relative to the value of his/her property. If affordability is "high," this borrower is likely to service the original mortgage and, if need be, service a loan modification. The affordability information may be included as part of the capacity, willingness, or distress factors.

Yet another possible factor is cash to cope. The cash to cope factor includes metrics indicating how readily the borrower's capacity will cover the borrower's current level of distress. High ratings indicate that the borrower is likely to cope with present debt servicing problems. The cash to cop information may be included as part of the capacity, or distress factors.

Another possible factor is recency of bad debt. Not only is the amount of bad debt an issue, but when the debt occurs may be indicative of loan performance. Bad debt occurring in the recent past is far more impactful than the bad debt that occurred loan ago. The recency of bad debt information may be included as part of the capacity, willingness, or distress factors.

Yet, another possible factor is volatility; the metrics used to estimate volatility measure the likelihood that a borrower's payment performance will vary significantly from month to month. For example, a borrower who is consistently current across all of his/her tradelines would have a low volatility, whereas one whose performance generates a range of statuses (e.g. current, 30 dpd, 60 dpd etc.) would have a high volatility. Volatility may be a non linear function where moderate values are associated with high default rates, and minimum and maximum values are associated with lower default rates.

Each factor contains different information about a borrower. Each factor is statistically independent of the others or at least has a low correlation (e.g., less than 0.5) with the other factors. The factors may include some correlation or statistical dependence on other factors. By having low correlation or statistical independence, a plurality of different behaviors may be modeled and treated separately. Although a loan may be within the borrower's capacity, the borrower's willingness or propensity for distress may indicate reasons not to make a loan. Unless the servicer takes into account the borrower's willingness and distress metrics, the future success of a loan modification is at risk. The profile of the borrower most likely to survive a loan modification is one with high capacity, very high willingness and low distress.

Even though a loan modification may be within a borrower's gross income guidelines (e.g. debt-to-income ratio (DTI)), granting a loan modification to a borrower with low willingness or high distress causes the probability of default to rise substantially. The low willingness borrower gives up as soon as debt servicing difficulties arise. Since such difficulties are largely unavoidable, the low willingness borrower defaults. The high distress borrower has cash siphoned off by the demands of collectors from other creditors, so is also more likely to spend cash on his/her preferences in advance of servicing debt. Either way, the high distress borrower is likely to default on a loan modification. Further, capacity is fundamentally different from DTI. Capacity estimates the cash a borrower (and his/her household) can muster on a monthly basis to service debt. As a result, the capacity factor's connection with debt servicing is fundamental and direct, whereas the connection of DTI to debt servicing is somewhat removed and indirect. As a result, the presence of cash in the not-prime borrower's bank account does not necessarily reliably translate into monies applied to mortgage servicing, regardless of the payment amount.

In order to ensure consistent, strong debt servicing behavior, the model represents evaluation of a borrower on dimensions beyond capacity, such as potential for distress and willingness to pay. The best performance comes from a borrower who has a high willingness rating, a low potential for distress and higher than average capacity. However, good performance can also be accomplished with a high willingness borrower whose loan terms (monthly payment, etc.) are adjusted for his/her levels of distress and capacity.

The willingness factor may be the most predictive of capacity, willingness, and distress. The willingness factor may be valuable in explaining distressed credit card and auto loan behavior, as well as being the lead element in pricing portfolios of distressed credit card debt. Willingness includes metrics indicative of if and how a servicer can get a loan (or a credit card account) to perform, once its performance has deteriorated.

Figure 7:
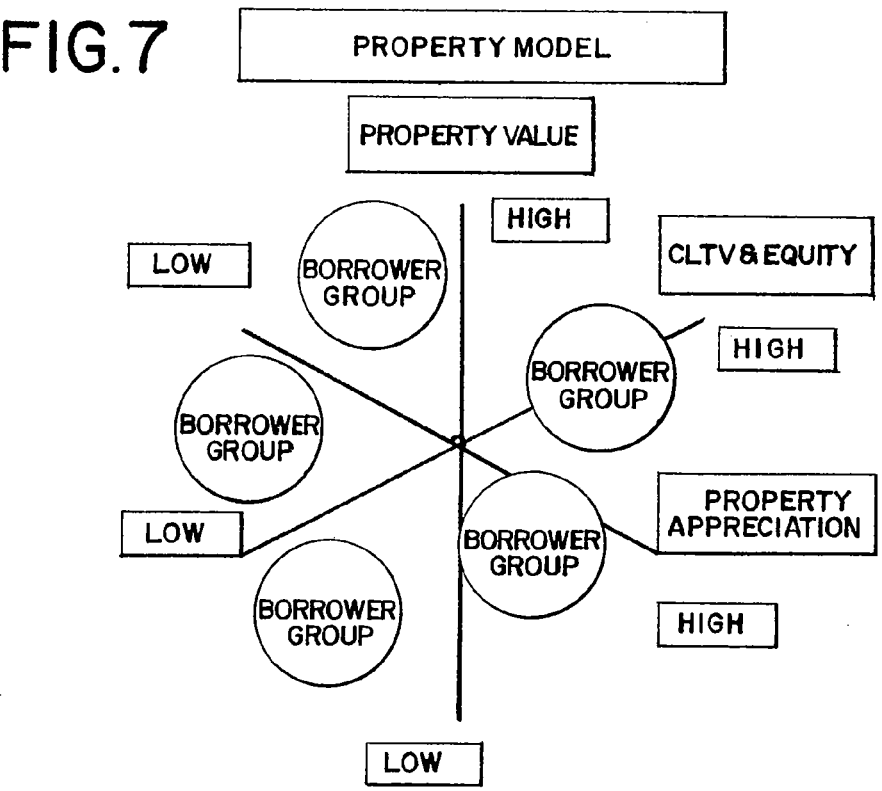
FIG. 7 is a graphical representation of one embodiment of a property model.

Once the factors have been established, the factors may be used to segregate borrowers into groups, each with a specific profile, containing borrower's with that profile. Since each factor is an information rich vector describing a particular dimension of the borrower's behavior potential, the position of any specific group of borrower's within the array of factors conveys a rich, multi-dimensional view of a specific kind of borrower FIG. 7 shows a property model. The processor 12 calculates the property factors from property information. The metrics for the property information are grouped into one or more factors. For example, eight factors are provided for the property information. The factors are determined from factor analysis, such as selecting metrics with similar levels of correlation to a given result. Different factors may be determined for different results and/or groupings of correlation for a same result. In one embodiment, the property factors include property value, combined loan-to-value (CLTV) ratio and equity, and property appreciation. The three shown factors are the most heavily correlated with the results (e.g., with clustering outcome).

The property value factor contains metrics that relate to the value of the property, as determined by market factors. For example, the most likely sales price (e.g., AVM), $ per square foot, and size are included.

The CLTV and equity factor represents the property's ability to contribute to the owner's current wealth. This factor includes metrics such as a CLTV value, equity amount and other similar metrics.

The appreciation factor represents the current pricing trend for a property. A property with a high rating on the appreciation factor is likely to increase in value. For example, the appreciation factor includes various market related metrics, such as housing price index changes and time-on-market.

As with the borrower model, the factors in the property model are statistically independent, but may have some correlation. One can find a property rated high on the property value factor that is also rated as low on the CLTV/equity factor and the appreciation factor.

FIG. 8 shows a product model. The product model may be used for borrower classification or for treatment survival prediction. The product factors are metrics from the loan information. Any number of factors may be provided. As shown in FIG. 8, three example factors are origination amount, interest rate, and product type (e.g. ARM v Fixed). The three shown factors are the most heavily correlated with the results (e.g., with clustering outcome). The factors in the product model may include a single attribute or metric, such as the value represented by their names. For example, the origination amount represents the amount lent to the borrower at loan origination. The interest rate factor represents the initial interest rate of the product. The product type represents the type of loan product, which can range from fixed rate (Fixed) to adjustable rate (ARM). The metrics included in to the type factor may include a wide variety since there is a wide variety of product types, with multiple different kinds of ARM and Fixed products and many different types in between (Interest Only, Balloon, Negative Amortization, etc.).

The processor 12 applies the model using the credit report information, the property information, the loan information, and the real estate market information. The factors of each model being used indicate the metrics to be used. The input feature vectors or factors for each model are acquired by the processor 12.

In one embodiment, a matrix trained using unsupervised machine learning uses the credit factors and product factors as input feature vectors for the model. The matrix is trained to classify a borrower and product combination into one of a plurality of possible clusters. The credit report information and property information are extracted based on the determined factors. Each factor is selected and developed based upon how well that factor (i.e. collection of metrics) can explain variance in borrower and property behavior in the behavioral space used for the principal component and factor analysis techniques. The extracted factors are input to a matrix trained as a cluster classifier to classify the borrower as belonging to one of a plurality of clusters. The model determines a behavior cluster for the borrower from these input feature vectors.

In response to the input, the model outputs a probability, value, or class. For example, the model classifies a given borrower, and then outputs likelihood of each loan treatment surviving for one year and/or the value of the asset given each loan treatment. The processor 12 outputs the probability, class, or value using the models. The output may be a binary decision rather than a probability, such as a prediction of survival or not. The processor 12 outputs the data to the display 16, to the memory 14, over or to a network, to a printer, or in other media. Other outputs may be provided, such as confidence intervals, error information, standard deviation, or other data associated with the probability.

The personalization models (i.e., borrower and property models) provide the classification matrix with information about the borrower and property. The values for the metrics of the factors are used to segment the borrowers into clusters, based upon a borrower and property profile. Each Cluster contains a borrower and property combination with specific metrics, such as potential for lien default in the first year, capacity or CLTV. Across clusters, the profiles of each borrower and property combination may vary.

Any number of clusters may be provided. For example, the machine training may identify groups associated with different combinations of characteristics. Clusters are mathematically generated groupings wherein each grouping contains borrowers (and properties) that are similar and are dissimilar across groupings (clusters). As a result, when looking within a cluster, borrowers of similar capacity, distress and willingness, for example who own properties of similar value, appreciation rate and CLTV are provided. Across clusters, however, borrowers (and properties) are different, with the array of clusters not only representing many different kinds of borrower×property combinations, but in fact are believed to represent the entire array of borrowers in the mortgage industry. In one embodiment, there are at least ten clusters, such as twenty-two clusters. The programmer may group similar borrower and product combinations together into a cluster.

Table 1 shows an example with twenty-two clusters. Each cluster has been assigned a name based on general behavior associated with the cluster. This behavior is indicated by the values of the factors used to cluster and the results of loan treatment associated with member samples of the cluster. Other names may be used.

TABLE 1

| Cluster # | Name | 1st Lien Default % | 1st Lien Prepay | Capacity | Distress All | Willingness to Pay | Property Value | Equity | CLTV |
|---|---|---|---|---|---|---|---|---|---|
| 1 | Repentant BK Borrower | 3.66% | 60.33% | $2,183.98 | 12.86% | 27.28 | $209,486.74 | -$ 33,994.48 | 112.90% |
| 2 | Cash Rich, Serial Refinancer With Underwater Property | 1.37% | 100.00% | $5,539.46 | 3.13% | 79.28 | $393,504.66 | -$125,230.96 | 128.80% |
| 3 | Inexperienced Borrower With Recent Debt Servicing Problems | 1.90% | 99.93% | $2,300.03 | 4.38% | 43.05 | $221,874.06 | -$ 65,563.28 | 124.80% |
| 4 | Cash Rich, Serial Refinance Adverse Borrower With Underwater Property | 0.86% | 0.07% | $6,175.86 | 3.00% | 67.8 | $465,448.90 | -$142,094.56 | 129.28% |
| 5 | Overextended Borrower with High Likelihood of Default | 70.60% | 35.15% | $ 875.61 | 30.10% | 9.5 | $250,589.73 | -$ 11,217.03 | 113.62% |
| 6 | Volatile Borrower Putting Mortgage First | 3.32% | 45.49% | $1,727.64 | 31.20% | 7.59 | $185,842.67 | -$ 6,503.17 | 102.85% |
| 7 | Extremely Conservative Borrower With Excellent Debt Servicing Skills | 3.64% | 37.93% | $2,562.99 | 3.20% | 43.86 | $239,133.16 | -$ 44,688.44 | 116.82% |
| 8 | Low Capacity, High Distress Borrower | 93.68% | 25.29% | $ 127.51 | 68.89% | 0.44 | $207,237.43 | -$ 35,846.52 | 113.52% |
| 9 | Highly Leveraged Borrower Showing Signs of Strain | 6.46% | 56.28% | $3,576.07 | 17.83% | 25.43 | $290,420.23 | -$ 64,508.98 | 119.34% |
| 10 | Revolving Abuser With a Cheap House | 3.67% | 43.12% | $2,158.68 | 34.97% | 10.2 | $196,054.60 | -$ 23,778.79 | 110.51% |
| 11 | Marginally Performing Borrower with Distressed Property | 3.78% | 51.29% | $3,268.34 | 17.05% | 48.09 | $269,887.61 | -$ 51,645.15 | 115.59% |
| 12 | Performing Borrower with Very Distressed Property | 1.59% | 0.00% | $2,589.61 | 4.01% | 36.45 | $217,882.06 | -$ 64,510.98 | 126.46% |
| 13 | High Inconsistent, Least Experienced Borrower | 63.09% | 32.77% | $ 36.28 | 62.57% | 0.33 | $210,121.28 | -$ 23,248.29 | 106.16% |
| 14 | Cash Poor, Performing Borrower | 2.66% | 82.34% | $ 473.71 | 19.85% | 11.95 | $275,819.70 | -$ 9,041.89 | 103.41% |
| 15 | Competent Borrower with Average Property | 2.51% | 56.19% | $2,864.37 | 11.87% | 32.27 | $246,165.78 | -$ 37,612.35 | 113.13% |
| 16 | Extremely Consistent Borrower With Performing Property | 0.59% | 0.57% | $2,753.13 | 3.32% | 76.65 | $209,114.42 | $ 15,149.89 | 93.87% |
| 17 | Long Term Home Owner With Strong Equity Position | 0.45% | 1.67% | $1,818.41 | 4.01% | 26.55 | $277,483.43 | $ 87,156.89 | 68.91% |
| 18 | Deteriorating Borrower Stranded in Bad Property | 96.09% | 26.16% | $1,262.17 | 36.81% | 8.87 | $276,927.41 | $ 92,090.80 | 128.61% |
| 19 | Mortgage Default in Process | 9.79% | 89.84% | $ 843.92 | 45.67% | 4.94 | $263,328.98 | -$ 98,297.77 | 128.38% |
| 20 | Land Baron | 0.61% | 28.23% | $4,680.16 | 3.58% | 53.16 | $745,082.42 | $232,343.12 | 69.35% |
| 21 | Refinance Prone Borrower with Performing Property | 3.81% | 99.85% | $2,079.87 | 3.84% | 56.36 | $289,575.71 | $ 54,993.37 | 81.19% |
| 22 | Keeping Mortgage Intact by Abusing Personal Debt | 8.63% | 30.16% | $1,533.96 | 59.65% | 1.4 | $167,929.06 | -$ 5,013.56 | 101.57% |

The clusters shown in Table 1 reveal profiles characterized by eight (8) metrics. The metrics include 1st lien default. This is a measure of the percentage of members of the cluster that defaulted (foreclosure) on any first lien (i.e., trade line) in a two year period. The 1st lien prepay is a measure of the percentage of members of the cluster that prepaid on any lien in the two year period.

The capacity, distress and willingness factors are simplified to a single metric each for purposes of analyzing the clusters. The capacity is a calculation of the monthly amount spent on paying for loans. The distress is the percentage of trade lines 60 days or more past due. The willingness to pay is calculated as the ratio of the number of cured trade lines that were once delinquent to the number of trade lines. Where there are no delinquent trade lines, a value of 0% is assigned.

Using eight metrics may be a simplification for descriptive purposes. The actual classification may segment borrowers into clusters using any number of metrics, such as fewer or more than eight (e.g., 40) metrics being used to define separate clusters. The metrics are harvested from the factors (e.g., such as from the 28 factors—20 for the borrower model and 8 for the property model) developed to define the behavioral space for the matrix.

The factor accounting for the most variance in the behavioral space is the distress factor, which accounted for 13% of the variance in the behavioral space (i.e., variance across the tracked metrics for the different clusters). Using a principle components analysis, the Eigen value associated with the metrics for each factor is determined. The factors providing a higher Eigen value are selected as the factors to be used for clustering. For example, the twenty-eight highest Eigen value factors account for about 83% of the variance, so are used. Each factor contributes a different variance.

Loaded against the distress factor are seven significant metrics, of which four are included in the classification methodology. The four are included based upon their ability to segment each borrower by property combination into meaningful groups without adding more complexity relative to their information value.

The clusters labeled as numbers 5, 8, 13 and 18 have larger 1st lien default potential. Not only do the borrowers in these clusters have a high default potential relative to the other borrowers in the other clusters, these borrowers have a relatively potential for default in an absolute sense. Two clusters, 8 and 18, default at rates in excess of 93%. The default rate for the population is less than 20%.

The clusters labeled 19 and 22 default at higher rates within the next 12 months. The clusters labeled 16, 17, and 21 are the least likely to default in the population. Table 2 shows the clusters sorted by the 1st Lien Default %. This sorting provides a default score based on the clustering.

TABLE 2

| Cluster # | Name | 1st Lien Default % | 1st Lien Prepay | Capacity | Distress All | Willingness to Pay | Property Value | Equity | CLTV |
|---|---|---|---|---|---|---|---|---|---|
| 18 | Deteriorating Borrower Stranded in Bad Property | 96.09% | 26.16% | $1,262.17 | 36.81% | 8.87 | $276,927.41 | -$ 92,090.80 | 128.61% |
| 8 | Low Capacity, High Distress Borrower | 93.68% | 25.29% | $ 127.51 | 68.89% | 0.44 | $207,237.43 | -$ 35,846.52 | 113.52% |
| 5 | Overextended Borrower with High Likelihood of Default | 70.60% | 35.45% | $ 875.61 | 30.40% | 9.5 | $250,589.73 | -$ 41,217.03 | 113.62% |
| 13 | High Inconsistent, Least Experienced Borrower | 63.09% | 32.77% | $ 36.28 | 62.57% | 0.33 | $210,121.28 | -$ 23,248.29 | 106.16% |
| 19 | Mortgage Default in Process | 9.79% | 89.84% | $ 843.92 | 45.67% | 4.94 | $263,328.98 | -$ 98,297.77 | 128.38% |
| 22 | Keeping Mortgage Intact by Abusing Personal Debt | 8.63% | 30.16% | $1,533.96 | 59.65% | 1.4 | $167,929.06 | -$ 5,013.56 | 101.57% |
| 9 | Highly Leveraged Borrower Showing Signs of Strain | 6.46% | 56.28% | $3,576.07 | 17.83% | 25.43 | $290,420.23 | -$ 64,508.98 | 119.34% |
| 21 | Refinance Prone Borrower with Performing Property | 3.81% | 99.85% | $2,079.87 | 3.84% | 56.36 | $289,575.71 | $ 54,993.37 | 81.19% |
| 11 | Marginally Performing Borrower with Distressed Property | 3.78% | 51.29% | $3,268.34 | 17.05% | 48.09 | $269,887.61 | -$ 51,645.15 | 115.59% |
| 10 | Revolving Abuser With a Cheap House | 3.67% | 43.12% | $2,158.68 | 34.97% | 10.2 | $196,054.60 | -$ 23,778.79 | 110.51% |
| 1 | Repentant BK Borrower | 3.66% | 60.33% | $2,183.98 | 12.86% | 27.28 | $209,486.74 | -$ 33,994.48 | 112.90% |
| 7 | Extremely Conservative Borrower With Excellent Debt Servicing Skills | 3.64% | 37.93% | $2,562.99 | 3.20% | 43.86 | $239,133.16 | -$ 44,688.44 | 116.82% |
| 6 | Volatile Borrower Putting Mortgage First | 3.32% | 45.49% | $1,727.64 | 31.20% | 7.59 | $185,842.67 | -$ 6,503.17 | 102.85% |
| 14 | Cash Poor, Performing Borrower | 2.66% | 82.34% | $ 473.71 | 19.85% | 11.95 | $275,819.70 | -$ 9,041.89 | 103.41% |
| 15 | Competent Borrower with Average Property | 2.51% | 56.19% | $2,864.37 | 11.87% | 32.27 | $246,165.78 | -$ 37,612.35 | 113.13% |
| 3 | Inexperienced Borrower with Recent Debt Servicing Problems | 1.90% | 99.93% | $2,300.03 | 4.38% | 43.05 | $221,874.06 | -$ 65,563.28 | 124.80% |
| 12 | Performing Borrower With Very Distressed Property | 1.59% | 0.00% | $2,589.61 | 4.01% | 36.45 | $217,882.06 | -$ 64,510.98 | 126.46% |
| 2 | Cash, Rich, Refinancer With Underwater Property | 1.37% | 100.00% | $5,539.46 | 3.13% | 79.28 | $393,504.66 | -$125,230.96 | 128.68% |
| 4 | Cash Rich, Refinance Adverse Borrower with Underwater Property | 0.86% | 0.07% | $6,175.86 | 3.00% | 67.8 | $465,448.90 | -$142,094.56 | 129.28% |

TABLE 2-continued

| Cluster # | Name | 1st Lien Default % | 1st Lien Prepay | Capacity | Distress All | Willingness to Pay | Property Value | Equity | CLTV |
|---|---|---|---|---|---|---|---|---|---|
| 20 | Land Baron | 0.61% | 28.23% | $4,680.16 | 3.58% | 53.16 | $745,082.42 | $232,343.12 | 69.35% |
| 16 | Extremely Consistent Borrower With Performing Property | 0.59% | 0.57% | $2,753.13 | 3.32% | 76.65 | $209,114.42 | $ 15,149.89 | 93.87% |
| 17 | Long Term Home Owner With Strong Equity Position | 0.45% | 1.67% | $1,818.41 | 4.01% | 26.55 | $277,483.43 | $ 87,156.89 | 68.91% |

Table 3 below sorts the clusters by the mean distress, all per Cluster. When this attribute is used to sort, the sorting is based upon the average distress, all rating for the cluster. This statistic is created by summing the Distress, all rating for each borrower in the cluster and dividing by the number of borrowers in that cluster. The distress, all attribute accounts for a noticeable portion of the discriminating power of the clusters with respect to 1st lien default rate. As is also shown, the distribution of clusters is not as consistent as when sorting by 1st lien default. This means that the distress, all attribute, while important, does not account for all of the borrower 1st lien default behavior. Other metrics are needed to account for 1st lien default. For example, the forty metrics accounting for a sufficient or threshold amount of the variance are used. For example, sorting by other metrics, such as capacity and willingness shows that these metrics provide a different portion of the variance with respect to cluster, 1st Lien Default % and other key behaviors. These differences as a function of sorting by attribute serve to highlight the statistical independence of each attribute, the need to use many metrics to provide meaningful clusters, and the potential pitfalls of using too few metrics to perform critical functions such as loan origination or distressed asset treatment.

TABLE 3

| Cluster # | Name | 1st Lien Default % | 1st Lien Prepay | Capacity | Distress All | Willingness to Pay | Property Value | Equity | CLTV |
|---|---|---|---|---|---|---|---|---|---|
| 8 | Low Capacity, High Distress Borrower | 93.68% | 25.29% | $ 127.51 | 68.89% | 0.44 | $207,237.43 | −$35,846.52 | 113.52% |
| 13 | Highly Inconsistent, Least Experienced Borrower | 63.09% | 32.77% | $  36.28 | 62.57% | 0.33 | $210,121.28 | −$23,248.29 | 106.16% |
| 22 | Keeping Mortgage Intact by Abusing Personal Debt | 8.63% | 30.16% | $1,533.96 | 59.65% | 1.4 | $167,929.06 | −$ 5,013.56 | 101.57% |
| 19 | Mortgage Default in Process | 9.79% | 89.84% | $ 843.92 | 45.67% | 4.94 | $263,328.98 | −$98,297.77 | 128.38% |
| 18 | Deteriorating Borrower Stranded in Bad Property | 96.09% | 26.16% | $1,262.17 | 36.81% | 8.87 | $276,927.41 | −$92,090.80 | 128.61% |
| 10 | Revolving Abuser With a Cheap House | 3.67% | 43.12% | $2,158.68 | 34.97% | 10.2 | $196,054.60 | −$23,778.79 | 110.51% |
| 6 | Volatile Borrower Putting Mortgage First | 3.32% | 45.49% | $1,727.64 | 31.20% | 7.59 | $185,842.67 | −$ 6,503.17 | 102.85% |
| 5 | Overextended Borrower with High Likelihood of Default | 70.60% | 35.45% | $ 875.61 | 30.40% | 9.5 | $250,589.73 | $41,217.03 | 113.62% |
| 14 | Cash Poor, Performing Borrower | 2.66% | 82.34% | $ 473.71 | 19.85% | 11.95 | $275,819.70 | −$ 9,041.89 | 103.41% |
| 9 | Highly Leverage Borrower Showing Signs of Strain | 6.46% | 56.28% | $3,576.07 | 17.83% | 25.43 | $290,420.23 | −$64,508.98 | 119.34% |
| 11 | Marginally Performing Borrower with Distressed Property | 3.78% | 51.29% | $3,268.34 | 17.05% | 48.09 | $269,887.61 | −$51,645.15 | 115.59% |
| 1 | Repentant BK Borrower | 3.66% | 60.33% | $2,183.98 | 12.86% | 27.28 | $209,486.74 | −$33,994.48 | 112.90% |
| 15 | Competent Borrower with Average Property | 2.51% | 56.19% | $2,864.37 | 11.87% | 32.27 | $246,165.78 | −$37,612.35 | 113.13% |
| 3 | Inexperienced Borrower with Recent Debt Servicing Problems | 1.90% | 99.93% | $2,300.03 | 4.38% | 43.05 | $221,874.06 | −$65,563.28 | 124.80% |
| 12 | Performing Borrower With Distressed Property | 1.59% | 0.00% | $2,589.61 | 4.01% | 36.45 | $217,882.06 | −$64,510.98 | 126.46% |
| 17 | Long Term Home Owner With Strong Equity Position | 0.45% | 1.67% | $1,818.41 | 4.01% | 26.55 | $277,483.43 | $87,156.89 | 68.91% |
| 21 | Refinance Prone Borrower with Performing Property | 3.81% | 99.85% | $2,079.87 | 3.84% | 56.36 | $289,575.71 | $54,993.37 | 81.19% |

TABLE 3-continued

| Cluster # | Name | 1st Lien Default % | 1st Lien Prepay | Capacity | Distress All | Willingness to Pay | Property Value | Equity | CLTV |
|---|---|---|---|---|---|---|---|---|---|
| 20 | Land Baron | 0.61% | 28.23% | $4,680.16 | 3.58% | 53.16 | $745,082.42 | $232,343.12 | 69.35% |
| 16 | Extremely Consistent Borrower With Performing Property | 0.59% | 0.57% | $2,753.13 | 3.32% | 76.65 | $209,114.42 | $ 15,149.89 | 93.87% |
| 7 | Extremely Conservative Borrower With Excellent Debt Servicing Skills | 3.64% | 37.93% | $2,562.99 | 3.20% | 43.86 | $239,133.16 | −$ 44,688.44 | 116.82% |
| 2 | Cash Rich, Serial Refinancer With Underwater Property | 1.37% | 100.00% | $5,539.46 | 3.13% | 79.28 | $393,504.66 | −$125,230.96 | 128.68% |
| 4 | Cash Rich, Refinance Adverse Borrower with Underwater Property | 0.86% | 0.07% | $6,175.86 | 3.00% | 67.8 | $465,448.90 | −$142,094.56 | 129.28% |

CLTV, a property centric attribute, has a lesser significant effect on 1st lien default behavior. The results of Table 4 below show the lesser significance. In Table 4, the clusters are sorted by average CLTV rating. The results indicate a wide dispersion of 1st lien default effects, suggesting that CLTV has a very limited effect on 1st lien default rate. Clusters with a high CLTV do not necessarily default at a higher rate. The lowest default clusters are crowded near the bottom of Table 4, suggesting that to some extent a good CLTV (low value) is associated with a reduced probability of default. This does make sense, in that if a borrower in a low default rate cluster with a low CLTV becomes distressed (which is not that likely), he/she almost always has resale to a 3rd party as an option. This is an option the distressed borrower with a high CLTV (i.e. >>100%) does not have.

TABLE 4

| Cluster # | Name | 1st Lien Default % | 1st Lien Prepay | Capacity | Distress All | Willingness to Pay | Property Value | Equity | CLTV |
|---|---|---|---|---|---|---|---|---|---|
| 4 | Cash, Rich, Refinance Adverse Borrower with Underwater Property | 0.86% | 0.07% | $6,175.86 | 3.00% | 67.8 | $465,448.90 | −$142,094.56 | 129.28% |
| 2 | Cash Rich, Serial Refinancer With Underwater Property | 1.37% | 100.00% | $5,539.46 | 3.13% | 79.28 | $393,504.66 | −$125,230.96 | 128.68% |
| 18 | Deteriorating Borrower Stranded in Bad Property | 96.09% | 26.16% | $1,262.17 | 36.81% | 8.87 | $276,927.41 | $ 92,090.80 | 128.61% |
| 19 | Mortgage Default in Process | 9.79% | 89.84% | $ 843.92 | 45.67% | 4.94 | $263,328.98 | −$ 98,297.77 | 128.38% |
| 12 | Performing Borrower With Distressed Property | 1.59% | 0.00% | $2,589.61 | 4.01% | 36.45 | $217,882.06 | −$ 64,510.98 | 126.46% |
| 3 | Inexperienced Borrower with Recent Debt Servicing Problems | 1.90% | 99.93% | $2,300.03 | 4.38% | 43.05 | $221,874.06 | −$ 65,563.28 | 124.80% |
| 9 | Highly Leverage Borrower Showing Signs of Strain | 6.46% | 56.28% | $3,576.07 | 17.83% | 25.43 | $290,420.23 | −$ 64,508.98 | 119.34% |
| 7 | Extremely Conservative Borrower with Excellent Debt Servicing Skills | 3.64% | 37.93% | $2,562.99 | 3.20% | 43.86 | $239,133.16 | −$ 44,688.44 | 116.82% |
| 11 | Marginally Performing Borrower with Distressed Property | 3.78% | 51.29% | $3,268.34 | 17.05% | 48.09 | $269,887.61 | −$ 51,645.15 | 115.59% |
| 5 | Overextended Borrower with High Likelihood of Default | 70.60% | 35.45% | $ 875.61 | 30.40% | 9.5 | $250,589.73 | −$ 41,217.03 | 113.62% |
| 8 | Low Capacity, High Distress Borrower | 93.68% | 25.29% | $ 127.51 | 68.89% | 0.44 | $207,237.43 | −$ 35,846.52 | 113.52% |
| 15 | Competent Borrower with Average Property | 2.51% | 56.19% | $2,864.37 | 11.87% | 32.27 | $246,165.78 | −$ 37,612.35 | 113.13% |
| 1 | Repentant BK Borrower | 3.66% | 60.33% | $2,183.98 | 12.86% | 27.28 | $209,486.74 | −$ 33,994.48 | 112.90% |
| 10 | Revolving Abuser With a Cheap House | 3.67% | 43.12% | $2,158.68 | 34.97% | 10.2 | $196,054.60 | −$ 23,778.79 | 110.51% |
| 13 | Highly Inconsistent, Least Experienced Borrower | 63.09% | 32.77% | $ 36.28 | 62.57% | 0.33 | $210,121.28 | −$ 23,248.29 | 106.16% |
| 14 | Cash, Poor, Performing Borrower | 2.66% | 82.34% | $ 473.71 | 19.85% | 11.95 | $275,819.70 | −$ 9,041.89 | 103.41% |
| 6 | Volatile Borrower Putting Mortgage First | 3.32% | 45.49% | $1,727.64 | 31.20% | 7.59 | $185,842.67 | −$ 6,503.17 | 102.85% |

TABLE 4-continued

| Cluster # | Name | 1st Lien Default % | 1st Lien Prepay | Capacity | Distress All | Willingness to Pay | Property Value | Equity | CLTV |
|---|---|---|---|---|---|---|---|---|---|
| 22 | Keeping Mortgage Intact by Abusing Personal Debt | 8.63% | 30.16% | $1,533.96 | 59.65% | 1.4 | $167,929.06 | −$ 5,013.56 | 101.57% |
| 16 | Extremely Consistent Borrower With Performing Property | 0.59% | 0.57% | $2,753.13 | 3.32% | 76.65 | $209,114.42 | $ 15,149.89 | 93.87% |
| 21 | Refinance Prone Borrower with Performing Property | 3.81% | 99.85% | $2,079.87 | 3.84% | 56.36 | $289,575.71 | $ 54,993.37 | 81.19% |
| 20 | Land Baron | 0.61% | 28.23% | $4,680.16 | 3.58% | 53.16 | $745,082.42 | $232,343.12 | 69.35% |
| 17 | Long Term Home Owner With Strong Equity Position | 0.45% | 1.67% | $1,818.41 | 4.01% | 26.55 | 277,483.43 | $ 87,156.89 | 68.91% |

The matrix trained using the models produces one or more outputs. The cluster number may be output. A score may be output, such as one of the metrics associated with the cluster. Other cluster information may be output, including a summary of the expected loan behavior of a borrower based on the cluster. Loan or asset treatment recommendations may be output. Survivability of the loan through different treatment options may be output. An optimized treatment may be provided. Different outcomes given variance in one or more input metrics may be output.

For the scores and cluster information, the first stage of the overall model is performed. For loan treatment recommendation, the cluster behavior may be used as the output. For a more refined recommendation, further modeling, such as based on supervised machine learning, may be used.

Scores and cluster information output by the processor 12 are discussed below. Loan treatment recommendations using further modeling is then discussed.

In one embodiment, the scores are a borrower default score that predicts 1st lien default behavior over a one or two year outcome period. Other lengths of time may be used. The efficiency of the model output of a 1st lien default over one year is shown in FIG. 9. The 1st lien default score provides that over 85% of the not-prime lending could have been accomplished without the exorbitant default rate. Using this score instead of the techniques used in the training data, the lending that was accomplished would have generated default rates only slightly higher than the typical prime portfolio. Instead, the default rates of the training data are 200 times greater than those typical of the prime conforming space (i.e., 20% down with a FICA score of 720 or higher).

Other scores are may be used. Due to the architecture of the matrix generated with machine learning, producing new scores is efficient and fast. Any desired score is used as the output of the unsupervised learning. Factor analysis is performed to determine the input feature vectors to be used. The matrix is trained to cluster based on the input features to provide relevant or correlated groups of borrowers by the desired score. Alternatively, the same clustering is used, but a different score is calculated from the sample data belonging in each cluster.

Information about behavior of the relevant cluster may be output. As shown in Tables 1-4, the machine learned matrix classifies borrowers into a number (e.g., 22) of separate groups based upon the combination of borrower and property characteristics. Within each cluster, the borrower and property behaviors are generally homogeneous, whereas intercluster behavior is generally heterogeneous. Some of that variety is displayed in FIG. 10, which positions each of the 22 groups in a two axis, borrower by property paradigm. In FIG. 10, the borrower factor is collapsed into a single metric, and the property factor is collapsed into a single metric. For example, there are 28 factors that serve to define and create the 22 clusters. Each factor is a vector of one or more (e.g., tens or hundreds) of metrics in the behavioral space. The behavioral space is defined largely by borrower and property behavior, with some influence of product behavior.

The borrower behavior refers to such things as propensity for distress, willingness to pay, capacity to pay, and others. Property behavior refers to such things as property appreciation rate, CLTV and equity, and sale price. Product behavior, which has proven to be much less influential based on the machine determined correlations, includes such characteristics as product type (e.g. ARM v FXD), interest rate and origination amount.

To create FIG. 10, the information from the 28 factors is collapsed into a two-axis array of borrower by property. The two-dimensional array consolidates the impression of the borrower provided by such factors as willingness, capacity, and distress and boils that down to one dimension called "Borrower Quality." Similarly, the property axis takes factors such as appreciation rate, equity, CLTV and value/price and morphs that into one dimension called "Property Value." In effect, this consolidation process reduces a 28 factor array into a 2 factor array. The consolidated borrower quality and property value axes are created by inputting all of the metrics to calculate the original 28 factor array and then asking the factor analysis software to construct a two factor array from a set of metrics that could produce 28 factors. The resultant is the two factor array Borrower Quality v Property Value. The composition of these two factors is due largely to the underlying data trends, which segregates borrower behavior from property behavior, since one is essentially statistically independent of the other. Once the two factor array is produced, the statistical relationship between each metric and each factor leads to a formula from which any borrowers/property's position in the two factor array can be determined.

FIG. 10 shows relative positions between the clusters based upon the quality of the borrower verses the value of the property. The diameter of each cluster correlates with that cluster's history of 1st lien default. For example, cluster 8 has a greater diameter than cluster 16, which corresponds to default rates of 93.68% and 0.59%, respectively.

The position of cluster 8 on the borrower axis indicates that the cluster 8 borrower has the most limited debt servicing skills. Cluster 8 is the farthest left on the borrower axis. The cluster 8 borrower represents a borrower with high levels of distress, very low capacity and very low levels of willingness. The property dimension for cluster 8 reveals a property with above median performance. The property owned by borrowers in cluster 8 has above median equity, below median CLTV and is most likely positioning in a moderately efficient real estate market. Nonetheless the probability of default for the cluster 8 borrower is extremely high—93.68%.

Regarding cluster 18, another default prone borrower (probability of default is 96.08%), the cluster's positioning on the borrower axis indicates a borrower that also has very limited debt servicing skills. However, this borrower also owns a property that is behaving quite badly. The positioning of the cluster 18 property shows that it is very low on the property axis, such as having very negative equity, a very high CLTV (in excess of 125% on average) and other less-than-attractive metrics.

In contrast, clusters 16 and 2 are positioned on the property axis very similarly to clusters 8 and 18, respectively. However, the probability of default for the borrowers in clusters 16 and 2 is virtually non-existent and extremely low relative to borrowers in clusters 8 and 18.

The relative positioning of clusters 2, 8, 16, and 18 reveal a little understood fact about default behavior. Default behavior is driven far more by the behavior of the borrower than by the behavior of the property. A borrower's debt servicing skills, in particular his/her propensity for distress and lack of willingness, are driving the borrowers in clusters 8 and 18 into default, despite the relative differences in their property's behavior.

Clusters 5, 8, 13 and 18 are all positioned similarly on the borrower axis, but are distributed more widely across the property axis. All four of these clusters have a very high propensity to default in the past (70.60%, 93.68%, 63.08, and 96.09%, respectively). Moreover, these Clusters also have a default probability that is far higher than any other cluster. The next highest default rate cluster 19 has a default rate of 9.69%. The remaining clusters have defaults rates hovering at approximately 3%, with a few higher and many with rates less than 3%. There are many clusters positioned in the weak debt servicing portion of the borrower axis that are not highly likely to default. These include clusters 6, 9, 10, 14, 19, and 22. Each cluster contains a profile of behavior than cannot be entirely represented merely by a two-dimensional array of borrower and property.

The general indication provided by the two-dimensional array may be output for use in determining loan treatment. Examining clusters on the right hand side of the borrower axis reveals the tendencies of borrowers who possess excellent debt servicing skills. These borrowers have high willingness and capacity ratings and low distress ratings. Notice that none of these clusters has a high probability of default, despite the behavior of the property.

Borrower-behavior-driven explanation of default may provide insight not available using only property based scoring. However, there is a property driven default rationale. The rationale for property-driven default behavior follows the rational-actor mentality. In effect, since this property is now "worthless and over-priced," why should the rationally acting borrower continue to pay this over-priced mortgage? Nonetheless, almost all of these borrowers are servicing their mortgage under its original terms, despite the poor behavior of their property. However, foreclosures may be induced by "rational actors" to receive a more "affordable" mortgage.

Each kind of borrower experiences different levels and kinds of distress and copes with that distress in a manner consistent with his/her profile or cluster. Not surprisingly, each kind of borrower has a different appetite and capability for loan modification. For simplicity, five borrower groups (clusters 2, 8, 10, 19 and 20) are discussed in more detail below. Information from this discussion may be output to assist a loan servicer. These five different kinds of borrowers and their properties differ, and those differences affect their appetite and performance relative to loss mitigation treatments, such as loan modification and/or sale (e.g., short sale).

Group 19 is labeled as the sink or swim borrower. The sink or swim borrower is experiencing both debt servicing and property distress. This type of borrower has high distress (>45% across all types of credit), low willingness (<4 on a 1-100 point scale) and low capacity (<$900/month). Unfortunately, his/her property behavior is also a source of distress, with high negative equity (approximately −$100,000) and high CLTV (>125%). The treatment of this borrower offers few attractive options. Neither the borrower nor the property can serve as an asset. With sink or swim borrowers, the relative economic value of treatment types across loan modification, some form of sale and/or foreclosure is limited. In particular, the net present value (NPV) between loan modification and short sale is small, such as less than $3,000. Loan modification failure is common. For every 100 distressed borrowers in sink or swim, less than 30% complete the loan modification documentation and trial period. Of those that complete the trial period, less than 10% actually survive the first year. In effect, for every 100 distressed sink or swim borrowers who are offered a loan modification, 3 or fewer successfully survive 12 months of servicing a modified loan. Fewer survive 24 months. Short sale, while an option, requires extensive borrower cooperation, which is often limited. Short sale in this group also requires aggressive price reduction, which lowers the overall economic value of this treatment. A deed in lieu of foreclosure might be an attractive treatment for a distressed sink or swim borrower.

Group 8 is labeled a default machine. A default machine borrower is experiencing exceptional debt servicing distress and is "the most likely to default" borrower in the population. He/she is also "the least likely to survive" a loan modification, even with principal reduction. The default machine borrower is the most distressed borrower in the population (10+ distressed credit relationships). His/her capacity is also exceptionally low (<$500/month), as is his/her willingness (<2). However, the property CLTV averages approximately 100% if priced at full retail and 110% if priced for REO Sale. While this borrower is even less valuable as an asset (cash producer) than the sink or swim borrower, the default machine borrower has a much better performing property, which has cash producing capability. This property could be sold readily with only a modest discount, making some form of sale economically attractive. The economic value of loan modification with default machine borrowers is low, even if redefault is avoided for more than 24 months. To achieve a low rate of redefault performance, this borrower needs an exceptionally generous payment reduction (60+%). This reduces loan cash flow and overall value extensively, making it less economically desirable than some form of sale. Adding to the overall low cash flow is the additional threat of redefault which is always present with this borrower, regardless of the generosity of the terms.

Group 10 is labeled the credit card junkie. The credit card junkie is experiencing debt servicing distress, but not with his/her mortgage. This borrower's source of distress is concentrated in the revolving debt (credit card) segment of his/her credit portfolio. Compared to other kinds of borrowers, the credit card junkie has above median capacity (>$2,000 per month), high distress (>35%) and moderately low willingness (<10). This borrower has one of the least expensive properties in the population (<$195,000), with a retail sale CLTV of 105% and a REO sale CLTV of 116%. The credit card junkie is moderately-highly responsive to loan modification. The credit card junkie has only moderate to poor cash to cope, which indicates that this borrower is having problems coping with his/her distress. If the credit card junkie can obtain some debt servicing relief through loan modification, he/she is likely to continue to service his/her mortgage and possibly pay down revolving obligations. However, it is important that the credit card junkie chop up his/her plastic and reduce credit card spending and impulsive buying.

Group 2 is labeled as the refi group. The refi group has a much different form of distress than the preceding types of borrowers. The refi group borrower is very prone to refinance (hence the name) and is one of the best debt servicing borrowers in the population, with high capacity (>$5,500/month), high willingness (>75) and virtually no distress (<4%). However, the refi group's property is his/her source of distress. Many refi group properties have suffered tremendous depreciation, with CLTV's in excess of 200% and negative equity often greater than $300,000. Clearly, in this case, the borrower, not the property is the asset. The refi group is highly likely to survive a loan modification, but only if principal reduction is involved. A payment-reduction-only loan modification is much less appealing. This borrower can readily service the original mortgage, so the payment is not his/her problem. His/her interest is in turning the property from a liability into an asset (i.e., turning negative equity into positive equity). In terms of relative economic value (NPV), loan modification with principal reduction is economically superior to short sale. While the loss severity associated with principal reduction loan modification for the refi group property is severe (35+%), the loss severity generated by some form of sale is often in excess of 50%.

Group 20 is the labeled the land baron group. The land baron is well positioned in life and with respect to his/her credit and property. The land baron suffers virtually no types of distress, either debt servicing driven or property driven. His/her capacity and willingness are high and his/her distress is exceptionally low. The behavior of his/her property is excellent, with a low CLTV (65%) for a house typically valued in excess of $750,000. The equity is positive and high. While this borrower rarely suffers any form of distress, should he/she enter that state, most likely either the borrower or the property could serve as an asset. Unless the land baron has suffered a long-duration life event (e.g. illness), he/she is a good bet to perform well in loan modification, even one with modest reduction in terms. The land baron's property can also be sold quite readily, should he/she want to vacate the property (not that likely).

Other groups include Pauper-With-A-House (#13), Cash Out Refi (#14), Playing in Traffic (#22), Starter Home Owner (#6) and Cliff Dweller (#5). These groups represent the "typical" borrower that was subjected to loan modification during 2008 and 2009. They are discussed in more detail in Table 5, below. This subpopulation represents over 90% of the loan modification population, which includes over 500,000 loan modifications.

TABLE 5

Profiles of Typical Loan Modified Borrowers

| Cluster | Name | Discussion |
|---|---|---|
| 5 | Cliff Dweller | This borrower is most distinguished by having one of the worst Affordability ratings in the population (Capacity v Home Value) and also by his/her exceptionally low Capacity and Willingness to Pay. This borrower is just hanging on and currently has purchased more property than he/she can afford. This borrower is highly likely to default on the original loan, fail at loan modification and incur foreclosure/REO. |
| 6 | Starter Home Buyer | This borrower is one of the least experienced borrowers in the population who has purchased the least expensive property. The borrower Volatity is high, suggesting very inconsistent debt servicing over a long period. While Distress levels in non-mortgage debt are growing, this borrower is managing to keep his/her Distress, Mtg at median levels (3.32% default rate, for the time being). Among the typical Loan Mod population, this borrower has one very significant feature: he/she borrower has a significantly high Affordability rating, which is due to the combination of higher Capacity and a much cheaper house. |
| 8 | Default Machine | This borrower is the riskiest borrower in the population, with the highest overall propensity to default on almost any debt. He/She has one of the lowest Capacity rankings and the Worst Distress levels across all forms of debt; mortgage, revolving, finance company. This borrower also has an extremely low Willingness rating and an extremely high 1st lien default rate (90+%). However, this borrower owns a relatively inexpensive property, with CLTV and Equity at median levels for this population. |
| 13 | Pauper With a House | This borrower has the second highest BK filing rate and one of the worst Capacity, Wiliness Affordability and Cash to Cope ranking in the population. This borrower's Distress is exceptionally high across all debt types and has the fourth highest 1st Lien Default %. Moreover, this borrower demonstrates inconsistent debt servicing over a multi-year period (high Volatility). This borrower ranks among the most likely to default, foreclosure/REO and one of the most likely to fail at loan modification. |
| 14 | Cash-Out Refi | It is highly likely that this borrower has supplemented his/her lifestyle with Cash Out Refi, since this borrower has one of the highest refinance rates in the population. This borrower also has one of the lowest Capacity rankings as well as similarly low Affordability and Cash to Cope, but unlike borrower Pauper with a House, this borrower is doing far better in terms of Distress even though Capacity Willingness et al profiles are similar; probably due to his/her high levels of Debt Servicing Experience (the best in the population) and income supplementation. |

TABLE 5-continued

Profiles of Typical Loan Modified Borrowers

| Cluster | Name | Discussion |
|---|---|---|
| 22 | Over-extended Borrower | This is a cash poor, high distressed borrower. This borrower has one of the worst Distress levels in the population, with Revolving and Finco debt exceptionally poor. Capacity and Willingness are also quite low. However, this borrower's past mortgage performance is better than expected, most likely due to his/her abuse of Revolving debt and to the fact that he/she has of the least expensive properties in the population with a 101% CLTV. This borrower's Volatility is the worst in the population, meaning that this borrower is often delinquent and his/her debt servicing performance varies widely from month to month. Historically, this borrower has defaulted at low rates on his/her first liens, but going forward the prognosis is much worse. |

The typical loan modification borrowers have two similarities. One is that they are all relatively "low quality" borrowers, with inconsistent and weak debt servicing skills. Secondly, a large portion of them have relatively "high" value properties. A higher value property is one where the CLTV is less than 110% and in many cases less than 100%, and the property is positioned in a relatively "efficient" market, that is one where the days-on-market to sell a property is less than 200. Given the distribution of borrower groups in FIG. 10 and the more detailed descriptions in Table 5 with inconsistent and weak debt servicing skillsers cceed atowers whose current profile left them poorly positioned to succeed, it is clear why the typical loan modification borrower failed at loan modification. Borrowers who had substantial debt servicing challenges were given another debt servicing challenge as a "solution" to their predicament. The very challenge they have been least able to address, now has become their only avenue for "success." Not surprisingly, many of them failed, such as over 75% redefault within the first year after loan modification.

Figure 13:
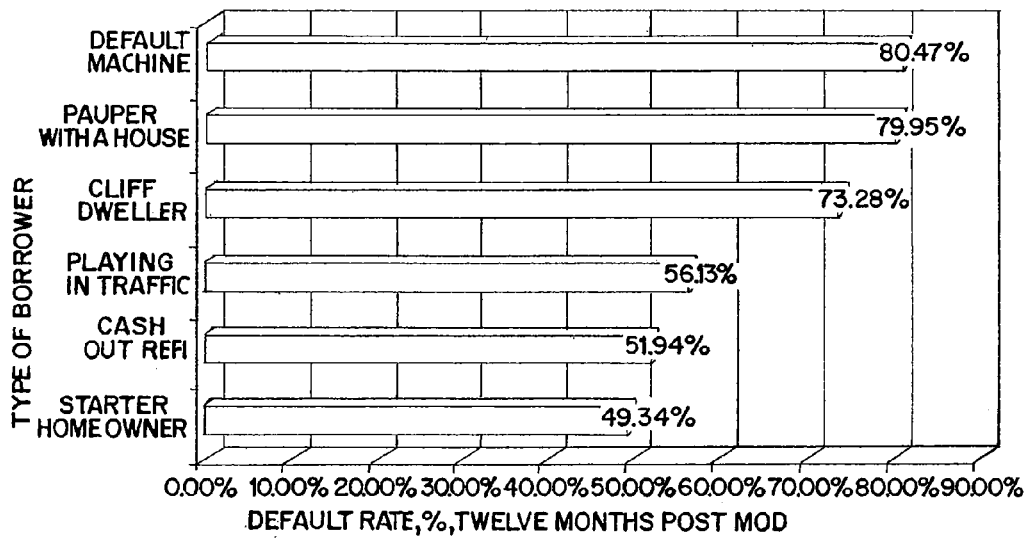
FIG. 13 is a graph illustrating example loan modification default rate.

Given that loan modification success is more of a borrower-centric than property-centric phenomena, the loan modification default rates shown in FIG. 13 result. A borrower-centric phenomena is one in which the profile of the borrower exerts the most influence, whereas in a property-centric one, the property is dominant. The borrowers in this subpopulation (typical loan modification borrowers) have low capacity, high distress and limited willingness, which causes them to fail redefault quite soon post modification.

Some metrics of the typical loan modification borrower are presented in Tables 6 and 7. A review of the typical borrower's capacity, distress and willingness profile shows that these borrowers are distant from the overall population. The capacity levels shown in Table 6 range from $36 per month to a high of $1,727. This means that these borrowers are generating very low amounts of cash each month to service debt and the majority are generating extremely low amounts. Their levels of capacity compare poorly to the non-loan-mod-population, where capacity levels routinely average greater than $2,500 and often exceed $8,000 per month.

There is a similar story for distress and willingness levels of these borrowers. Distress levels are high, and willingness levels are low. The distress levels for the non-loan-mod-population are less than 5% typically, but range from 19% to 63% for the loan modification population. Willingness levels for the non-loan modification population average greater than 30 and can achieve levels in excess of 80. In the loan modification population, willingness ratings range from 0.44 to 11.95. These are relatively low levels, which do not support successful loan modification. A borrower with a distress level of 50%, for example, has twice as many tradelines in "distress" (60+ dpd) than does a borrower with a distress rating of 25%. Willingness is a more complex metric, with an underlying non-linear relationship to the debt servicing skills and problem account restoration skills. Although a borrower with a willingness score of 30 has twice the score of someone with a score of 15, the latter borrower has far less than half the debt servicing skills of the former. Moreover, a borrower with a willingness score of 60 has far more than twice the debt servicing (debt repair) skills of a borrower with a score of 30.

TABLE 6

Typical Loan Modification Borrower Metrics (sorted by default potential)

| Cluster # | Name | Capacity ($/Month) | Distress, All | Distress, Mtg | Distress, Revolving | Willingness to Pay (Scale 1 to 100) | Affordability (Capacity v. Home Value) |
|---|---|---|---|---|---|---|---|
| 8 | Default Machine | 127.51 | 68.89% | 49.62% | 45.66% | 0.44 | 2.69% |
| 13 | Pauper With a House | 36.28 | 62.57% | 29.74% | 32.58% | 0.33 | 6.28% |
| 5 | Cliff Dweller | 875.61 | 30.40% | 29.30% | 17.64% | 9.5 | 0.47% |
| 22 | Playing in Traffice | 1,533.96 | 59.65% | 2.40% | 45.27% | 1.4 | 0.15% |
| 14 | Cash Out Refi | 473.71 | 19.85% | 0.81% | 14.82% | 11.95 | 1.30% |
| 6 | Starter Home Owner | 1,727.64 | 31.20% | 1.24% | 18.72% | 7.59 | 6.13% |

As is shown in Table 7, the typical loan modification borrower has a relatively good performing property. There are properties in the non-loan-mod-population that are performing much worse, with equity levels below −$200,000 and CLTV's in excess of 135%, some groups have CLTV levels over 200%. If the property's performance were an influence in loan modification success, then the typical loan modification borrower would have much more success and much lower redefault rates than he/she does.

TABLE 7

Typical Loan Modification Borrower Property Metrics

| Cluster # | Name | Property Value | Equity | CLTV |
|---|---|---|---|---|
| 8 | Default Machine | $207,237.43 | −$35,846.52 | 113.52% |
| 13 | Pauper With a House | $210,421.28 | −$23,248.29 | 106.16% |
| 5 | Cliff Dweller | $250,589.73 | −$41,217.03 | 113.62% |
| 22 | Playing in Traffice | 167,929.06 | −$ 5,013.56 | 101.57% |
| 14 | Cash Out Refi | $275,819.70 | −$ 9,041.89 | 103.41% |
| 6 | Starter Home Owner | 185,842.67 | −$ 6,503.17 | 102.85% |

As an alternative to or in addition to outputting cluster relevant information based on statistics learned through machine training for clustering, specific loan treatment recommendations may be generated and output by the processor 12. The loan treatment recommendations are determined by application of a machine trained matrix. The matrix is learned separately for each cluster group. The matrix for a given cluster may be separated into different loan treatments. For example, supervised learning is used to determine net present value or survival of the loan (e.g., no default) for each loan treatment separately for a given cluster. A separate machine learned algorithm is provided for each possible treatment for each cluster. For example, given 22 clusters and three possible treatments (e.g., short sale, foreclosure and loan modification), 66 Bayesian or regression based networks are provided. The feature vectors (e.g., factors, metrics, or scores) for each matrix are learned independently by treatment and cluster. Alternatively, an unsupervised approach is used to classify a given borrower, property and/or product into one of several treatment options.

The net present value or other output of the model is determined as a function of any input features. For example, product or loan information and real estate information are used with cluster information (e.g., borrower or property) to determine a value or other result associated with each of a particular loan treatment.

The learned matrices may improve the decision making and execution relative to distressed mortgage assets. Using probabilities or outputs determined through machine learning may increase the efficiency and effectiveness of the loan processing. The borrower's circumstance may be more consistently and correctly diagnosed using automated methodology provided by the matrix. The estimated $100 per loan that is devoted to manual decision time may be reduced, such as reduced to less than $20. This decrease in cost per loan does not come at the expense of decision quality. The consistency and the validity of the loan treatment decisions generated by the machine learned matrix using many training samples more likely ensures that borrowers with similar problems are treated alike and that the treatment offered to them generates mutual benefit or a best result to the lender.

In one embodiment, a servicer-friendly output includes the classification number (cluster #) and the three highest recommended treatments for each of five (5) risk scenarios (treatments) tested. The risk scenarios are based upon housing price index (HPI) changes going forward. As housing prices rise, there is a complex interaction between the behavioral effects of housing price increase, Net Present Value and treatment recommendation. For example, a short sale might be preferred if HPI is close to zero or negative, but a loan modification, even if risky in terms of potential to redefault, may actually have more economic value. In this case, should the borrower redefault (likely in this scenario), the lender would be gaining access to a property that had more value than at the time of loan modification; hence, the lender would have more economically attractive options.

Different treatments are appropriate for different types of borrowers and/or properties. For some borrowers, the net present value is higher where the debt servicing skills of the borrower are leveraged as an asset to produce cash. For some properties, the ability to sell the property quickly is the best way to turn the property into a cash producing asset.

For example, for those clusters with lower borrower risk, a debt restructure strategy may be recommended. The borrower is used as an asset. In this scenario, the borrower is positioned well and can be called upon to help resurrect a distressed mortgage asset. This is true, even if the borrower has incurred a life event, such as loss of job, divorce, or ill health. If unemployed, these borrowers are more likely to get a job faster. If divorced, they are more likely to recover quickly. If ill, their illness is more likely to be of shorter duration and severity. Hence, calling on the people in this population to assist is likely to succeed. The default probabilities of this population are low. Debt restructuring may include a reduction in principal or at least some form of principal forbearance.

Higher risk borrowers are more vulnerable to even the smallest changes in circumstance. Almost all of the population 1st lien defaults occur in this segment. The defaults occur across all levels of property behavior, from the low CLTV (high equity) to the high CLTV (low equity). In fact, more of the defaults seem to occur in populations with median to above median equity. As a result, this borrower should not be leveraged as an asset. However, the property may be leveraged. Where the property is above the median, a 3rd party sale and/or some form of short sale (where the investor reduces the principal owed) may be the optimal strategy. When the property is well below the median, the options become less attractive and usually involve foreclosure. Nonetheless, property-centric options may be preferred overall, due largely to the lack of debt servicing skills on the part of the borrower. While a loan modification may be attempted, the probability of success is extremely low. When a loan modification is attempted, the servicer and the investor are most likely going to get the property back through some form of foreclosure option later. At that point, the property may be worth less due to the decline in the real estate market and/or due to the inattentiveness or outright destructiveness of the borrower.

Using output from machine learned matrix may provide loan modification terms set to avoid redefault. The modification terms may be tailored to the class of borrower. The result of such tailoring may be compared with the net present value for other approaches. How much of a reduction in payment, for example, a given kind of borrower will need in order to reach a targeted default rate may be provided. A function that links specific loan modification terms with redefault rates for any of the clusters may be determined, such as based on machine learning from a training data set of over 500,000 loan modifications.

While there is a strong empirical relationship linking the type of borrower, loan modification terms (e.g. Payment Reduction %) and loan modification pool redefault rates, there are limits regarding how much redefault performance a mortgage holder can obtain. This is particularly true, when dealing with the typical loan modification borrower (i.e., low debt servicing skills, cash poor borrower).

Figure 14:
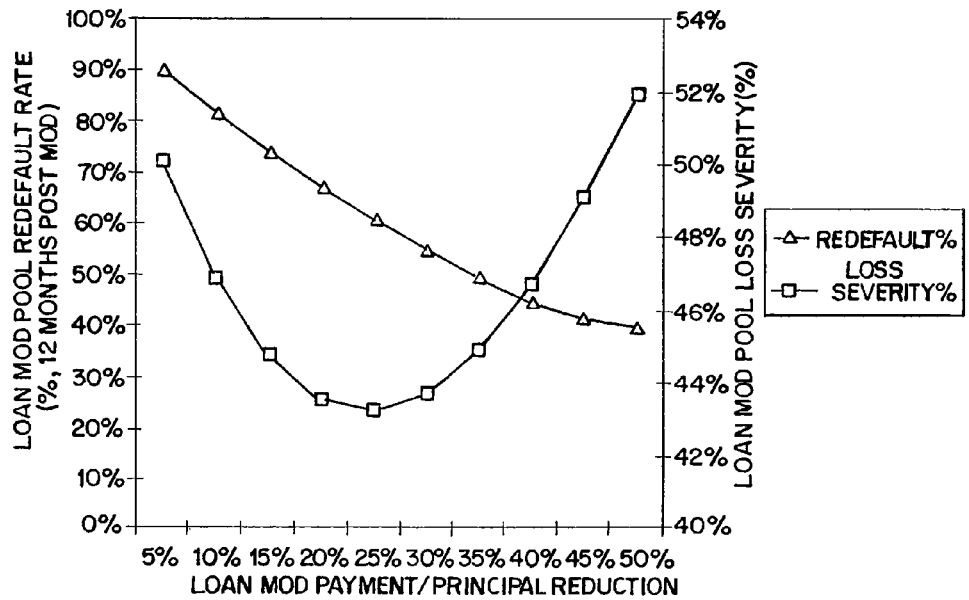
FIG. 14 is a chart representing loan modification analysis in one example.

The matrix may be trained to optimize or determine the redefault or default rate probabilities. The economic impact of optimal terms to avoid redefault or default may be determined based on iterative use of the matrix or based on an output of different probabilities for different terms (e.g., find terms associated with a lowest default rate given limits). The avoidance of default may be provided the optimal economic outcome. The costs of generating acceptable loan modification performance may range from expensive to completely unaffordable, depending upon the specific kind of borrower. FIG. 14 shows the relationship between redefault rate and principle reduction percentage. The biggest cost of loan modification is reduced loan value. Many loan modified borrowers are experiencing high distress levels, low levels of capacity and low willingness levels. Large reductions in terms are needed to attain low redefault rates. Such large reductions reduce the loan's cash flow and overall value, creating a loss.

The cost of loan modification may be measured in terms of loan modification pool loss severity. Loan modification pool loss severity measures the portion of the loan balances that, when treated with a loan modification, result in some form of a loss. Loan modification pool loss severities may reach or exceed 50% for the typical modification population. This means that for every dollar in outstanding balances that enter a loan modification program, the lender is likely to recoup less than $0.50 per dollar. This is true even though the loan modification process is well managed and loan modification redefault rates remain low.

The relationship among loan modification terms, type of borrower, redefault rates and loan modification pool loss severity rates may be complex. That relationship is depicted in FIG. 14. The relationship among loan modification terms (expressed as payment reduction % on the X axis), loan modification pool redefault rates (Y axis, left), and loan modification pool loss severity rates (Y axis, right) is provided for weak borrowers. Weak borrowers are borrowers from the typical loan modification clusters. These typical borrowers make up a consistently large portion of any loan modification pool. Payment reductions represent how much the premodification payment must be reduced (in percentage terms) to reach the post modification payment offered to the borrower. In this paradigm, higher percentages indicate more payment reduction during loan modification. If the premodification payment were $1,000 and the post modification payment were $600, the payment reduction % would equal 40% ($400/$1,000). The loan modification pool redefault rate represents what the redefault rate for the entire pool would be after 12 months. As is shown, the loan modification pool redefault rate declines with successive levels of payment reduction.

To calculate loss severity for the loan modification pool, every loan modification that succeeds is assumed to create a loss severity equivalent to its payment reduction. So, a $200,000 pre modification loan balance, if modified to produce a payment reduction of 20%, generates a loan worth $160,000 (80%*$200,000), given that the borrower successfully services this modification. Given the an aggressive decline in housing prices and lack-luster housing environment, for the next few years (5+), a Short Sale is assumed to be needed for a successful loan modification borrower to exit his/her property. For the sake of simplicity, this loan modification—short sale process is assumed to result in a loss severity equal to the payment reduction %. It is also assumed that every time a loan modification redefaults, the loan is moved to a foreclosure/short sale process that results in a loss severity of 55%, a conservative assumption. Many servicers report loss severity of 65% or more after a loan modification failure. This assumption causes loan modification pools with very low loan modification redefault rates to move a lower portion of their properties down a higher loss severity path. Loan modification pools with much higher redefault rates move a much larger portion of their properties down a higher loss severity path.

As is shown in FIG. 14, the continued reduction in payment results in reductions in redefault rate. The slope of the redefault rate begins to flatten out once payment reductions exceed 25%, creating diminishing returns. Successive default rate reductions "buy" less and less improved redefault performance, creating a situation with diminishing returns. Even though loan modification pool redefault rates continue to decline with successful payment reductions, there is a point beyond which "buying" additional improved redefault performance with increased payment reduction is no longer economical. When this occurs, the negative economic impact of payment reductions on loan value begins to outweigh the positive impact of reductions in redefault rate as reflected by the upturn in loss severity rates when payment reductions exceed 25%.

Even with 50% payment reduction, loan modification pools populated with the typical borrower still generate unattractively high redefault rates. These borrowers may have difficulty achieving loan modification pool redefault rates under 40%, even with very generous terms. Moreover, achieving that level of performance is expensive, such as having a loss severity exceeding 50% for these clusters. Including loss severity as a potential outcome of loan modification shows that large scale loan modification may be exceptionally expensive, perhaps too expensive. There may be levels of loan modification redefault performance that, if purchased, cause many mortgage holders severe financial distress. The expense rises to stratospheric levels, if the investor is dealing with either a weak borrower, exceptionally low redefault rate requirements, or both.

The simplifying assumptions made make the determination of the precise optimal payment reduction difficult. By using machine training, the matrix may provide a more optimal loan treatment. The machine training creates a classifier or model, implemented by the processor 12, configured to output a loan treatment for a given borrower of a given loan. Using a specific situation, the matrix outputs information about one or more loan treatments relative to that specific situation. The specific situation may be represented by credit report information, property information, loan information and real estate market information. By training based on many samples, one or more of modification of the loan, foreclosure of the loan, short sale, and forbearance loan treatments may be indicated as more optimal than other loan treatments. Any criteria may be used for training and as the resulting output during application. For example, the matrix is optimized to indicate the net present value of the property for one or more loan treatments. One common or separate loan treatment classifiers (learned matrices) output the result associated with each loan treatment. Each classifier is learned separately for each cluster.

In FIG. 25, an empirical example demonstrates the financial success of matching the treatment to the borrower and property circumstance. The matrix produced output is compared to universal foreclosure (always foreclose for late payment), universal loan modification, or a universal short sale scenario. Optimizing based on each particular situation with the processor 12 may not incur the opportunity cost of the universal foreclosure. Optimizing also may not incur the opportunity cost of the universal short sale, wherein any property where the borrower is in distress is sold at an aggressive discount to mitigate future problems. When the universal short sale is applied, many properties owned by a borrower that would make good loan modification candidates are overlooked. Moreover, too many properties are sold at too aggressive a discount, reducing their overall ability to generate cash. The universal loan modification incurs substantial costs when a large portion of the modifications fail and the servicer has to put a further depreciated property onto the market at a later date, thus depressing overall returns.

By optimizing, the short sale, the loan modification and the foreclosure treatments are applied based on the data for a given situation. The loan treatments are applied when there is ample evidence of their appropriateness. If the treatment is borrower centric (e.g., loan modification), the methodology determines if the borrower can and will execute. If the treatment is property centric (e.g., short sale), the methodology determines if the property and its local real estate market are sufficiently robust to support the treatment. And, if neither the borrower nor property centric treatment is appropriate, some form of expedited foreclosure is initiated.

By using the processor 12, the appropriate loan treatment may be determined for many borrowers and loans. The process occurs individually or as part of a batch. The processor 12 optimizes the loan treatment for each borrower and loan quickly without requiring time consuming research by a person.

For training the classifiers for each cluster, training data is used, such as over 300,000 loans. Where supervised learning is used, a ground truth is determined based on what was manually considered the most optimal loan treatment, either upon review or at the time of mitigation. The consideration is for what kind of loss mitigation treatment is optimal for the borrower and most economically attractive. The borrower population includes a mix of distressed borrowers and properties that were typical for the industry. The training data may be updated periodically to better represent the current market. The analysis assumed generic forms of loss mitigation treatment, including loan modification, sale and foreclosure. More specific loan treatments may be used.

Figure 15:
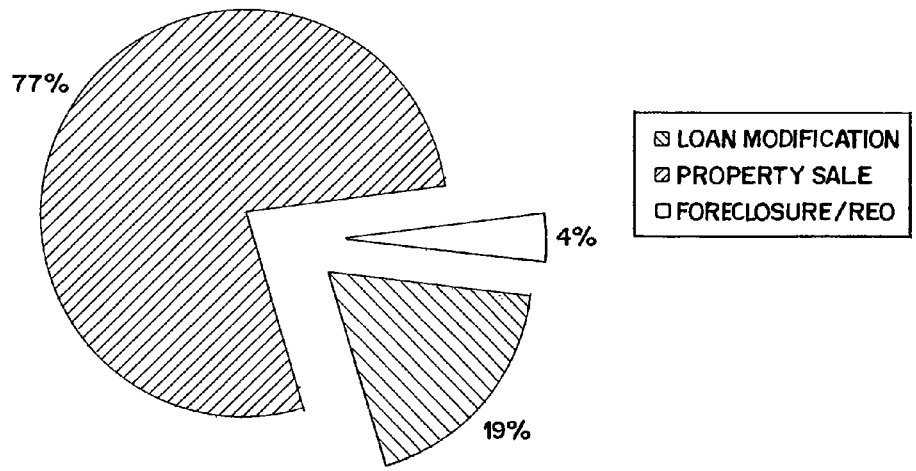
FIG. 15 is a pie chart of loan treatment recommendations according to one embodiment.

FIG. 15 shows a distribution of treatment recommendations for the loans submitted by customers for processing. The recommendations presented in FIG. 15 are consistent with the characteristics of the borrowers and properties in the typical sample. Typically, the borrowers are relatively low quality, whereas the properties are represent relatively higher value. Hence, the matrix recommends more property sales than loan modifications, given the HPI scenarios used for processing, which project HPI to remain flat for the foreseeable future. The results reveal how the loss mitigation treatments are distributed across the borrowers in the sample. The analysis estimates the behavioral and economic impact of loan modification, sale and foreclosure. The analysis tests each distressed borrower against a portfolio of treatments to determine which treatment is most likely to be accepted and performed by the borrower (behavioral effects). The analysis also determines the economic ramifications of each treatment, given the behavioral effects. The economic ramifications (net present value of future cash flow per treatment) include a term that estimates the probability of borrower acceptance and performance, as well as the normal economic assumptions.

Loan Modification Is an optimal solution for less than 20% of the borrowers. These borrowers had a Loan Modification profile as borrowers with relatively high capacity, high willingness and low distress. Over 80% of the borrowers do not have a loan modification profile. Their profile showed that they are likely to redefault under the terms tested (i.e., payment reduction 20%, no principal reduction). A large portion may redefault under even more generous terms. For these borrowers, some form of sale is recommended. In many cases, in addition to the borrower's high tendency to redefault, the property owned by these borrower's is performing relatively well. The property has far more cash producing capability than the borrower.

Principal reduction is of value in only a small percentage of the distressed borrower population. Referencing FIG. 10, only those borrower groups in the quadrant where the borrower is rated as high quality and the property is rated as low value are influenced by principal reduction (e.g. refi group, #2). The refi group has no debt servicing problems, so his/her only problem is the performance (high CLTV, >200%) of his/her property. A principal reduction allows retention of interest in loan modification as this borrower may more easily afford the original mortgage. Any of the borrower groups in the quadrants where the borrower is rated as low quality are relatively insensitive to principal reduction (e.g. Default Machine, #8; Pauper With a House, #13; Cliff Dweller, #5). These kinds of borrowers have a much broader set of debt servicing problems than does a borrower in the refi group. Lower quality borrowers often have 10 or more seriously delinquent (60+ DPD) credit relationships. These borrowers are unable to service many of their credit card, finance company and auto trade lines, as well as their mortgage. For these borrowers, servicing any kind of debt, no matter what the payment, is a distinct problem.

Payment reduction might be of interest to the Sink or Swim (#19) or Desperate Household (#18) borrowers. However, this kind of borrower's debt servicing problems are so extensive, the motivational impact of principal reduction for Desperate Household and any other low value property and low quality borrower population is very limited. These kinds of borrowers have a very poor track record at fixing problem debts. This is true, even though their lender may offer to reduce the payment and the principal owed. Nonetheless, these borrowers are often unable (or unwilling) to take full advantage of the lender's generosity.

The results of FIG. 15 are affected by processing assumptions, which assume a flat to declining housing price index (HPI) and a 12% discount rate. The proportion of the treatment population devoted to loan modification may increase with a substantial uptick in the HPI and a dramatic reduction in discount rate. If the HPI uptick is immediate, some form of sale may outperform.

In one embodiment, the processor 12 is configured to apply the model as a function of a loan retention variable or other user input. For example, an input feature is the desire of a lender to retain the loan. A scale or indication of level of this desire may be provided. This value is used to adjust the output recommendation, select the appropriate classifiers, and/or as input to the classifiers. For example, the classifiers are trained by adjusting the ground truths based on the retention level. The output loan treatment level is a function of the value of loan retention variable.

The display 16 is configured, by the processor 12, to output the loan treatment. The output and/or inputs may be displayed to a user on the display 16. The display 16 is a CRT, LCD, plasma, projector, monitor, printer, or other output device for showing data. The display 16 is configured to display an image. The image may be of a user interface, charts, graphs, values, or other information, such as the loan survival prediction, net present value prediction, loan treatment, cluster information, or other outputs. For example, a plurality of loan treatments for a given borrower and property are output with a ranking. A net present value, 1st lien default, and/or other information supporting the ranking may be output as well. A probability associated with each loan treatment may be indicated, such as the likelihood of 1st lien default given a particular loan treatment. More than one likelihood may be output, such as a graph representing the probability of survival as a function of time. The display is text, graphical, or other display.

The processor 12 operates pursuant to instructions. The instructions, model, classifier, matrix, image data, borrower characteristics, property characteristics, real-estate market information, product information, and/or results are stored in a computer readable memory, such as external storage, memory 14 (e.g., cache, system memory, ROM and/or RAM). The instructions for implementing the processes, methods and/or techniques discussed herein (i.e., data analytics in loan processing) are provided on non-transitory computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system. Because some of the constituent system components and method acts depicted in the accompanying figures may be implemented in software, the actual connections between the system components (or the process steps) may differ depending upon the manner of programming.

The same or different computer readable media may be used for the instructions, the data for application of the model (e.g., current borrower), the model, and the database of previously treated borrowers (e.g., training data). The borrower records are stored in the external storage, but may be in other memories. The external storage or the memory 14 may be implemented using a database management system (DBMS) managed by the processor 12 and residing on a memory, such as a hard disk, RAM, or removable media. The external storage may be implemented on one or more additional computer systems. For example, the external storage may include a data warehouse system residing on a separate computer system. The external storage, an internal storage (memory 14), other computer readable media, or combinations thereof store data for at least one borrower record for a borrower. The borrower record data may be distributed among multiple storage devices.

The predictions provided by the machine trained matrix may be changed. The training data is acquired again or is still available. For example, the database contains a huge sample of credit card and auto behavior. Training the model to cluster and/or indicate a loan treatment for non-mortgage loans may be performed.

For mortgage loan treatment, predicting 1st lien default given various treatments with a machine learned matrix may outperform other or traditional indicators. Borrower-intensive information (e.g. consumer credit reports) may be used to outperform the more traditional data sources used to predict mortgage related behavior. This use of borrower data may substantially outperform traditional data, such as property, product and transaction data. Property data in this case refers to equity, sales price and CLTV. Product data refers to loan product selection (ARM v Fixed), interest rate and origination amount. Transaction data refers to FICO@Origination and, LTV@Origination.

Figure 12:
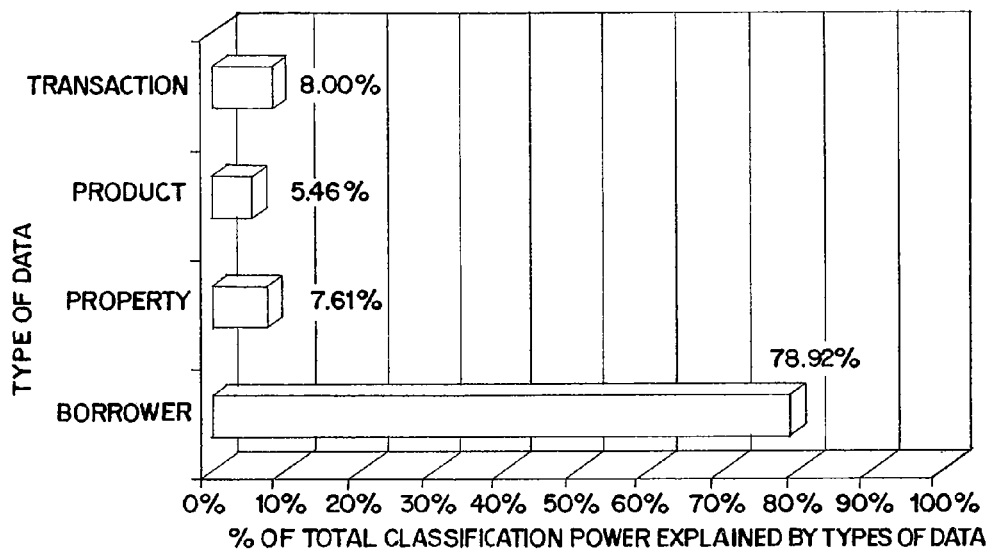
FIG. 12 is a graph showing classification power according to one embodiment.

FIG. 11 shows the % variance explained by type of data in 1st lien default predictions. FIG. 12 shows the % of classification power in clustering. The matrix owes a great deal (over 75%) of its prediction and classification power to use of consumer credit data on the borrowers. Knowing the borrower may be important for loan origination, loan modification, and not-prime (Alt-A, Subprime) lending. The success and failure of not-prime lending begins and ends with the borrower and his/her debt servicing skills. The borrower's performance more likely determines default. The borrower data may better predict future default than property or product data. Trends related to the property and the product acting as complements for modeling default behavior. In statistical terms, the borrower behavior creates strong, main effect trends, whereas the product and property behavior is involved with secondary, higher order trends. Higher order trends usually involve an interaction of property trends, for example, with another trend, such as borrower behavior.

By using machine training, the recommendation for loan treatment may be based on a combination of metrics. The metrics having the greatest influence on net present value and/or default may be determined statistically and used to recommend loan treatment. Due to the nature of the learned matrix or matrices, large amounts of borrower data or variables may be used. The training may be oriented to borrower-centric modeling, such as through the selection of factors metrics. Consumer credit, property, product, treatment and real estate market data are linked into a single, integrated loan database. The creation of the matrix allows researches draw insights and conclusions that were previously difficult to make. The learned models may use more complex borrower behavior, not just the events related to his/her behavior (default, prepayment, and loan product choice). For example, over 20,000 data metrics, of which over 95% related to the borrower, are extracted with all or a subset being used for the matrix.

Figure 16:
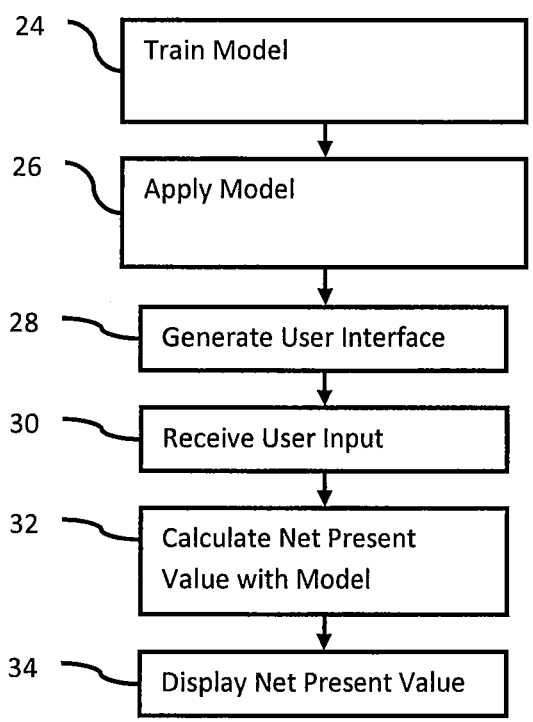
FIG. 16 is a flow chart diagram of one embodiment of a method for data analytics for loan treatment.
Figure 24:
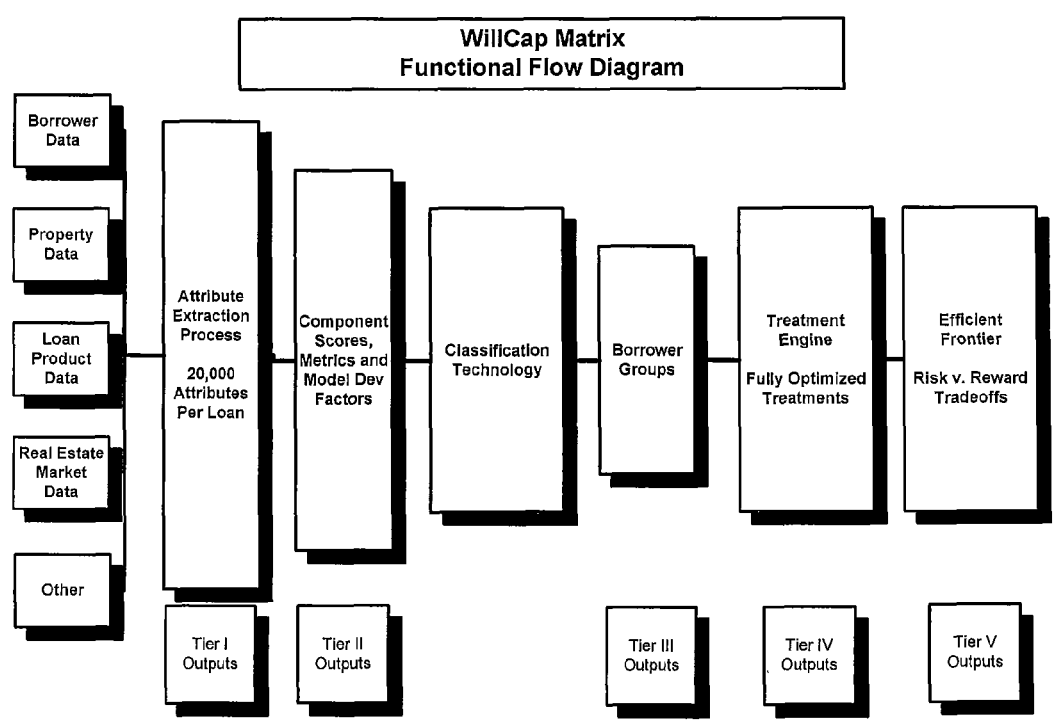
FIG. 24 shows a functional flow diagram of one embodiment of a method for data analytics.

FIG. 16 shows a method for data analytics in loan processing. FIG. 24 shows an alternative functional flow. The methods are implemented by the processor 12 of FIG. 1, the architectures of FIG. 2 or 3, or other systems. The methods are implemented to machine train one or more matrices and/or to apply one or more matrices. The matrices turn the process of diagnosing and analyzing a loan (or any type of account) into a scalable information processing process.

A model is created and/or applied using borrower and other information. Any information may be used, such as credit reports, product information, property information, and/or real estate market information. The same or different systems may perform creating and applying the models. For example, one computer is used for development, and a different computer is used for applying the developed models. The models may be developed, and then sold or otherwise distributed for application by others. As another example, users of the developed models are charged. Users request predictions from the developer, so the model is applied by the same computer used for development or by different computer controlled by the developer.

The acts are performed in the order shown or a different order. Additional, different, or fewer acts may be provided. For example, act 30 is not provided. As another example, the model may be applied without generating a graphic representation.

In act 24, the predictive model is trained. The model is trained with training data. Machine training is used due to the large amount of data. Manual training may be prohibitive. The model is trained to predict a value for one of the variables, such as training to predict survivability of a loan (default). In one embodiment, the model is trained to cluster borrowers. Other models are trained to predict default probability for each possible loan treatment based on training data specific to each cluster and possible loan treatment.

In one embodiment, a cluster-based model is trained in an unsupervised manner for assigning borrowers and properties to groups. Other or the same type of model is used in a supervised manner to predict a result (e.g., default) given the cluster and loan treatment.

The machine training uses training data for a plurality of previous borrowers. Any number of borrowers may be included in the training data. The training data includes values for the variables (metrics) of the borrower, property, product, and real estate market. Data for a particular borrower included in the training data may or may not include the same variables as others. The training data used for training may exclude data for borrowers with incomplete information or may include the data.

For unsupervised learning, the training data is not labeled. Instead, correlations or relationships are learned. For supervised learning, the training data is labeled as appropriate for the desired outcome, such as indicating default within a time period. The machine-learning algorithm or algorithms are selected. Any now known or later developed algorithm and process for training may be used.

The trained classifier may be validated using the training data. Any validation may be used. For limited training data sets, random selection of training and testing data may be used with much iteration to create a more reliable model. A five-fold or other cross validation is performed. A leave-one-out approach may be used. As another example with a large training data set, a group of borrowers may be used for validation and not for training.

In another embodiment, the trained classifier is validated using a separate set of training data. In yet other embodiments, validation is not performed.

Once created, the model or models are incorporated onto a computer, such as into hardware, software, or both. The incorporation allows operating, with a processor, combined models or a single model. Values for the feature vectors of the models are obtained. The model is applied to the individual borrower, property, product, and real estate market information.

In act 26, the trained predictive model is applied. After training, the model may be applied for one or more individual borrowers. Information for the borrowers is received. Modeling with the computer allows for situations specific classification and/or prediction. The modeling uses large numbers (e.g., hundreds) of inputs to predict or classify for a given situation. The computer may operate more efficiently with such large amounts of information as compared to a manual process. Accordingly, the process may be repeated for each of a plurality of specific borrowers and properties.

As part of the application, a user interface is generated by a computer in act 28. The user interface allows for user control of the application. The user may select a specific borrower or borrowers to be analyzed. The user interface includes a display and user input, such as a mouse or keyboard. A personal computer, terminal, workstation, server or other computer generates the user interface.

In act 30, the user may indicate the values for one or more parameters to be used, such as inputting different loan treatment values (e.g., amount of principle reduction). The user may indicate the values for one or more metrics as an alternative to extraction from a database. For example, the user inputs loan product information being considered for a given borrower. The loan product information is feature vector information used by the modeling as an input.

In response to the user input, the computer receives the indication of the property value, a loan term, a loan modification, other information, or combinations thereof. The data is input manually. For example, the computer receives an indication of a level of retention for the loan from the user interface.

Other information, such as the feature (e.g., factor and/or metrics) information is received in response to a request. For example, a processor requests acquisition of the data from a database. In response, the requested information is transferred to and received by the processor. Alternatively, the information is pushed to the processor. The receipt may occur in response to user input or without direct user input.

In act 32, the computer calculates a net present value as a function of a machine-trained model. The received indication and other metrics, or factors are input as a feature of the machine-trained model. The values of the variables are inputs a feature vector into the matrix.

In one embodiment, the metrics include a borrower feature vector of metrics extracted from credit data. The training determines the metrics to be used by the machine-trained model. In this embodiment, at least some of the metrics relate to borrower specific metrics. Any number of borrower specific metrics may be used, such as at least one hundred (e.g., 1,028) metrics extracted from a credit report. Borrower loan behavior is modeled from credit values for a borrower. Statistical or correlation analysis identifies the borrower loan behavior metrics of interest from programmer grouped borrower loan behavior metrics. For example, a distress factor, a capacity factor, and a willingness factor are calculated for training. For application, the data for the factors are collected or otherwise calculated for application to the matrix. The distress, capacity, and willingness factors each include one or more metrics to be input as the feature vector for the classifying. For example, the distress factor is an indication of debt servicing distress of the borrower and is calculated as a function of trade lines for revolving credit, auto credit, finance company credit, or combinations thereof.

In one embodiment, the metrics include a property feature vector of metrics determined from data specific to the property and from real estate data for a region associated with the property. The property factor is determined from statistical, correlation, or manual analysis. The machine learning may refine or select specific metrics to be included in the property factor. The property factor models property behavior from property characteristics for a property associated with the borrower and loan. For example, the property factor includes a calculated property value factor, a combined loan to value factor, and an appreciation factor derived from the property characteristics and real estate market information. Each of these factors may include one or more metrics for input as a feature vector for the classifying.

In one embodiment, the metrics include a loan feature vector of metrics determined from data specific to the loan. The loan factor is determined from statistical, correlation, or manual analysis. The machine learning may refine or select specific metrics to be included in the loan factor. The loan factor models may include a loan feature vector for loan terms of the loan. The loan factor may be used for clustering or may be used for other stages, such as recommending treatment from a separate classifier based on clustering of the borrower and property.

The learned interrelationships of the various input vector values indicate an output for the given situation. For example, the borrower and property information associated with a specific borrower and property are applied to the matrix. The borrower is classified into one of a plurality of clusters based on the modeled borrower loan behavior and the modeled property behavior. The output is a classification of the borrower and property into one of a plurality of groups. Alternatively, the output of the matrix is a value, probability, loan treatment recommendation, or other output.

The output may be used as an input to further modeling. In one embodiment, the cluster output is used to select the further classifier or classifiers with which to determine another output. For example, the cluster is used to select a plurality of classifiers, each for a different loan treatment. The default or net present value is determined for the borrower for each treatment from the respective classifier.

The loan feature vector may be input to the cluster classifier or is input into a different classifier, such as the group of classifiers selected based on the clustering from the borrower and product information. For application by one or more classifiers in parallel or sequence, the borrower, property, and loan feature vectors are input into the machine-trained model.

The classifier or classifiers of the model output information based on the input. In one embodiment, a percent chance of default is determined from or as the output. For example, the percent chance of default is known from the cluster to which a borrower is assigned. As another example, the percent chance of default is determined based on the cluster, the type of treatment, and other information (e.g., loan information).

A loan treatment may be output. The loan treatment indicated by the machine learned algorithms as associated with the least chance for default or the greatest net present value is output. For example, the loan modification is output where the borrower loan behavior is modeled as able and willing to execute. The short sale is output where the property behavior is modeled as able to support short sale. Otherwise, foreclosure is output. All of the loan treatment options may be output, but with an indication of rank or priority.

The model outputs an expected outcome for the particular borrower, such as a probability of survival over two years given or not given a loan treatment. The values available for the current borrower are input to a computer, such as by manual data input and/or data transfer. The processor calculates the result from the values and the learned probabilities or matrix of the model.

The model is used to answer probabilistic queries on variables in the network. For example, survival is predicted. Probabilistic inference, the process of computing the posterior of a given node or a subset of nodes in light of evidence observed on the remaining variables, provides the probability of survival given the observed values included in the network structure. For exact inference, a junction tree algorithm is used, but other algorithms may be used.

The net present value of each form of treatment or outcome is generated by an expert system using discounted cash flow methodology. The probabilistic estimates generated by the model influence the net present value for each treatment considered. For example, the likelihood of loan modification redefault affects the estimate of the cash flow emanating from that loan modification for that specific borrower. If redefault is most likely by month 12, for example, the only cash flow from periods 1-12 is considered for analysis by the discounted cash flow methodology. Moreover, after month 12 in this example, the property associated with this borrower (and loan modification) is then assumed to be sold at prevailing market conditions as estimated by such statistics as time-on-market, housing price index changes and other relevant market statistics. The net present value of this loan modification is then the cash generated by the loan payments and the cash generated by sale, discounted at a meaningful discount rate. The morphology applied to other treatments (outcomes) is similar to that for loan modification. The cash projected to be provided by the borrower is complemented by the cash projected to be provided by the sale of the asset or, in other cases, the continuation of the loan under its original terms.

The application of act 26, such as the performance of some or all of acts 28-32, may be repeated. For example, the receipt of data and calculating are repeated. The repetition is for different borrowers or the same borrower. For the same borrower, the repetition may be in order to determine loan treatment using different standards, such as a different indication of the desire to retain the loan. The repetition may be to use different loan terms for comparing the results to identify a most desired loan modification. Alternatively, the classifier is trained to indicate the best terms, such as through automated reiteration using different values for the loan factor. The clustering may or may not be repeated where the loan treatment application is repeated for a same borrower and property.

In act 30, a prediction output by the predictive model is displayed. For example, the cluster, default, net present value, probability, 1st lien default prediction, and/or other information are displayed. Where different indications or input options are provided by the user, the results may be displayed for each of the indications. By applying the model, the output predication is provided to the user. For example, the loan survivability for the current borrower predicted by the model is displayed. A binary indication may be displayed, such as yes or no to "likely to survive two years." The probability information may be displayed. The likelihood from the prediction is output. The display is an image of a report indicating the likelihood with or without any corresponding parameters, such as the term (e.g., two year survival). A table, graph, or other output may be provided. Different likelihoods given different values of one or more variables (e.g., features or models) may be output. The image represents a possible condition of the borrower, property and/or loan and associated probability of that condition.

Other information than the results may be displayed. The values input for the current borrower may be displayed. Information associated with assumptions, assigned cluster, product parameters or loan treatments may be displayed.

The use of indication of retention or other weighting factors allow a loan holder to skew the recommended treatment in favor of a consideration other than cost. Alternatively or additionally, the results predicted by the model may be used to make an informed choice regarding loan treatment.

In the world of loan modification, behavioral goals relate to such goals as keeping borrowers in their homes, stemming foreclosures and so forth. In this context, behavioral goals are usually measured by the percentage of modified loans that redefault within a specified time frame (e.g. one year.). A loan modification pool with an 80% redefault rate is considered as poorly behaving relative to one with a 50% redefault rate. Loan modification behavioral goals are largely socio-political in nature and often come under the scrutiny of bank regulators, the press and others. When left unaddressed, the mortgage holder incurs some form of reputational risk. The holder may become known as a bank that is harsh to borrowers in need of help.

Behavioral goals can also relate to property sale. In this case, behavioral goals represent how long it takes to sell the property, usually measured as days-on-market. A property that can be moved in 90 days has better behavior that one that is sold within 180 days. However, as will be shown, price is relevant here.

Economic goals include such objectives as maximizing loan value, minimizing losses and minimizing loss severity. Loss severity is an amount of loss (given default) relative to the size of the unpaid principal balance. It is often expressed as a percentage. For example, 40% loss severity means that a defaulted loan of $200,000 incurred $80,000 in losses for a loss severity of 40% (80,000/200,000). The accomplishment of economic objectives is often thought of as consistent with servicing the shareholders and in some circles at the expense of someone, usually the borrower.

The behavioral and economic value of any modified loan (loan modification) is, in part, a function of the loan modification terms. Loan modification terms include reductions in payment, reductions in principal, reductions in interest rate, and changes in maturity date relative to the original loan. Typically, the generosity of the terms is judged by the amount of reduction of some kind. Below, payment reduction is used to indicate level of generosity. For example, a loan modification that reduces the borrower's 1st lien mortgage payment from $1,000 to $800 would be noted as a 20% payment reduction (post modification v pre modification). In turn, a loan modification with a 50% payment reduction reduces a $1,000 payment to $500. A 50% payment reduction is considered a "more generous" term than a 20% reduction. The generosity of the terms may affect the accomplishment of behavioral and economic goals. At some point, highly generous loan modification terms eventually erode overall loan value and increase loss severity.

The behavioral and economic value of any form of sale is in a large part a function of the sales price of the property relative to the open liens against the property, usually measured by Combined Loan to Value (CLTV). Those properties with very high CLTV's (e.g. 200%), have an open lien balance that is far higher than the anticipated sales price. If a 200% CLTV property is taken to market, such a property, when sold, usually nets less than half of the open lien amount, post closing. In effect, this sale created a loss severity of over 50%, a house with outstanding balances of $600,000, sold for less than $300,000, due largely to housing price depreciation.

Loan modification has been treated as a cure for struggling homeowners and a source of relief for mortgage holders who are becoming inundated by losses. By tinkering modestly with loan terms (e.g. payment, principal, etc.), the belief is that the mortgage may be made more "affordable." "Affordability" is thought to be the source of the problem. A defaulting borrower has a mortgage that was "unaffordable." "Unaffordable" is too expensive relative to the borrower's income, which is judged using a single metric—debt-to-income (DTI) ratio. Proponents argue that by lowering the mortgage payment to some DTI threshold, the loan becomes more "affordable." Once the mortgage is modified to be more "affordable," the borrower may more readily service the modified loan and avoid foreclosure. In turn, mortgage holders may transform non-performing loans into performing ones.

Figure 17:
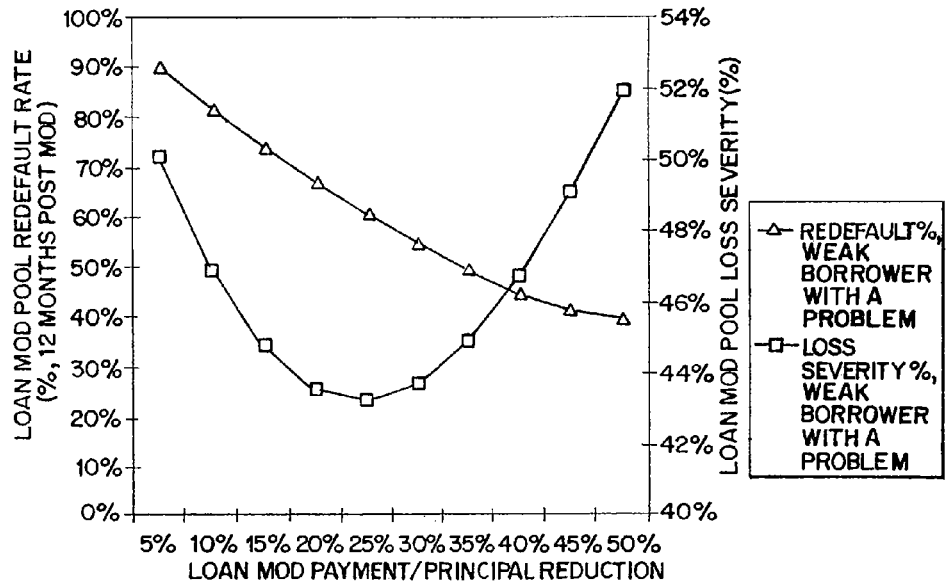
FIG. 17 is a chart representing loan modification analysis in another example.

For modest levels of payment reduction, loan modification redefault rates drop as do loan modification pool loss severity rates. Loan modification may accomplish both behavioral and economic goals. However, redefault rates may exceeded 75% within the first year for such loan modification. As shown in FIG. 17, the loan modification pool redefault rates accomplished with minor reductions in payment are unacceptably high, especially for "weak" borrowers who are the staple of the typical loan modification population. At these redefault rates (e.g. 75%), too few borrowers are able to remain in their homes, thwarting a key behavioral goal. To achieve lower redefault rates and keep more borrowers in their homes, much more generous terms are required. However, with successively more generous terms, the law of diminishing returns begins to apply. At some point, more generous terms buys less and less improved redefault performance. Hence, overall loan values begin to decline, not increase and loss severity begins to rise, not fall. As payments are reduced by 5%, 10% and so forth, loss severity rates decline as long as payment reduction remain less than or equal to 25%. It is in this domain that payment reductions buy more redefault performance than they cost. In this context, loss severity drops from 50% (5% payment reduction, post modification v pre mod) to 43% (25%). Once payment reductions exceed 25%, loss severity begins to increase. If, for example, a loan modification holder wishes to reduce loan modification pool redefault rate from 60% to 40%, loss severity rates increase from 43% to 52%, a 9-percentage-point increase. This is true even though loan modification redefault performance continues to improve. Loss severity increases past 25% payment reduction because of the law of diminishing returns. Beyond this point, payment reductions buy less redefault rate improvement than they cost.

The economics of keeping more borrowers in their homes at the 40% redefault rate may become unattractive. For a $1 Billion pool of modified loans, that means that achieving a 40% redefault rate would create an additional $900 Million in losses, even though a far greater proportion of the loan modifications are succeeding. If the loss severity rates for non-loan modification treatments are less than 43%, the $900 Million understates the losses considerably.

Figure 18:
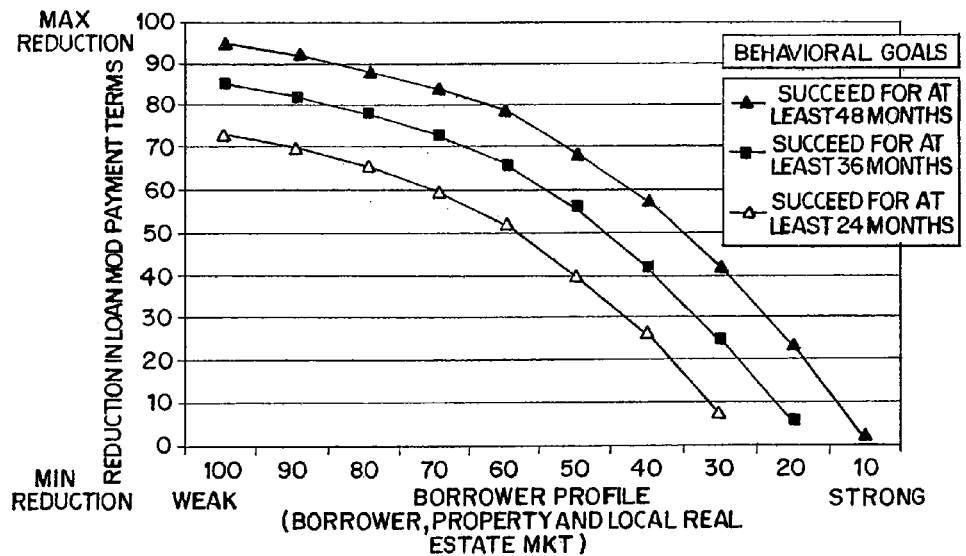
FIG. 18 is a chart showing loan modification reduction level as a function of borrower profile in one example.

The model may be used to manage the trade-off between behavioral and economic goals. In loan modification, the interaction of the generosity of terms in consideration of the type of borrower and property is considered with regard to maximizing the survival rate (e.g. number of months a borrower can successfully service a modified loan). The survival rate may be predicted using the model based on cluster and/or cluster and loan treatment for loan modification. As shown in FIG. 18, the point at which it is most efficient to accomplish a given behavioral goal (e.g. keeping borrowers in their homes for 36 months) is determined. For any given borrower, the most efficient point is where stricter (less generous) terms cause the borrower to fail at loan modification in advance of the behavioral goal (e.g. 36 months). In turn, more generous terms cause the borrower to survive well beyond 36 months, so the mortgage holder is "over-spending" to accomplish its behavioral goal.

For each type of borrower and behavioral goal, there is a set of optimal terms (e.g. payment reduction, principal reduction, etc.) that results in the accomplishment of the behavioral goal. The user may input which behavioral goals are sought as an attribute or the model may be trained based on the desired goal, such as 24, 26, or 48 months survival rate. FIG. 18 depicts how optimization can be applied to the accomplishment of behavioral goals. The horizontal axis is the borrower profile, which describes the borrower behaviorally simplified down to a rank value, such as discussed above for FIG. 10. The borrower profile defines the borrower's behavior in the context of his/her prior behaviors and as influenced by the performance of his/her property and local real estate markets, such as indicated by the cluster to which the borrower belongs. The borrower profile ranges from "weak" to "strong." A weak borrower has high distress, low capacity and low willingness and may often but not necessarily be complemented by a high CLTV, low (negative) equity property and an inefficient local real estate market. A "strong" borrower is the opposite.

Borrowers differ greatly in terms of capacity. Some are producing in excess of $7,000 per month to service debt of all kinds. Others can barely muster $250 per month to service debt. This borrower may not have serviced his/her mortgage for at least six months. The capacity is determined over any time period, such as six months. The vertical axis, the reduction in loan modification payment terms, is a metaphor for an equally complex dimension that defines the generosity of the loan modification terms offered by the mortgage holder. This dimension defines how much the mortgage holder reduces the payment, interest rates and/or principal to accomplish his/her redefault goals. In a state of "max reduction," the reduction in terms is substantial and the resulting loan value may be only 30% of its original par value. Other maximums may be used. When the terms are in a state of "min reduction," the reduction in terms is far less and more of the loan value is retained. For example, 10% reduction is provided.

The curved lines associated with loan modification survival rates (e.g. 12, 24, 36 months, etc.) defines the interaction of the generosity of terms, kind of borrower and property, and loan modification survival rate. A loan modification that survives for 36 months, for example, is one where a vast majority of the borrowers in that pool succeed at loan modification (i.e., avoid redefault) for 36 or more months. The generosity of the terms varies with the kind of borrower in order to achieve this effect. For a weak borrower to succeed, the terms are more generous. The amount of reduction in payments, interest rates and/or principal is larger relative to those required to get similar survival rates from a population of strong borrowers. Getting loan modifications to survive for longer periods across borrowers uses more and more generous terms.

When loan modification is simply too expensive, too risky or perhaps not welcome, other forms of treatment are available, readily accepted by the borrower and often more economical for the mortgage holder. Short sale or deed in lieu of foreclosure is loan treatment options. For deed in lieu of foreclosure, the lender takes title to the property and sells it at a discount relative to the mortgage balance owing. In this case, the borrower most likely moves out during this process.

The model may help to manage a property sale. FIG. 19 shows sale price as a function of property strength. The graph assumes that the property CLTV is greater than 100% and that the mortgage holder must accept less than he/she is owed in order for the sale to proceed under current or foreseen market conditions. The user may specify a target time-on-market range to sell a property (a behavioral goal), and then the model solves for the price (% discount) needed to sell the property in that time frame. The horizontal axis is the property profile of a plurality of metrics simplified to a single metric. The property profile ranges from weak to strong. In this context, "weak" describes a property with extremely high CLTV (e.g. 200+%), extensive negative equity ($200,000+) and many other detractions, such as its physical state, the conditions of its immediate neighborhood (e.g. number of vacant homes, homes still under construction, but not likely to be completed, etc.); and the efficiency of the local real estate market in which it resides. A strong property is the opposite.

The vertical axis, the discount from market price, is a metaphor or metric for an equally complex dimension (i.e., calculated from a plurality of metrics) that defines how much the mortgage holder reduces the sale price to reach his/her time on market goals. This reduction may be modeled by training for this result. For the "max price reduction," the reduction in price is substantial, especially relative to the open lien balance. In this case, the mortgage holder agrees to accept a much higher loss severity to move the property. For the "min price reduction," the price reduction is far less, the sale is accomplished in the desired time frame and there is more cash after sale. Hence, the loss severity is less.

The curved lines associated with time-on-market (e.g. 60, 120, 180 days, etc.) define the interaction of the price, property strength, and time-on-market. A property that moves within 120 days, for example, is one where a vast majority or average of the properties in that pool are sold within 120 days or less. The price discount varies with the strength of property. For a weak property to succeed, the price discount is steep, such as discounts of 50%, 60% or more relative to the original purchase price. Strong properties have the opposite profile, such as less generous discounts.

FIG. 20 shows the complexity of determining which treatment to offer (loan modification vs. short sale) and at what terms (payment reduction v price reduction, respectively). There are two comparisons being made: #1 and #2. Both comparisons are based upon the same kind of borrower, but drastically different kinds of property. In comparison #1, the property's performance is economically superior to loan modification at all terms (Property A—CLTV 110%). In comparison #2, where the property is inferior (CLTV 175%), loan modification turns out to be the overall best economic option, except at the lowest levels of payment reduction.

The interaction of property and borrower profiles and the economic projections of same may cause dramatically different treatment economics and choices. While loan modification performance may be altered behaviorally and economically by payment reduction choices and other changes in terms, loan modification economics in these comparisons are outweighed by the effects of property behavior and markets. At interim CLTV levels (>110% and <175%), the choice of loan modification and short sale terms may have an effect on treatment selection. The choice of treatment may change in multiple ways, depending upon the behavioral goals of the mortgage holder for short sale and loan modification.

Comparison #1 presents the economic performance of a typical borrower during a loan modification across a wide range of terms (e.g., payment reductions ranging from 5%-50%). Moreover, as this borrower's terms change, so does his/her redefault behavior. At the optimal point (25% payment reduction), the mortgage holder is assumed to be able to get 24 months of consistent loan modification payment performance. At 50% payment reduction, the borrower is assumed to survive loan modification for 36 months. The other half of comparison #1 presents the performance of this borrower's property (Property A) if short sold. Property A has a current CLTV of 1.1 (110%), and the price reductions represent the prices needed to move property A in 90, 120 and 180 days, which corresponds to price reductions of 50%, 25% and 5%, respectively.

When using the loss severity metric to compare the treatment alternatives, short sale is economically superior. Loan modification, regardless of terms is considerably more costly. If the mortgage holder chooses to persuade this borrower into a loan modification with a survival rate of 36 months (e.g., payment reduction of 50%), then this mortgage holder is committed to incurring a loss severity of approximately 50%. The opportunity costs of this choice are huge. IF the mortgage holder chooses to short sell the property within 120 days, the holder incurs a loss severity of 18%, which is 32 percentage points lower than the loss severity incurred with loan modification. For every $100,000 in property value, the mortgage holder incurs $38,000 in additional losses by choosing loan modification over short sale, given the circumstances of Comparison #1. If the housing price is $200,000 and if there are 1,000 loans in the loan modification portfolio that conform to the conditions of comparison #1, the incremental losses incurred by the mortgage holder for this type of decision exceed $70 million.

In comparison #2, the borrower is identical to the borrower in comparison #1 and, therefore, his/her projected loan modification performance is the same. If the mortgage holder chooses to maximize the behavioral goal (36 months of loan modification survival), then the payment reduction is 50% and the loss severity incurred is also 50%. If the mortgage holder chooses a payment reduction of 25%, then the borrower's loan modification survival rate is reduced to 24 months, down 12 months from 36 months. However, the loss severity at the 25% payment reduction point is 35%, resulting in a 15 percentage point reduction in loss severity.

Property B in comparison #2 has drastically different behavior and circumstance. Its CLTV is 1.75 (175%). Property B has a current CLTV of 1.5 (150%), and the price reductions represent the prices to move Property B in 90, 120 and 180 days, which corresponds to price reductions of 50%, 25% and 5%, respectively. The loss severity profile of property B is far different from property A. At a days-on-market of 90, 120, 180 days, short sale loss severity ranges from 45%, 54%, 64%, respectively. Throughout most of comparison #2, loan modification at all but the lowest payment reductions is the superior choice economically. Should the mortgage holder choose to achieve the maximum behavioral goal (36 months, payment reduction 50%), and should the holder compare that to the loss severity incurred by moving the property within 120 days, the overall differences in loss severity still favor loan modification. The relative rates are 50% and 54%, respectively, for loan modification at 50% payment reduction and short sale price reduction of 25%. For every $100,000 in price, the mortgage holder generates $4,000 lower losses by choosing loan modification for the borrower and property circumstances specific to comparison #2. Given a housing price of $200,000, in this context, the mortgage holder incurs $8,000 less loss per loan by choosing loan modification.

By considering many metrics instead of the more easily manually conceived 1-9 metrics (e.g., CLTV, DTI, and FICA score), more accurate loan treatment may be determined. Credit information, detailed property information and specifics about the local real estate market used together in a processor implemented model may better serve a lender or mortgage holder than human analysis of limited metrics alone.

In a two-factor paradigm, the same set of terms may yield drastically different redefault performances, as a function of the borrower's profile. In many cases, the difference in redefault performance is driven by the debt servicing skills of the borrower, where "stronger" borrowers have an established track record of servicing debt and "weaker" borrowers have a spotty history of debt servicing, with many long-term debt servicing issues. While "strong" v "weak" does explain a portion of the redefault performance, it is used herein as a metaphor for a more complex and robust view of the borrower, his/her property and the local real estate market.

Figure 21:
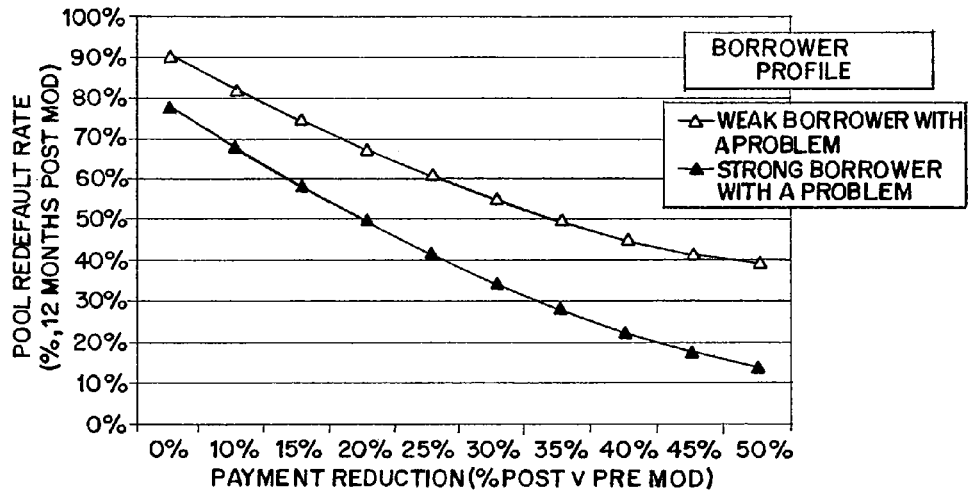
FIG. 21 is a graph of example redefault rates.

FIG. 21 shows loan modification pool redefault rates declining with more generous payment reductions (% payment reductions). FIG. 21 is a simplification of the large number of metrics dealt with by the matrix. The successful loan modification borrower is largely a cost-sensitive borrower with an inelastic demand curve, the "price" goes down if he/she is to perform ("buy" and "pay-for" a loan modification). The degree of loan modification success (i.e. reduced redefault rate) is proportional to the amount of payment reduction, as adjusted for a particular kind of borrower. In FIG. 21, the pool redefault rate is calculated 12 months after loan modification, with 60+ DPD being the benchmark for redefault. The payment reduction compares the post modification payment (e.g. $1,000) with the pre modification payment (e.g. $2,000) to calculate the payment reduction % (e.g. 50% in this case: ((1−1000/2000)*100).

Weak v strong borrowers are classified using the borrower profile discussed above for FIG. 10. There are numerous dimensions (e.g., 20) in this complex factor, including capacity, distress and willingness. If a mortgage holder is dealing with a weak Borrower, redefault rates are significantly higher than when dealing with a strong borrower, regardless of the % payment reduction. For example, at 25% payment reduction, the weak borrower pool redefault rate is 60% after 12 months, whereas the strong borrower redefault rate is approximately 42%, an improvement of 18 points in redefault rate gained by offering similar loan modification terms to a better borrower.

Both types of borrowers may redefault at lower and lower rates, given more and more generous payment reductions. When dealing with a weak borrower, a 10% payment reduction may not reduce redefault rates significantly (e.g., 82% redefault rate). However, the mortgage holder may dramatically reduce the redefault rate by reducing the post modification payment from 10% to 50% relative to the original. At the 50% payment reduction marker, the weak borrower loan modification pool redefault rate is 40%, a 42 percentage point improvement. Such reductions may not be effective for the "write-down" borrower who is not overly influenced by payment reductions, but instead, needs a reduction in principal balance. Whether the borrower's distress is driven by his/her debt servicing performance and/or property behavior, improved loan modification performance can be purchased by reducing the borrower's overall cash obligations.

The default rate improvements begin to weaken with successive reductions in payments. For example, in the weak borrower redefault curve, redefault rates begin to atrophy when payment reductions are in excess of 25%. The slope of this curve reduces and begins to flatten out at higher payment reduction % (e.g., 30% and higher). As this slope flattens out (asymptotes), further payment reductions are generating less and less improved redefault performance. Moreover, the rate at which the slope changes (flattens out) varies with the kind of borrower, as well as with the amount of payment reduction. The asymptotic effect of loan modification redefault behavior translates into a law of diminishing economic returns.

Figure 22:
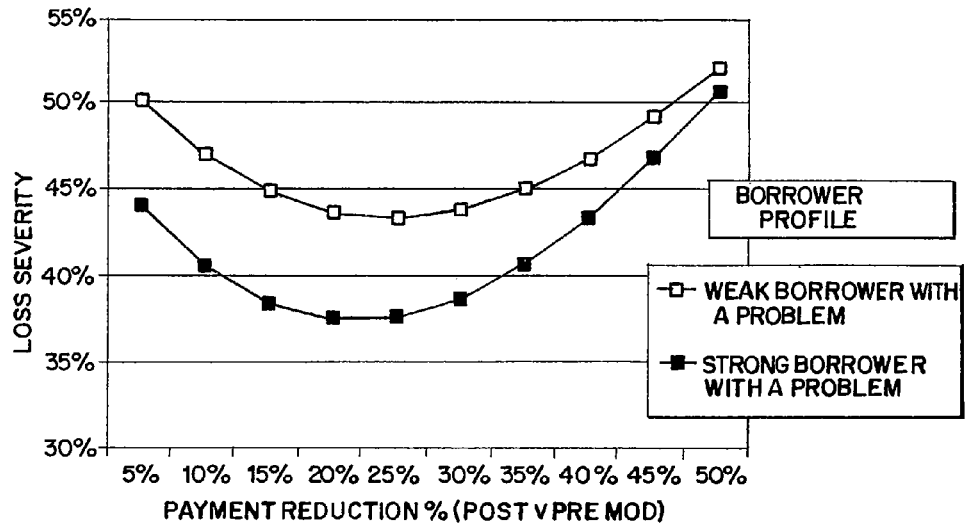
FIG. 22 is a graph of example loss severity.

FIG. 22 shows the economic impact of deteriorating redefault rate performance. For both strong and weak borrowers, there is an optimal point of payment reduction, which if exceeded, produces higher, not lower loss severity. The net result, is that at some point payment reductions are economically ineffective, contributing to an increase, not a decrease in loss severity. Loss severity begins to increase for both strong and weak borrowers once payment reductions exceed 20% and 25% for strong v weak borrowers, respectively. At payment reductions less than that, loss severity decreases overall with each successive payment reductions (5%, 10%, 15%, 20%, etc.). To create this simplified view, it is assumed that very time a loan modification redefaults, the loan is moved to a foreclosure/short sale process that results in a loss severity of 55%. This assumption causes loan modification pools with very low loan modification redefault rates to move a lower portion of their properties down a higher loss severity path. Loan modification pools with much higher redefault rates move more of their properties down a higher loss severity path. Payment reductions are assumed to translate into proportionally lower principal balances. In some cases, principal reduction is explicit.

If a borrower succeeds for three years or more at loan modification with a 30% payment reduction, but no principal reduction, he/she will most likely want to sell the property, which may still have a high CLTV (>120%).

A high CLTV means that sale price of the property will not cover the outstanding loans. The lender may take the short sale (or some other form of principal reduction) in order to accommodate the borrower, a move that might be economically unattractive, but nonetheless optimal given the circumstances. As a result, a substantial loss severity is incurred even though principal reduction is not part of the original loan modification terms. A portion of that severity is precipitated by the fact that the loan modification generates far less cash in loan payments than the loan is designed to produce. The other portion of the loss severity is generated by the principal reduction incurred at sale.

Figure 23:
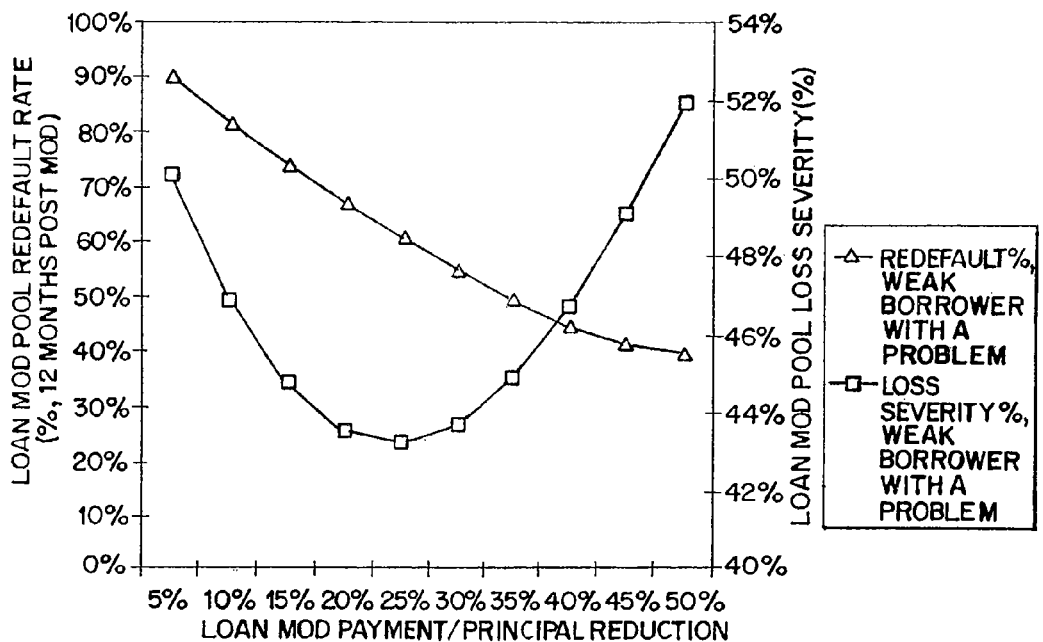
FIG. 23 is another example graph of redefault rates.

"High" payment reduction loan modifications have a loss severity rate that is quite high, even if the loan modification is successful (i.e. the borrower succeeds at loan modification for three or more years.) and even if there is no principal reduction in the initial loan modification terms. This complex relationship is presented in summary in FIG. 23, which depicts key trends for weak borrowers. The loan modification pool redefault is along the vertical axis. For the sake of simplicity, the principal reduction is equal to the payment reduction %. This phenomenon combined with the effects of lower monthly cash flows and estimated redefault rates creates the loss severity curves. These simplifying assumptions make the determination of the precise optimal payment reduction difficult. However, this is done to demonstrate that loan modification performance can be bought and that purchasing "superior" performance can be exceptionally expensive. Actual determination may be performed using the modeling based on many metrics. The expense rises if the investor is dealing with either a weak borrower or a strong borrower with a dramatically underperforming property (CLTV>200%).

Pushing redefault rates down from 60% to 40% requires that the mortgage holder reduce the payments by 50%, not just 25% (the optimal point). However, when loan modification pool redefault rate plunges to 40%, the loan modification pool loss severity rate climbs to an estimated 52%, a 9 percentage point increase from the optimal point (25% payment reduction) where loan modification pool loss severity was an estimated 43%. For a mortgage holder to meet aggressive redefault goals on a $10 Billion loan modification portfolio of "weak" borrowers may require that the mortgage holder incur an estimated $900 million in additional losses (i.e., 9%×$10 B). The mortgage holder may have to incur an additional $900 million in losses to purchase redefault performance that is reduced from 60% to 40%.

EXAMPLE EMBODIMENT

The matrix may be generated using various metrics, factors, data sources, and machine learning structures. One sample embodiment is provided below. The models are applied to subprime loans (risky loans) and alt-A loans (riskier than prime but less risky than subprime), but may be trained and applied to prime loans as well. Two databases are used, QBO=Quandis Business Objects for raw data and MART for data extracted from the raw data and stored in one or more tables for application.

Client data is received in an Excel spreadsheet or other format. Client data includes the borrower, property, and loan information to which the model is being applied. The client data is placed in an ftp location either directly by the client or after being received via email. The client data is formatted and imported to the database. For example, the client data is copied to an Excel spreadsheet. Client data columns and field names are mapped to the QBOAnalytics database column and field names manually or through an automated process. The information is saved for future client imports. Client data is validated using a macro. The macro looks for missing columns, data, and/or other errors. Any errors are brought to the client's attention for resolution. Client data is run through scrub rules/scripts for flagging loan level data that is suspect and should be checked for possible errors. A summary listing the number of fields populated, invalid, or questionable is created. A copy of the mapped column and field data is saved in a master Excel spreadsheet containing all client mappings. The master Excel spreadsheet is used to map data using XSLT. The data is validated via XSLT using the same or different rules as the macro. The loan level data is scrubbed via XSLT using the same or different scrub scripts as the macro. Once all issues are resolved, the data is imported into the QBOAnalytics database.

Other data, such as associated with training data, real estate market information, or other data not provided by a client is collected. The collection is created in the database. For example, tables are populated with validated client data. A CREDCO or other credit report is ordered and received in a formatted, electronic form. LienWatch property data is ordered. MERS property market data is ordered. A DAVI score is ordered. The ordered data is formatted and saved once received.

Some data may be regularly acquired since the data is not borrower or property specific. For example, Altos-Geographic zone data is acquired every 30 days. The borrower and property independent data is stored in the AnalyticsMART database. The data may include time on market by geography to be used by a treatment regression table, foreclosure time by state provided in a static table, and an MSA table (census statistics). Alternatively, the data is linked to a property and ordered as needed.

The AnalyticsMART database is prepared for use. Logic is run to determine if a first lien exists for a subordinate lien. Logic is run to determine if a subordinate lien exists for a first lien. Code or other information may be verified as correct.

For running the analytics, records from the QBO database may be copied to the AnalyticsMART for the current collection. The data may be further processed. For example, credit report information is used to create tables in preparation for application. Property and product metrics are also extracted.

To run the analytics, an executable file (e.g., visual basic file) is invoked to read the machine readable credit report and create credit metrics. Running the analytics creates the credit factors, product factors, property factors, metrics, a borrower as an asset flag, a property as an asset flag, a cluster assignment, a borrower prepayment score, a borrower default score, a borrower refinance score, a raw net present value calculation (NPV), and a refined NPV. Additional, different, or less information may be created. The created information is stored in a history table.

The output is created from the stored data. For example, the net present value functions are run, refined, formatted and output into a table. Similarly, the survivability and cluster information are formatted for display and output. The output may be in an email, printed as a report, stored as a file, displayed on screen, combinations thereof, or otherwise presented. In alternative embodiments, loan documents associated with an optimal treatment are generated for signatures after approval.

The QBO database may store any metrics available or desired. Below are various examples of metrics, and scores. Any desired metrics and scores may be used. The names used below generally describe the information collected. Other embodiments are possible using additional, different, or fewer metrics, and scores. Different table structures may be used. It is not the specific metrics, and scores, but the type of information intended to be communicated herein for representing how to make and use data analytics.

In one embodiment, the database stores loan product information provided by a mortgage holder or loan originator. The client provides information about the loans to be analyzed. This includes details about the loan terms as well as transaction data from when the loan was granted. Some example metrics include:

Inputs/Outputs:

| Input Field | Output Table & Field |
|---|---|
| LoanNumber | Loan.Loan |
| InvestorID | AnalyticsData.InvestorID |
| InvestorName | AnalyticsData.InvestorName |
| PropertyAddress | |
| PropertyAddress2 | Property.Address |
| PropertyCity | Property.City |
| PropertyState | Property.State |
| PropertyZip5 | Property.PostalCode |
| Valuation | Valuation: Type |
| ValuationValue | Valuation.Valuation |
| Valuation Date | Valutation.ClosedDate |
| InterestRateCurrent | Loan.InterestRateCurrent |
| Borrower1FirstName | |
| Borrower1MiddleName | |
| Borrower1LastName | |
| USSSN1 | Borrower/Contact |
| OriginalLoanAmount | Loan.OriginalBalance |
| OriginalLoanDate | Loan.LoanFundingDate |
| NextDueDate | Loan.NextPaymentDate |
| UPBAmount | Loan.UPBAmount |
| LienPosition | Loan.LienPriorityType |
| LoanPurpose | Loan.MortgageDescription |
| LoanModIndicator | AnalyticsData.LoanModIndicator |
| LoanModEffectiveDate | AnalyticsData.LoanModEffectiveDate |
| NegAmIndicator | Loan.NegativeAmortization |
| IOIndicator | Loan.InterestOnly |
| IOTerm | Loan.InterestOnlyTerm |
| ProductType | Loan.MortgageType |
| ARMMargin | ArmTerm.Margin |
| MinimumARMInterest | ArmTerm.LowestPossibleRate |
| MaxInterestRate | ArmTerm.HighestPossibleRate |
| CurrentMonthlyPmt | Loan.PaymentAmount |
| MICoverage | AnalyticsData.MICoverage |
| MICoveragePercent | Loan.InsurerPremiumPercentage |
| CurrentStatus | Loan.Status |
| RecCorpAdvanceBalance | AnalyticsData.RecCorpAdvanceBal |
| EscrowAdvanceBalance | AnalyticsData.EscrowAdvanceBal |
| OriginalFICO | AnalyticsData.OriginationFICO |

In one embodiment, the database stores borrower information extracted from a credit report. A machine readable credit report is obtained on the primary and/or other borrowers for a property. The loan number for an existing loan, property address, borrower's social security number, borrower's name, and/or other information is used to order the credit report. The credit report metrics are extracted from the report and written into a credit report table, a credit liability table, a score table, a message table and a bankruptcy and process table, but additional, different, or fewer tables may be used.

The credit report includes consumer credit information that profiles all of the borrower's credit relationships: mortgage, auto, credit card, finance company, and many others. Some example metrics include:

| Table | Field |
|---|---|
| Analytics.qbo.CreditReport | CreditReportID |
| Analytics.qbo.CreditReport | CreditReport |
| Analytics.qbo.CreditReport | Object |
| Analytics.qbo.CreditReport | ObjectID |
| Analytics.qbo.CreditReport | CreditReportType |
| Analytics.qbo.CreditReport | Status |
| Analytics.qbo.CreditReport | FirstIssueDate |
| Analytics.qbo.CreditReport | LastUpdatedDate |
| Analytics.qbo.CreditReport | MISMOVersion |
| Analytics.qbo.CreditReport | CreditRatingCodeType |
| Analytics.qbo.CreditReport | CreditResponseID |
| Analytics.qbo.CreditReport | Identifier |
| Analytics.qbo.CreditReport | TransactionIdentifier |
| Analytics.qbo.CreditReport | MergeType |
| Analytics.qbo.CreditLiability | CreditLiabilityID |
| Analytics.qbo.CreditLiability | CreditReportID |
| Analytics.qbo.CreditLiability | Status |
| Analytics.qbo.CreditLiability | CreditLiabilityType |
| Analytics.qbo.CreditLiability | CreditFileID |
| Analytics.qbo.CreditLiability | AccountIdentifier |
| Analytics.qbo.CreditLiability | AccountOpenedDate |
| Analytics.qbo.CreditLiability | AccountOwnershipType |
| Analytics.qbo.CreditLiability | AccountReportedDate |
| Analytics.qbo.CreditLiability | AccountBalanceDate |
| Analytics.qbo.CreditLiability | AccountStatusDate |
| Analytics.qbo.CreditLiability | AccountStatusType |
| Analytics.qbo.CreditLiability | AccountType |
| Analytics.qbo.CreditLiability | ConsumerDisputeIndicator |
| Analytics.qbo.CreditLiability | DerogatoryDataIndicator |
| Analytics.qbo.CreditLiability | HighBalanceAmount |
| Analytics.qbo.CreditLiability | LastActivityDate |
| Analytics.qbo.CreditLiability | MonthlyPaymentAmount |
| Analytics.qbo.CreditLiability | MonthsReviewedCount |
| Analytics.qbo.CreditLiability | PastDueAmount |
| Analytics.qbo.CreditLiability | TermsDescription |
| Analytics.qbo.CreditLiability | TermsMonthsCount |
| Analytics.qbo.CreditLiability | TermsSourceType |
| Analytics.qbo.CreditLiability | UnpaidBalanceAmount |
| Analytics.qbo.CreditLiability | CreditBusinessType |
| Analytics.qbo.CreditLiability | CreditLoanType |
| Analytics.qbo.CreditLiability | CreditorID |
| Analytics.qbo.CreditLiability | CurrentRatingCode, |
| Analytics.qbo.CreditLiability | CurrentRatingType, |
| Analytics.qbo.CreditLiability | HighestAdverseRating |
| Analytics.qbo.CreditLiability | HighestAdverseType |
| Analytics.qbo.CreditLiability | LateCount30 |
| Analytics.qbo.CreditLiability | LateCount60 |
| Analytics.qbo.CreditLiability | LateCount90 |
| Analytics.qbo.CreditLiability | MostRecentAdverseRating |
| Analytics.qbo.CreditLiability | MostRecentAdverseType |
| Analytics.qbo.CreditLiability | MostRecentAdverseDate |
| Analytics.qbo.CreditLiability | PaymentPatternData |
| Analytics.qbo.CreditLiability | PaymentPatternStartDate |
| Analytics.qbo.Score | Score (eg: 'Experian - ExperianFairIsaac (BorRec000001)' and 'Experian - Other (BorRec000001)') |
| Analytics.qbo.Score | Object |
| Analytics.qbo.Score | ObjectID |
| Analytics.qbo.Score | ScoreInt -- Score Value |
| Analytics.qbo.Message | Message |
| Analytics.qbo.Message | Object (eg: 'Loan') |
| Analytics.qbo.Message | ObjectID (eg: LoanID) |
| Analytics.qbo.Message | MessageType ('Credit Order Error') |
| Analytics.qbo.Bankruptcy | BankruptcyID |
| Analytics.qbo.Bankruptcy | Bankruptcy |
| Analytics.qbo.Bankruptcy | DebtorAttorneyContactID |
| Analytics.qbo.Bankruptcy | Chapter |
| Analytics.qbo.Bankruptcy | FilingDate |
| Analytics.qbo.Bankruptcy | BarDate |

-continued

| Table | Field |
| --- | --- |
| Analytics.qbo.Bankruptcy | PostPetitionDate |
| Analytics.qbo.Bankruptcy | StateOfFiling |
| Analytics.qbo.Bankruptcy | BKCaseNo |
| Analytics.qbo.Bankruptcy | CourtID |
| Analytics.qbo.Bankruptcy | ProcessID |
| Analytics.qbo.Bankruptcy | TrusteeContactID |
| Analytics.qbo.Bankruptcy | ParentID |
| Analytics.qbo.Bankruptcy | Asset |
| Analytics.qbo.Bankruptcy | LoanID |
| Analytics.qbo.Bankruptcy | Voluntary |
| Analytics.qbo.Bankruptcy | Joint |
| Analytics.qbo.Process | ProcessID |
| Analytics.qbo.Process | Process |
| Analytics.qbo.Process | Object |
| Analytics.qbo.Process | ObjectID |
| Analytics.qbo.Process | ProcessTemplateID |
| Analytics.qbo.Process | Sibling |
| Analytics.qbo.Process | SiblingID |
| Analytics.qbo.Process | SubscriberID |
| Analytics.qbo.Process | Status |
| Analytics.qbo.Process | ProcessType |
| Analytics.qbo.Process | Priority |
| Analytics.qbo.Process | AssignedOrganizationID |
| Analytics.qbo.Process | AssignedPersonID |
| Analytics.qbo.Process | DateOpened |
| Analytics.qbo.Process | OpenedReason |
| Analytics.qbo.Process | DateClosed |
| Analytics.qbo.Process | ClosedReason |
| Analytics.qbo.Process | CostLedgerID |
| Analytics.qbo.Process | ROIScoreID |
| Analytics.qbo.Process | CurrentDecisionID |
| Analytics.qbo.Process | SourceXml |
| Analytics.qbo.Process | MetaXml |
| Analytics.qbo.Process | CreatedPersonID |
| Analytics.qbo.Process | CreatedDate |
| Analytics.qbo.Process | UpdatedPersonID |
| Analytics.qbo.Process | UpdatedDate |

The lien information is obtained, such as from a lien watch service. Public record, loan transaction, and valuation tables may be created. The lien information may provide delinquency or foreclosure information. The loan number, property address, borrower's name, original loan amount, original loan date, and/or other information is used to obtain the lien information. This information is extracted for distress information. Property metrics (e.g. sales, liens) and transaction history (e.g. original balance, lender, and origination date) are obtained for each property. Information found regarding the property is inserted into a loan transaction table. If no data is found for the specified property, an error message is written to the message table. One example of the lien information is:

| Table | Field |
| --- | --- |
| Analytics.qbo.PublicRecord | MersID |
| Analytics.qbo.PublicRecord | PublicRecord |
| Analytics.qbo.PublicRecord | RecordingDate |
| Analytics.qbo.PublicRecord | DocketNumber |
| Analytics.qbo.PublicRecord | PublicRecordType |
| Analytics.qbo.PublicRecord | Object |
| Analytics.qbo.PublicRecord | ObjectID |
| Analytics.qbo.PublicRecord | Source ('LienWatch') |
| Analytics.qbo.PublicRecord | FilingDate |
| Analytics.qbo.PublicRecord | BookPage |
| Analytics.qbo.PublicRecord | AttorneyPublicRecord |
| Analytics.qbo.PublicRecord | OriginalAmount |
| Analytics.qbo.PublicRecord | OriginationDate |
| Analytics.qbo.PublicRecord | DefaultAmount |
| Analytics.qbo.PublicRecord | DefaultDate |
| Analytics.qbo.PublicRecord | AuctionDate |
| Analytics.qbo.PublicRecord | AuctionAmount |

-continued

| Table | Field |
| --- | --- |
| Analytics.qbo.PublicRecord | AuctionComplete |
| Analytics.qbo.LoanTransaction | LoanTransactionID |
| Analytics.qbo.LoanTransaction | LoanTransaction |
| Analytics.qbo.LoanTransaction | LoanID |
| Analytics.qbo.LoanTransaction | LoanTransactionType |
| Analytics.qbo.LoanTransaction | Status |
| Analytics.qbo.LoanTransaction | RecordingDate |
| Analytics.qbo.LoanTransaction | FinanceLoanAmount |
| Analytics.qbo.LoanTransaction | FinanceRecordingDate |
| Analytics.qbo.LoanTransaction | Source (eg: 'LienWatch') |
| Analytics.qbo.LoanTransaction | DocumentNumber |
| Analytics.qbo.Valuation | Valuation (eg: 'AVM') |
| Analytics.qbo.Valuation | ValuationType (eg: 'AVM') |
| Analytics.qbo.Valuation | ValueAsIs (ValuationValue) |
| Analytics.qbo.Valuation | Confidence |
| Analytics.qbo.Valuation | ValueRepaired |
| Analytics.qbo.Valuation | ValueQuickSale |
| Analytics.qbo.Valuation | Object |
| Analytics.qbo.Valuation | ObjectID |
| Analytics.qbo.Valuation | PropertyID |
| Analytics.qbo.Message | Message |
| Analytics.qbo.Message | Object (eg: 'Loan') |
| Analytics.qbo.Message | ObjectID (eg: LoanID) |
| Analytics.qbo.Message | MessageType ('Senior Lien Credit Status') |

The lien metrics are used as property metrics and for lien logic for metrics or scores.

MERS may be searched for information. The loan number, property address, borrower's name or other information is used to obtain MERS information. MERS is a registry system to eliminate recording assignments of mortgages as pools of loans are bought and sold on the secondary market. Assignments of ownership and servicing rights are obtained for each mortgage loan. Example tables created include a loan transaction table and a public record table. Example metrics include:

| Table | Field |
| --- | --- |
| Analytics.qbo.LoanTransaction | LoanTransactionID |
| Analytics.qbo.LoanTransaction | LoanTransaction |
| Analytics.qbo.LoanTransaction | LoanID |
| Analytics.qbo.LoanTransaction | LoanTransactionType |
| Analytics.qbo.LoanTransaction | Status |
| Analytics.qbo.LoanTransaction | RecordingDate |
| Analytics.qbo.LoanTransaction | FinanceLoanAmount |
| Analytics.qbo.LoanTransaction | FinanceRecordingDate |
| Analytics.qbo.LoanTransaction | Source (eg: 'MERS') |
| Analytics.qbo.PublicRecord | MersID |
| Analytics.qbo.PublicRecord | PublicRecord |
| Analytics.qbo.PublicRecord | RecordingDate |
| Analytics.qbo.PublicRecord | DocketNumber |
| Analytics.qbo.PublicRecord | PublicRecordType |
| Analytics.qbo.PublicRecord | Object |
| Analytics.qbo.PublicRecord | ObjectID |
| Analytics.qbo.PublicRecord | Source |
| Analytics.qbo.Message | Message |
| Analytics.qbo.Message | Object (eg: 'Loan') |
| Analytics.qbo.Message | ObjectID (eg: LoanID) |
| Analytics.qbo.Message | MessageType (Like 'MERS%') |

These metrics may be used by the lien logic for calculating metrics or scores.

Property valuation information may be obtained. For example, a DAVI score, from First American, may be imported. The DAVI score uses the property's valuation amount and effective date along with local market real estate data to determine the current value of each property. The score may include a factor for distressed property conditions. Other valuations may be used.

The loan number, property address, primary borrower's name, or other information may be used to obtain the valuation. Example metrics determined from the valuation information include:

| Table | Field |
|---|---|
| Analytics.qbo.Valuation | Valuation (eg: 'DAVI') |
| Analytics.qboValuation | ValuationType (eg: 'DAVI') |
| Analytics.qbo.Valuation | ValueAsIs (ValuationValue) |
| Analtyics.qbo.Valuation | Confidence |
| Analytics.qbo.Valuation | Object |
| Analytics.qbo.Valuation | ObjectID |
| Analytics.qbo.Valuation | PropertyID |

The valuation metrics are used for calculating the raw net present value and the revised net present value. A raw net present value is calculated solely upon the outputs of the model and the economic assumptions relative to the borrower's expected behavior and the property's projected values. The revised NPV reflects changes to the NPV that might be caused by operations specific attributes, such as the likelihood of a right party contact.

Using credit information, lien watch, MERS, and static loan characteristics, an algorithm calculates the client's interest and priority of the subject property as well as determines first and second liens. Loan, contact, and organization tables may be created. Examples include:

| Table | Field |
|---|---|
| Analytics.qbo.Loan | LoanID |
| Analytics.qbo.Loan | LoanFundingDate |
| Analytics.qbo.Loan | OriginalBalance |
| Analytics.qbo.Loan | ServicerID |
| Analytics.qbo.Loan | InterestPaidThrough |
| Analytics.qbo.Loan | PaymentAmount |
| Analytics.qbo.Loan | UPBAmount |
| Analytics.qbo.Loan | Status |
| Analytics.qbo.Loan | PropertyID |
| Analytics.qbo.Loan | LienPriorityType |
| Analytics.qbo.Organization | OrganizationID (Type 'Servicer') |
| Analytics.qbo.Organization | Organization = Servicer name |

Real estate market information is obtained. For example, Altos information is provided. The real estate market information provides data aggregated from one or more sources to give insight on current market conditions in the subject property's local market. The obtained information is about geographic regions of the US and not a specific property. In one embodiment, market information is received monthly and uploaded to the AnalyticsMart database. The time on market by geography data is used by the treatment regressions table. An example of metrics gathered include:

| Table | Field |
|---|---|
| AnalyticsMart.dbo.treatment_regressors | time_on_market |

The time on market is used for calculating net present value and survival curves.

Metrics denote characteristics about the borrower and his/her property. Once information about the borrower and his/her property is obtained, some of the metrics are refined using various calculations (sums, counting, aggregate, etc.) and grouped into similar categories, such as property metrics, product metrics, and borrower metrics.

Property metrics provide information about the property itself. Some example refinements include:

Inputs:

| Table | Field |
|---|---|
| analyticsmart.qbo.Loan | Propertyid |
| analyticsmart.qbo.Property | CLTV |
| analyticsmart.qbo.Loan | UPBAmount |
| analyticsmart.qbo.Loan | LienPriorityType |
| analyticsmart.qbo.Loan | LoanType |
| analyticsmart.qbo.Property | SquareFeet |
| analyticsmart.qbo.Property | lotSize |
| analyticsmart.qbo.Property | PropertyBuilt |
| analyticsmart.qbo.Property | City |
| analyticsmart.qbo.Property | State |
| analyticsmart.qbo.Property | PostalCode |
| analyticsmart.qbo.Valuation | ValueAsIs |

Outputs:

| Table | Field |
|---|---|
| analyticsmart.dbo.Property_Metrics | Propertyid |
| analyticsmart.dbo.Property_Metrics | SquareFeet |
| analyticsmart.dbo.Property_Metrics | lotSize |
| analyticsmart.dbo.Property_Metrics | PropertyBuilt |
| analyticsmart.dbo.Property_Metrics | Age |
| analyticsmart.dbo.Property_Metrics | City |
| analyticsmart.dbo.Property_Metrics | State |
| analyticsmart.dbo.Property_Metrics | PostalCode |
| analyticsmart.dbo.Property_Metrics | CLTV |
| analyticsmart.dbo.Property_Metrics | OpenMortLien001_Snapsho3_sum |
| analyticsmart.dbo.Property_Metrics | OpenMortLien002_Snapshot3_count |
| analyticsmart.dbo.Property_Metrics | OpenMortLien003_Snapshot3_count |
| analyticsmart.dbo.Property_Metrics | OpenMortLien004_Snapshot3_count |
| analyticsmart.dbo.Property_Metrics | OpenMortLien005_Snapshot3_count |
| analyticsmart.dbo.Property_Metrics | OpenMortLien006_Snapshot3_count |
| analyticsmart.dbo.Property_Metrics | OpenMortLien007_SnapShot3_TotCount |
| analyticsmart.dbo.Property_Metrics | OpenMortLien008_Snapshot3_sum |
| analyticsmart.dbo.Property_Metrics | OpenMortLien009_Snapshot3_sum |
| analyticsmart.dbo.Property_Metrics | OpenMortLien010_Snapshot3_sum |
| analyticsmart.dbo.Property_Metrics | OpenMortLien011_Snapshot3_sum |
| analyticsmart.dbo.Property_Metrics | OpenMortLien012_SnapShot3_TotSum |
| analyticsmart.dbo.Property_Metrics | EquityNow_Snapshot3 |
| analyticsmart.dbo.Property_Metrics | PropVal000 |

The snapshot metrics are directed to individual liens, the number of liens, and lien value on the property. The refined property metrics are used in factors, metrics, for net present value calculation, and the F(x) function.

Product metrics provide information about the loan product and terms.

Example Refined Product Metrics Include:

Inputs:

| Table | Field |
|---|---|
| analyticsmart.qbo.ArmTerm | BaseRate |
| analyticsmart.qbo.ArmTerm | HighestPossibleRate |
| analyticsmart.qbo.ArmTerm | LowestPossibleRate |
| analyticsmart.qbo.ArmTerm | Margin |
| analyticsmart.qbo.LOAN | InterestRateCurrent |
| analyticsmart.qbo.LOAN | LienPriorityType |
| analyticsmart.qbo.LOAN | LoanFundingDate |
| analyticsmart.qbo.LOAN | Loanid |

-continued

| Table | Field |
|---|---|
| analyticsmart.qbo.LOAN | LoanMaturityDate |
| analyticsmart.qbo.LOAN | LTVOriginal |
| analyticsmart.qbo.LOAN | OriginalBalance |
| analyticsmart.qbo.LOAN | OriginalBalance |
| analyticsmart.qbo.LOAN | PRODUCT |
| analyticsmart.qbo.Score | ScoreInt |
| analyticsmart.qbo.Valuation | ValueAsIs |

Outputs:

| Table | Field |
|---|---|
| analyticsmart.dbo.Product_Metrics_v2 | Loanid |
| analyticsmart.dbo.Product_Metrics_v2 | L_RATE_CONT |
| analyticsmart.dbo.Product_Metrics_v2 | MS_APP_VALUE_CONT_TRANS_002 |
| analyticsmart.dbo.Product_Metrics_v2 | MS_CLOSE_BAL_CONT_TRANS_002 |
| analyticsmart.dbo.Product_Metrics_v2 | MS_CLOSE_INT_CONT |
| analyticsmart.dbo.Product_Metrics_v2 | MS_FICO_CONT |
| analyticsmart.dbo.Product_Metrics_v2 | MS_FIRST_LTV_CONT |
| analyticsmart.dbo.Product_Metrics_v2 | MS_FIRST_PMT_CAT |
| analyticsmart.dbo.Product_Metrics_v2 | MS_FIRST_PMT_CAT_001 |
| analyticsmart.dbo.Product_Metrics_v2 | MS_FIRST_PMT_CAT_TRANS_002 |
| analyticsmart.dbo.Product_Metrics_v2 | MS_INT_RATE_CONT |
| analyticsmart.dbo.Product_Metrics_v2 | MS_L_RATE_FLO_CONT |
| analyticsmart.dbo.Product_Metrics_v2 | MS_LTV_CONT |
| analyticsmart.dbo.Product_Metrics_v2 | MS_MARGIN_CONT |
| analyticsmart.dbo.Product_Metrics_v2 | MS_MATURITY_CAT_TRANS_001 |
| analyticsmart.dbo.Product_Metrics_v2 | MS_MATURITY_CAT_TRANS_002 |
| analyticsmart.dbo.Product_Metrics_v2 | MS_ORIG_AMT_CONT |
| analyticsmart.dbo.Product_Metrics_v2 | MS_ORIG_AMT_CONT_TRANS_002 |
| anaiyticsmart.dbo.Product_Metrics_v2 | MS_ORIG_DATE_CONT_TRANS_001 |
| analyticsmart.dbo.Product_Metrics_v2 | MS_ORIG_DATE_CONT_TRANS_002 |
| analyticsmart.dbo.Product_Metrics_v2 | MS_UNDER_RAT1_CONT |
| analyticsmart.dbo.Product_Metrics_v2 | PRODUCT |

The refined product metrics are used in factors, and for net present value calculation, and the F(x) function.

Credit metrics provide information about the borrower. Example refined credit information includes credit grouping and metrics.

An application is run that reads the borrower's credit report and groups the information into five different debt classes: mortgage, installments, revolving, finance company, and all, but other groupings are possible. The debt class numbers are as follows: C01=All, C02=All installments, C03=All mortgage, C04=All revolving, and C07=Finance company (small loans).

Example Metrics Include:
Inputs:

| Table | Field |
|---|---|
| analyticsmart.qbo.creditliability | CreditReportID |
| analyticsmart.qbo.creditliabiiity | CreditLiability |
| analyticsmart.qbo.creditliability | AccountBalanceDate |
| analyticsmart.qbo.creditliability | AccountIdentifier |
| analyticsmart.qbo.creditliability | AccountOpenedDate |
| analyticsmart.qbo.creditliability | AccountOwnershipType |
| analyticsmart.qbo.creditliability | AccountStatusDate |
| analyticsmart.qbo.creditliability | AccountType |
| analyticsmart.qbo.creditliability | CreditBusinessType |
| analyticsmart.qbo.creditliability | CreditLoanType |
| analyticsmart.qbo.creditliability | CurrentRatingCode |
| analyticsmart.qbo.creditliability | CurrentRatingCode |
| analyticsmart.qbo.creditliability | HighBalanceAmount |
| analyticsmart.qbo.creditliability | MonthlyPaymentAmount |
| analyticsmart.qbo.creditliability | PastDueAmount |
| analyticsmart.qbo.creditliability | PaymentPatternData |
| analyticsmart.qbo.creditliability | TermsMonthsCount |
| analyticsmart.qbo.creditliability | UnpaidBalanceAmount |
| analyticsmart.qbo.Message | BodyText |
| analyticsmart.qbo.Message | Message |

The output is of approximately 800 metrics or metrics created for each debt class. A representative example is provided below.

| Table | Field |
|---|---|
| analyticsmart.dbo.c01 | v001 |
| analyticsmart.dbo.c01 | v002 |
| analyticsmart.dbo.c01 | v003 |
| ... | ... |
| analyticsmart.dbo.c01 | v746 |
| analyticsmart.dbo.c02 | v001 |
| ... | ... |
| analyticsmart.dbo.c02 | v746 |

The credit information is used in borrower factors, such as using 218 of these metrics for each of 20 borrower factors. The credit information may be used to determine further metrics, such as using about 20 credit metrics for metric calculation.

For predictive modeling, factors are created. Factors are vectors that describe the movement of an object. The factors capture the direction of the object along with its magnitude. Factors capture specific patterns of borrower and property behavior.

Product factors describe the movement of the loan through a multi-dimensional space. Example product factors include:
Inputs:

| Table | Field |
|---|---|
| analyticsmart.dbo.Product_Metrics_v2 | Loanid |
| analyticsmart.dbo.Product_Metrics_v2 | L_RATE_CONT |
| analyticsmart.dbo.Product_Metrics_v2 | MS_APP_VALUE_CONT_TRANS_002 |
| analyticsmart.dbo.Product_Metrics_v2 | MS_CLOSE_BAL_CONT_TRANS_002 |
| analyticsmart.dbo.Product_Metrics_v2 | MS_CLOSE_INT_CONT |
| analyticsmart.dbo.Product_Metrics_v2 | MS_FICO_CONT |
| analyticsmart.dbo.Product_Metrics_v2 | MS_FIRST_LTV_CONT |
| analyticsmart.dbo.Product_Metrics_v2 | MS_FIRST_PMT_CAT |
| analyticsmart.dbo.Product_Metrics_v2 | MS_FIRST_PMT_CAT_001 |
| analyticsmart.dbo.Product_Metrics_v2 | MS_FIRST_PMT_CAT_TRANS_002 |
| analyticsmart.dbo.Product_Metrics_v2 | MS_INT_RATE_CONT |
| analyticsmart.dbo.Product_Metrics_v2 | MS_L_RATE_FLO_CONT |
| analyticsmart.dbo.Product_Metrics_v2 | MS_LTV_CONT |
| analyticsmart.dbo.Product_Metrics_v2 | MS_MARGIN_CONT |
| analyticsmart.dbo.Product_Metrics_v2 | MS_MATURITY_CAT_TRANS_001 |
| analyticsmart.dbo.Product_Metrics_v2 | MS_MATURITY_CAT_TRANS_002 |

-continued

| Table | Field |
|---|---|
| analyticsmart.dbo.Product_Metrics_v2 | MS_ORIG_AMT_CONT |
| analyticsmart.dbo.Product_Metrics_v2 | MS_ORIG_AMT_CONT_TRANS_002 |
| analyticsmart.dbo.Product_Metrics_v2 | MS_ORIG_DATE_CONT_TRANS_001 |
| analyticsmart.dbo.Product_Metrics_v2 | MS_ORIG_DATE_CONT_TRANS_002 |
| analyticsmart.dbo.Product_Metrics_v2 | MS_UNDER_RAT1_CONT |
| analyticsmart.dbo.Product_Metrics_v2 | PRODUCT |

Output:

| Table | Field |
|---|---|
| analyticsmart.dbo.Factor_ProductMaster | Loaned |
| analyticsmart.dbo.Factor_ProductMaster | ARM Product Factor 1 |
| analyticsmart.dbo.Factor_ProductMaster | ARM Product Factor 2 |
| analyticsmart.dbo.Factor_ProductMaster | ARM Product Factor 3 |
| analyticsmart.dbo.Factor_ProductMaster | ARM Product Factor 4 |
| analyticsmart.dbo.Factor_ProductMaster | Balloon Product Factor 1 |
| analyticsmart.dbo.Factor_ProductMaster | Balloon Product Factor 2 |
| analyticsmart.dbo.Factor_ProductMaster | Balloon Product Factor 3 |
| analyticsmart.dbo.Factor_ProductMaster | Balloon Product Factor 4 |
| analyticsmart.dbo.Factor_ProductMaster | Balloon Product Factor 5 |
| analyticsmart.dbo.Factor_ProductMaster | Balloon Product Factor 6 |
| analyticsmart.dbo.Factor_ProductMaster | Fixed Product Factor 1 |
| analyticsmart.dbo.Factor_ProductMaster | Fixed Product Factor 2 |
| analyticsmart.dbo.Factor_ProductMaster | Fixed Product Factor 3 |
| analyticsmart.dbo.Factor_ProductMaster | Fixed Product Factor 4 |
| analyticsmart.dbo.Factor_ProductMaster | Fixed Product Factor 5 |
| analyticsmart.dbo.Factor_ProductMaster | IO Product Factor 1 |
| analyticsmart.dbo.Factor_ProductMaster | IO Product Factor 2 |
| analyticsmart.dbo.Factor_ProductMaster | IO Product Factor 3 |
| analyticsmart.dbo.Factor_ProductMaster | IO Product Factor 4 |
| analyticsmart.dbo.Factor_ProductMaster | IO Product Factor 5 |

The product factor is used for determining scores, such as through modeling survivability. The metrics may be changed or set to customer specific values.

Credit factors describe the movement of each type of credit debt. Approximately 218 metrics are used to create each factor. A representative sample of the credit factor is provided below.

| Table | Field |
|---|---|
| analyticsmart.dbo.c01 | balance_owed |
| analyticsmart.dbo.c01 | c01.v001 |
| analyticsmart.dbo.c01 | c01.v003 |
| analyticsmart.dbo.c01 | c01.v004 |
| analyticsmart.dbo.c01 | c01.v007 |
| ... | ... |
| analyticsmart.dbo.c01 | c01.v734 |
| analyticsmart.dbo.c02 | v001 |
| ... | ... |
| analyticsmart.dbo.c02 | v746 |

In one embodiment, approximately 38 factors are created for each debt credit class. A representative example is provided below:

| Table | Field |
|---|---|
| analyticsmart.dbo.Factor_Credit_C01 | creditreportid |
| analyticsmart.dbo.Factor_Credit_C01 | C01 Factor1 |
| analyticsmart.dbo.Factor_Credit_C01 | C01 Factor2 |
| analyticsmart.dbo.Factor_Credit_C01 | C01 Factor3 |
| ... | ... |
| analyticsmart.dbo.Factor_Credit_C01 | C01 Factor37 |
| analyticsmart.dbo.Factor_Credit_C02 | C02 Factor1 |
| ... | ... |
| analyticsmart.dbo.Factor_Credit_C02 | C02 Factor37 |

The credit factors are used for determining scores, such as through modeling survivability and/or clustering.

Logic, Bayesian mathematics, and other calculations are used to create metrics that capture the internal states of the borrower or the property that drives or determines future behavior and outcomes. The machine learned matrices receive inputs and provide outputs. Example inputs and outputs include:

Inputs: Various Property and Credit Metrics

| Table | Field |
|---|---|
| analyticsmart.qbo.creditliability | CreditReportID |
| analyticsmart.qbo.creditliability | CreditLiability |
| analyticsmart.qbo.creditliability | AccountBalanceDate |
| analyticsmart.qbo.creditliability | AccountIdentifier |
| analyticsmart.qbo.creditliability | AccountOpenedDate |
| analyticsmart.qbo.creditliability | AccountOwnershipType |
| analyticsmart.qbo.creditliability | AccountStatusDate |
| analyticsmart.qbo.creditliability | AccountType |
| analyticsmart.qbo.creditliability | CreditBusinessType |
| analyticsmart.qbo.creditliability | CreditLoanType |
| analyticsmart.qbo.creditliability | CurrentRatingCode |
| analyticsmart.qbo.creditliability | CurrentRatingCode |
| analyticsmart.qbo.creditliability | HighBalanceAmount |
| analyticsmart.qbo.creditliability | MonthlyPaymentAmount |
| analyticsmart.qbo.creditliability | PastDueAmount |
| analyticsmart.qbo.creditliability | PaymentPatternData |
| analyticsmart.qbo.creditliability | TermsMonthsCount |
| analyticsmart.qbo.creditliability | UnpaidBalanceAmount |
| analyticsmart.qbo.Message | BodyText |
| analyticsmart.qbo.Message | message |
| analyticsmart.dbo.c01 | c01.v002 |
| analyticsmart.dbo.c01 | c01.v004 |
| analyticsmart.dbo.c01 | c01.v007 |
| analyticsmart.dbo.c01 | c01.v008 |
| analyticsmart.dbo.c01 | c01.v009 |
| analyticsmart.dbo.c01 | c01.v010 |
| analyticsmart.dbo.c01 | c01.v015 |
| analyticsmart.dbo.c01 | c01.v016 |
| analyticsmart.dbo.c01 | c01.v017 |
| analyticsmart.dbo.c01 | c01.v257 |
| analyticsmart.dbo.c01 | c01.v268 |
| analyticsmart.dbo.c01 | c01.v402 |
| analyticsmart.dbo.c01 | c01.v502 |
| analyticsmart.dbo.c01 | c01.v504 |
| analyticsmart.dbo.c01 | c01.v602 |
| analyticsmart.dbo.c01 | c01.v604 |
| analyticsmart.dbo.c03 | c03.v134 |
| analyticsmart.dbo.c03 | c03.v264 |
| analyticsmart.dbo.c03 | c03.v503 |
| analyticsmart.dbo.c04 | c04.v008 |
| analyticsmart.dbo.c04 | c04.v011 |
| analyticsmart.dbo.c04 | c04.v015 |
| analyticsmart.dbo.c04 | c04.v401 |
| analyticsmart.dbo.c04 | c04.v402 |
| analyticsmart.dbo.c04 | c04.v501 |
| analyticsmart.dbo.c04 | c04.v502 |
| analyticsmart.dbo.c07 | c07.v015 |
| analyticsmart.dbo.c07 | c07.v278 |
| analyticsmart.dbo.c07 | c07.v503 |
| analyticsmart.dbo.c07 | c07.v603 |
| Property_Metrics | OpenMortLien012_SnapShot3_TotSum |

-continued

| Table | Field |
|---|---|
| Property_Metrics | EquityNow_Snapshot3 |
| Property_Metrics | PropVal000 |
| Property_Metrics | Age |
| Property_Metrics | CLTV |

Outputs: Creates 150 Metrics (35 are Used for Clusters)

| Table |
|---|
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |
| analytismart.dbo.depmeas_0 |

-continued

| Table |
|---|
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_1 |
| analytismart.dbo.depmeas_2 |
| analytismart.dbo.depmeas_2 |
| analytismart.dbo.depmeas_2 |
| analytismart.dbo.depmeas_2 |
| analytismart.dbo.depmeas_2 |

| Table |
|---|
| analytismart.dbo.depmeas_2 |
| analytismart.dbo.depmeas_2 |
| analytismart.dbo.depmeas_2 |
| analytismart.dbo.depmeas_2 |
| analytismart.dbo.depmeas_2 |
| analytismart.dbo.depmeas_2 |
| analytismart.dbo.depmeas_2 |
| analytismart.dbo.depmeas_2 |
| analytismart.dbo.depmeas_2 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |
| analytismart.dbo.depmeas_3 |

The outputs are used for clustering, scores, the function F(x), and/or client output.

The various borrower and property factors are used to determine if the borrower and/or their property is an asset. This asset value may not predict a target event but rather may be a factor that describes the behavior of the borrower and the behavior of the property.

The asset flags indicate whether the borrower and/or property qualify as an asset for loan modification, sale, or other loan treatment. For example, two asset flags are used. The borrower as an asset flag is used to determine whether to do a loan modification or not. The property as an asset is used to determine the valuation of the property and whether a sale should be third-party or short sale. The asset flags are used by the function F(x).

Borrowers and their properties are classified into groups called clusters based upon the borrower's behavior and the behavior of his/her property. Within each cluster, the borrower/property combination is relatively homogeneous (statistically similar). Each cluster has a profile of how each treatment responds to the corresponding borrower/property combination, including economic effects of various treatments.

Example inputs for clustering and outputs are provided below. Example clusters are also shown below. A low resolution (e.g., five different levels) risk value is assigned to each group.

Inputs: Thirty-Five Metrics are Used to Determine Cluster Assignment

| Table | Field |
|---|---|
| Metric name | Metric, as described in patent application |
| Capacity | Borrower history of debt service ($) |
| Distress | Borrower history of derogatory debt servicing; all credit relationships |
| Mtg Distress | Borrower history of derogatory debt servicing; mortgage credit relationships |

-continued

| Table | Field |
|---|---|
| Revolving Distress | Borrower history of derogatory debt servicing; revolving credit relationships |
| Finance Company Distress | Borrower history of derogatory debt servicing; finco credit relationships |
| Borrower Encumbrance | Borrower indebtedness |
| Willingness | Borrower history of curing problem accounts |
| Mtg Default | Borrower mortgage default history |
| Mtg Prepay | Borrower mortgage prepayment history |
| % Mtg Paid | Borrower history of successful mortgage debt service, as percent of balances serviced |
| % Mtg Prepaid | Borrower history of prepaid mortgage balances as percent of balances available |
| PropValue | Property value, as distressed asset |
| Extended Good Debt Service | Estimate of the length of time the borrower has been successfully servicing his/her credit relationships |
| Normalized Extended Good Debt Service | Estimate of the length of time the borrower has been successfully servicing his/her credit relationships normalized for credit product consumption |
| Recency of Insufficient Debt Service | Estimate of how recent borrower has been failing to service his/her accounts successfully |
| Normalized Recency of Bad Accounts | Recency of accounts that are not being successfully serviced by the borrower, normalized by accounts being successfully serviced. |
| Normalized Recency of Good Accounts | Recency of accounts that are being successfully serviced by the borrower, normalized by the credit product consumption. |
| Bad Balances | Dollar balances of derogatory accounts |
| Good Balances | Dollar balances of not-derogatory accounts |
| Credit Rating | Rating indicating if borrower has been servicing debt successfully in the recent past. |
| Affordability | Rating of how readily borrower can afford his/her current property |
| Cash to Cope | Rating of how readily borrower can survive current levels of debt servicing distress |
| EquityNow | Property equity |
| Expense ratio | Consumer indebtedness normalized for the size and value of the home |
| CLTV | Combined Loan to Value ratio |
| Revolving Success | Likelihood that borrower is successfully maintaining well established revolving accounts |
| Revolving Abuse | Likelihood that borrower is abusing revolving credit |
| Credit Product Consumption | Estimate of the borrower's rate of establishing and using credit relationships |
| Normalized Bad Balances | Derogatory balances normalized for credit consumption |
| Normalized Good Balances | Non derogatory balances normalized for credit consumption |
| Credit Usage | Borrower's willingness to borrower against existing lines of credit |
| Debt Service Rating | Rating indication that borrower has remained current in his/her debt servicing |
| Volatility | Rating of how consistently borrower has serviced any kind of debt over an extended period |
| Debt Service Rating, normalized for Volatility | Debt servicing rating, given volatility |
| Bankruptcy | History of bankruptcy |

Outputs: The Borrower and his/her Property is Assigned to a Cluster

| Table | Field |
|---|---|
| analyticsmart.dbo.cluster_assignments | creditreportid |
| analyticsmart.dbo.cluster_assignments | ClusNum |

The possible clusters that can be assigned are:

| Cluster | Risk | Description |
|---|---|---|
| 0 | Undefined | Cluster not assigned due to missing information |
| 1 | Medium | Repentant Bankruptcy Borrower |
| 2 | Low-Medium | Cash Rich, Serial Refinancer with Underwater Property |
| 3 | Low-Medium | Inexperienced Borrower with Recent Debt Servicing Problems |
| 4 | Low-Medium | Cash Rich, Refinance Adverse Borrower with Underwater Property |
| 5 | High | Overextended Borrower with High Likelihood of Default |
| 6 | Medium | Volatile Borrower Putting Mortgage First |
| 7 | Medium | Extremely Conservative Borrower with Excellent Debt Servicing Skills |
| 8 | High | Low Capacity, High Distress Borrower |
| 9 | Medium-High | Highly Leveraged Borrower Showing Signs of Strain |
| 10 | Medium-High | Revolving Abuser with a Cheap House |
| 11 | Medium | Marginally Performing Borrower with Distressed Property |
| 12 | Low-Medium | Performing Borrower with Very Distressed Property |
| 13 | High | Highly Inconsistent, Least Experienced Borrower |
| 14 | Medium-High | Cash Poor, Performing Borrower |
| 15 | Medium | Competent Borrower with Average Property |
| 16 | Low | Extremely Consistent Borrower with Performing Property |
| 17 | Medium | Long Term Home Owner with Strong Equity Position |
| 18 | High | Deteriorating Borrower Stranded in Bad Property |
| 19 | High | Mortgage Default in Process |
| 20 | Low | Land Baron |
| 21 | Low | Refinance Prone Borrower with Performing Property |
| 22 | Medium-High | Keeping Mortgage Intact by Abusing Personal Debt |

The cluster is used for calculating the net present value, scores and/or client output.

Scores predict the likelihood of a target event. These probability calculations assume the event will occur and are based on machine learned matrix.

The borrower default score predicts first lien default behavior of a one year outcome period. The score is used to predict the survival rate for each type of treatment (loan modification, short sale, third party sale, or foreclosure) paired with each borrower/property cluster group.

Example inputs and outputs are provided below. The inputs include the cluster assignment, metrics (2), and factors (20) used to calculate the borrower default score.

| Table | Field |
|---|---|
| analyticsmart.dbo.cluster_assignments | Loaned clusnum |
| analyticsmart.dbo.depmeas_0 | [dm30_first_mtg_defaulted] |
| analyticsmart.dbo.depmeas_0 | [dm31_first_mtg_prepaid] |
| analyticsmart.dbo.Factor_Credit_C01 | [C01 Factor5] |
| analyticsmart.dbo.Factor_Credit_C01 | [C01 Factor6] |
| analyticsmart.dbo.Factor_Credit_C01 | [C01 Factor7] |
| analyticsmart.dbo.Factor_Credit_C01 | [C01 Factor8] |
| analyticsmart.dbo.Factor_Credit_C01 | [C01 Factor13] |
| analyticsmart.dbo.Factor_Credit_C01 | [C01 Factor21] |
| analyticsmart.dbo.Factor_Credit_C02 | [C02 Factor4] |
| analyticsmart.dbo.Factor_Credit_C02 | [C02 Factor5] |
| analyticsmart.dbo.Factor_Credit_C02 | [C02 Factor7] |
| analyticsmart.dbo.Factor_Credit_C02 | [C02 Factor8] |
| analyticsmart.dbo.Factor_Credit_C02 | [C02 Factor28] |

-continued

| Table | Field |
|---|---|
| analyticsmart.dbo.Factor_Credit_C03 | [C03 Factor7] |
| analyticsmart.dbo.Factor_Credit_C03 | [C03 Factor11] |
| analyticsmart.dbo.Factor_Credit_C03 | [C03 Factor13] |
| analyticsmart.dbo.Factor_Credit_C03 | [C03 Factor22] |
| analyticsmart.dbo.Factor_Credit_C03 | [C03 Factor24] |
| analyticsmart.dbo.Factor_Credit_C03 | [C03 Factor31] |
| analyticsmart.dbo.Factor_Credit_C04 | [C04 Factor2] |
| analyticsmart.dbo.Factor_Credit_C04 | [C04 Factor5] |
| analyticsmart.dbo.Factor_Credit_C04 | [C04 Factor6] |
| analyticsmart.dbo.Factor_Credit_C07 | [C07 Factor3] |
| analyticsmart.dbo.Factor_Credit_C07 | [C07 Factor5] |
| analyticsmart.dbo.Factor_Credit_C07 | [C07 Factor10] |
| analyticsmart.dbo.Factor_Credit_C07 | [C07 Factor15] |
| analyticsmart.dbo.Factor_Credit_C07 | [C07 Factor17] |
| analyticsmart.dbo.Factor_Credit_C07 | [C07 Factor22] |
| analyticsmart.dbo.Factor_ProductMaster | [ARM Product Factor 1] |
| analyticsmart.dbo.Factor_ProductMaster | [ARM Product Factor 3] |
| analyticsmart.dbo.Factor_ProductMaster | [ARM Product Factor 4] |
| analyticsmart.dbo.Factor_ProductMaster | [Balloon Product Factor 2] |
| analyticsmart.dbo.Factor_ProductMaster | [Fixed Product Factor 3] |
| analyticsmart.dbo.Factor_ProductMaster | [Fixed Product Factor 5] |

Outputs: P(Default)

| Table | Field |
|---|---|
| analyticsmart.dbo.default_score | prob |

The borrower default score is used by the function F(x) and/or the client output.

Another score using machine learned matrix is the borrower prepayment score. The borrower prepayment score predicts the likelihood that the borrower's mortgage (regardless of whether current or in default) will be paid off during the next 12 months.

Example inputs and outputs are provided below. The cluster assignment and factors (22) are used to calculate the borrower prepayment score.

| Table | Field |
|---|---|
| analyticsmart.dbo.cluster_assignments | loanid clusnum |
| analyticsmart.dbo.Factor_Credit_C01 | [C01 Factor8] |
| analyticsmart.dbo.Factor_Credit_C01 | [C01 Factor9] |
| analyticsmart.dbo.Factor_Credit_C01 | [C01 Factor15] |
| analyticsmart.dbo.Factor_Credit_C01 | [C01 Factor20] |
| analyticsmart.dbo.Factor_Credit_C01 | [C01 Factor21] |
| analyticsmart.dbo.Factor_Credit_C01 | [C01 Factor22] |
| analyticsmart.dbo.Factor_Credit_C01 | [C01 Factor30] |
| analyticsmart.dbo.Factor_Credit_C02 | [C02 Factor9] |
| analyticsmart.dbo.Factor_Credit_C02 | [C02 Factor19] |
| analyticsmart.dbo.Factor_Credit_C03 | [C03 Factor3] |
| analyticsmart.dbo.Factor_Credit_C03 | [C03 Factor4] |
| analyticsmart.dbo.Factor_Credit_C03 | [C03 Factor7] |
| analyticsmart.dbo.Factor_Credit_C03 | [C03 Factor8] |
| analyticsmart.dbo.Factor_Credit_C03 | [C03 Factor18] |
| analyticsmart.dbo.Factor_Credit_C04 | [C04 Factor2] |
| analyticsmart.dbo.Factor_Credit_C04 | [C04 Factor2] |
| analyticsmart.dbo.Factor_Credit_C04 | [C04 Factor4] |
| analyticsmart.dbo.Factor_Credit_C04 | [C04 Factor6] |
| analyticsmart.dbo.Factor_Credit_C04 | [C04 Factor26] |
| analyticsmart.dbo.Factor_Credit_C07 | [C07 Factor1] |
| analyticsmart.dbo.Factor_Credit_C07 | [C07 Factor2] |
| analyticsmart.dbo.Factor_Credit_C07 | [C07 Factor30] |

Output: P(Prepayment)

| Table | Field |
|---|---|
| analyticsmart.dbo.prepay_score | prob |

The borrower prepayment score is used for the client output.

Another score using machine learned matrix is the borrower refinance score. The borrower refinance score predicts the likelihood of a refinance over a one year period.

Example inputs and outputs are provided below. The cluster assignment and factors (24) are used to calculate the borrower refinance score.

Inputs:

| Table | Field |
|---|---|
| analyticsmart.dbo.cluster_assignments | loanid clusnum |
| analyticsmart.dbo.Factor_Credit_C01 | [C01 Factor8] |
| analyticsmart.dbo.Factor_Credit_C01 | [C01 Factor14] |
| analyticsmart.dbo.Factor_Credit_C01 | [C01 Factor18] |
| analyticsmart.dbo.Factor_Credit_C02 | [C02 Factor29] |
| analyticsmart.dbo.Factor_Credit_C03 | [C03 Factor2] |
| analyticsmart.dbo.Factor_Credit_C03 | [C03 Factor6] |
| analyticsmart.dbo.Factor_Credit_C03 | [C03 Factor7] |
| analyticsmart.dbo.Factor_Credit_C03 | [C03 Factor8] |
| analyticsmart.dbo.Factor_Credit_C03 | [C03 Factor9] |
| analyticsmart.dbo.Factor_Credit_C03 | [C03 Factor16] |
| analyticsmart.dbo.Factor_Credit_C03 | [C03 Factor18] |
| analyticsmart.dbo.Factor_Credit_C03 | [C03 Factor22] |
| analyticsmart.dbo.Factor_Credit_C03 | [C03 Factor23] |
| analyticsmart.dbo.Factor_Credit_C03 | [C03 Factor27] |
| analyticsmart.dbo.Factor_Credit_C03 | [C03 Factor28] |
| analyticsmart.dbo.Factor_Credit_C03 | [C03 Factor35] |
| analyticsmart.dbo.Factor_Credit_C04 | [C04 Factor2] |
| analyticsmart.dbo.Factor_Credit_C04 | [C04 Factor3] |
| analyticsmart.dbo.Factor_Credit_C04 | [C04 Factor20] |
| analyticsmart.dbo.Factor_Credit_C04 | [C04 Factor26] |
| analyticsmart.dbo.Factor_Credit_C07 | [C07 Factor8] |
| analyticsmart.dbo.Factor_ProductMaster | [ARM Product Factor 1] |
| analyticsmart.dbo.Factor_ProductMaster | [ARM Product Factor 2] |
| analyticsmart.dbo.Factor_ProductMaster | [ARM Product Factor 3] |

Output: P(Refinance)

| Table | Field |
|---|---|
| analyticsmart.dbo.refi_score | prob |

The borrower refinance score is used by the client output.

Survival curves and/or foreclosure timelines may be calculated. Survival curves predict the length of time a loan treatment will last. A loan treatment either resolves an "at risk" loan by paying it off in some manner or cures the problem thereby creating a performing loan that produces cash in accordance with agreed upon terms. Before determining the economic effects of a given loan treatment, the survival curve for each possible loan treatment is determined. The survival curve is a calculated formula that determines the survival of each loan treatment (loan modification, sale, and foreclosure) for a particular loan. The survival curves determine the expected life, lambda ($\lambda$). Treatment regressors are used to determine lambda. The treatment regressors are metrics, or other information pulled from the database.

Example inputs are shown below.
Inputs:

| Table | Field |
| --- | --- |
| AnalyticsMart.dbo.treatment_regressors | Loaned |
| AnalyticsMart.dbo.treatment_regressors | classification |
| AnalyticsMart.dbo.treatment_regressors | Original_CLTV |
| AnalyticsMart.dbo.treatment_regressors | PctChange_HPI_3Mo_Reg |
| AnalyticsMart.dbo.treatment_regressors | PctChange_Rate10YrTbill_3Mo_Reg |
| AnalyticsMart.dbo.treatment_regressors | FC_StateDummy4 |
| AnalyticsMart.dbo.treatment_regressors | FC_StateDummy3 |
| AnalyticsMart.dbo.treatment_regressors | FC_StateDummy2 |
| AnalyticsMart.dbo.treatment_regressors | OML_100000a |
| AnalyticsMart.dbo.treatment_regressors | NONARM_Dummy |
| AnalyticsMart.dbo.treatment_regressors | FULLDOC_Dummy |
| AnalyticsMart.dbo.treatment_regressors | SECONDLIEN_Dummy |
| AnalyticsMart.dbo.treatment_regressors | REFINANCE_Dummy |
| AnalyticsMart.dbo.treatment_regressors | CQIntRate_at1stMod_Group |
| AnalyticsMart.dbo.treatment_regressors | FICO_Group_Val |
| AnalyticsMart.dbo.treatment_regressors | CQBal_at1stModDate_Group |
| AnalyticsMart.dbo.treatment_regressors | LM_StateDummy2 |
| AnalyticsMart.dbo.treatment_regressors | LM_StateDummy3 |
| AnalyticsMart.dbo.treatment_regressors | OML_100000b |
| AnalyticsMart.dbo.treatment_regressors | SS_StateDummy2 |
| AnalyticsMart.dbo.treatment_regressors | SS_StateDummy3 |

Three lambda (λ) values may be output for each loan representing the survival curve for each possible loan treatment. The lambda values are for loan modification, sale, and foreclosure. Additionally, the probability of each loan treatment is determined as 1/λ and stored. The lambda values are used for the net present value calculation.

For forecasting, the net present value (NPV) engine determines the amount of money the client can expect to get out of the loan during its life cycle. Survival time, market value, and current loan information are used as inputs. for example, the input information includes: the House Pricing Index (HPI), the interest rate on the loan (used to calculate reduced payment for loan mod), the future cash flow received if a loan modification is given, the future cash flow received if the property is sold, the costs associated with foreclosing on the property, transaction costs, the survival curves (λ), and the valuation (e.g., DAVI score).

The loan product interest rate is used to calculate how much to knock the payment down for loan modification. The payment is capped so that the interest rate is positive, such as capping at 90% of a current payment or $300.00.

Risk scenarios may be determined. The macro receives various inputs, examples of which are shown below. The SQL engine may be used to determine risk based on the HPI.
Inputs: Various Metrics, and Probabilities

| Table | Field |
| --- | --- |
| AnalyticsMart.dbo.treatment_regressors | time_on_market |
| AnalyticsMart.dbo.treatment_regressors | foreclosure_time |
| AnalyticsMart.dbo.treatment_regressors | current_property_value |
| AnalyticsMart.dbo.treatment_regressors | orig_amt |
| AnalyticsMart.dbo.treatment_regressors | orig_date |
| AnalyticsMart.dbo.treatment_regressors | orig_rate |
| AnalyticsMart.dbo.treatment_regressors | Upb |
| AnalyticsMart.dbo.treatment_regressors | monthlyPI |
| AnalyticsMart.dbo.treatment_regressors | State |
| AnalyticsMart.dbo.treatment_regressors | Postalcode |
| AnalyticsMart.dbo.treatment_regressors | Batched |
| AnalyticsMart.dbo.treatment_regressors | orig_term |
| AnalyticsMart.dbo.treatment_regressors | NumberOfPmtsRemaining |
| AnalyticsMart.dbo.treatment_regressors | mtgins |
| AnalyticsMart.dbo.treatment_regressors | prior_mod_indicator |
| AnalyticsMart.dbo.treatment_regressors | length_of_stay_years |
| AnalyticsMart.dbo.treatment_regressors | orphan_2nd_lien_indicator |
| AnalyticsMart.dbo.treatment_regressors | distress_metric |
| AnalyticsMart.dbo.treatment_regressors | current_cltv_metric |
| AnalyticsMart.dbo.treatment_regressors | willingness_metric |
| AnalyticsMart.dbo.treatment_regressors | pos_upb_treatable |
| AnalyticsMart.dbo.treatment_regressors | default_prob |
| AnalyticsMart.dbo.treatment_regressors | adjusted_default_prob |
| AnalyticsMart.dbo.treatment_regressors | at_risk_flag |
| AnalyticsMart.dbo.treatment_regressors | performing |
| AnalyticsMart.dbo.treatment_regressors | borrower_score |
| AnalyticsMart.dbo.treatment_regressors | borrower_as_asset_flag |
| AnalyticsMart.dbo.treatment_regressors | property_score |
| AnalyticsMart.dbo.treatment_regressors | property_as_asset_flag |

One or more outputs are provided for each loan. Example outputs include NPV Loan Modification amount, NPV Sale amount, and NPV Foreclosure amount. These NPV values may be refined.

The function F(x) determines if the raw NPV for a sale is for a 3rd party or short sale. F(x) predicts the likelihood of a target event, so may use a machine trained matrix. Unlike scores, f(x) probability calculations consider the possibility that the event may not occur. The probabilities are applied to the raw NPV engine results in order to create a refined net present value. The user may be allowed to tune the outcome of the probabilities, such as by skewing the results in favor of loan modification through weighting or probability adjustment.

Example inputs and outputs are shown below.

Inputs: Treatment Regressors (Data Pulled from Various Sources in the Database); Stored in Treatment Regressors Table

| Table | Field |
| --- | --- |
| AnalyticsMart.dbo.treatment_regressors | loanid |
| AnalyticsMart.dbo.treatment_regressors | length_of_stay_years |
| AnalyticsMart.dbo.treatment_regressors | distress_metric |
| AnalyticsMart.dbo.treatment_regressors | willingness_metric |
| AnalyticsMart.dbo.treatment_regressors | current_cltv_metric |
| AnalyticsMart.dbo.treatment_regressors | borrower_as_asset_flag |
| AnalyticsMart.dbo.treatment_regressors | prior_mod_indicator |
| AnalyticsMart.dbo.treatment_regressors | orphan_2nd_lien_indicator |
| analyticsmart.dbo.Effect_Dials | lm_dial |
| analyticsmart.dbo.Effect_Dials | s_dial |
| analyticsmart.dbo.Effect_Dials | fc_dial |

Outputs Per Loan: f(x) LM, f(x) SS, f(x) S3, f(x) FC

| Table | Field |
|---|---|
| analyticsmart.dbo.Effects_Refined_Odds_Product | Loaned |
| analyticsmart.dbo.Effects_Refined_Odds_Product | lm_refined_odds_product |
| analyticsmart.dbo.Effects_Refined_Odds_Product | ss_refined_odds_product |
| analyticsmart.dbo.Effects_Refined_Odds_Product | s3_refined_odds_product |
| analyticsmart.dbo.Effects_Refined_Odds_Product | fc_refined_odds_product |

Refined probabilities are provided. A product of all the effects (result of effect calculations) are multiplied together to get the refined probability. The refined NPV engine applies the probabilities from F(x) to the raw NPV engine results to create a refined net present value for each loan treatment. The loan treatment recommendations are ranked in priority order from highest to lowest value. For example, refined NPV loan modification amount, refined NPV short sale amount, refined NPV third-party sale amount, and refined NPV foreclosure amount are calculated. An example output table is provided below.

| Field |
|---|
| First_Recommended_Treatment |
| First_Recommendation_Description |
| First_Recommendation_Gross_Recovery |
| First_Recommendation_NPV |
| Second_Recommended_Treatment |
| Second_Recommendation_Description |
| Second_Recommendation_Gross_Recovery |
| Second_Recommendation_NPV |
| Third_Recommended_Treatment |
| Third_Recommendation_Description |
| Third_Recommendation_Gross_Recovery |
| Third_Recommendation_NPV |

Recommended treatments are presented to the client. Treatment options include loan modification, short sale, third party sale, and foreclosure. A net present value calculation determines the treatment with the highest net present value as the first choice. An appropriate treatment either resolves the at-risk loan (pays off the loan in some manner) or cures the problem. Additionally or alternatively, clusters, scores, and several key metrics are provided to the client. An example output is provided below.

| Field | Column Name | Description |
|---|---|---|
| 1 | LoanNumber | The loan number |
| 2 | LienPosition | The lien position of the loan |
| 3 | LoanStatus | The current payment status of the loan |
| 4 | UPBAmount | The unpaid principal balance of the loan |
| 5 | Borrower_As_Asset_Flag | The borrower as an asset flag |
| 6 | Property_As_Asset_Flag | The property as an asset flag |
| 7 | Score_1st_Lien_Default | The first lien default score |
| 8 | Score_1st_Lien_Prepayment | The first lien prepayment score |
| 9 | Capacity_Quartile | The quartile of the capacity score |
| 10 | Distress_Quartile | The quartile of the distress score |

-continued

| Field | Column Name | Description |
|---|---|---|
| 11 | Willingness_Quartile | The quartile of the willingness score |
| 12 | Likelihood_of_Seeking_Refinance | The first lien refinance score |
| 13 | Class_Number | The Class/Cluster number that the loan belongs |
| 14 | Class_Name | The Class/Cluster name |
| 15 | Cluster Risk | The risk of the Class/Cluster |
| 16 | First_Recommended_Treatment | The first recommended treatment of the loan as ranked by NPV |
| 17 | First_Recommendation_Description | A brief description of the first recommended treatment |
| 18 | First_Recommendation_Gross_Recovery | The gross recovery amount from the first recommended treatment |
| 19 | First_Recommendation_NPV | The net present value of the first recommended treatment |
| 20 | Second_Recommended_Treatment | The second recommended treatment of the loan as ranked by NPV |
| 21 | Second_Recommendation_Description | A brief description of the second recommended treatment |
| 22 | Second_Recommendation_Gross_Recovery | The gross recovery amount from the second recommended treatment |
| 23 | Second_Recommendation_NPV | The net present value of the second recommended treatment |
| 24 | Third_Recommended_Treatment | The third recommended treatment of the loan as ranked by NPV |
| 25 | Third_Recommendation_Description | A brief description of the third recommended treatment |
| 26 | Third_Recommendation_Gross_Recovery | The gross recovery amount from the third recommended treatment |
| 27 | Third_Recommendation_NPV | The net present value of the third recommended treatment |
| 28 | Sr UPB | N/A for first liens (leave blank) |
| 29 | Sr Type | N/A for first liens (leave blank) |
| 30 | NPV CLTV | Net present value combined loan to value |

The net present value may be used for portfolio analysis. The appropriate loan treatments for a plurality of loans are determined for each loan treatment. The cost associated with the selected loan treatments is calculated across the portfolio. If the loan treatments with the highest net present value are selected, the cost represents a loss or gain according to those treatments.

The selection of loan treatments may be altered based on portfolio considerations. For example, a % of a particular loan treatment is desired. The loans with the greatest difference between the particular loan treatment and the next highest value loan treatment are selected first to fill the % allowance. The next most optimum or highest net present value loan treatment is selected for the others. The cost for the portfolio may be determined. The % allocation for one or more loan treatments may be adjusted, and the corresponding cost or difference in cost determined.

Various improvements described herein may be used together or separately. Example metrics, factors, tables, algorithms, outputs, calculations, and other information are given above. Other examples are possible. Although illustrative embodiments have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A system for data analytics in loan treatment, the system comprising:
    an input configured to receive credit report information for a person associated with a loan, property information for a specific property associated with the loan, loan information for the loan, and real estate market information for a region including the property; and
    a processor configured to apply:
        a cluster model comprising an unsupervised machine-learned classifier configured to classifying a borrower of the loan and the specific property into one of a plurality of borrower-property clusters, each of the borrower-property clusters being a function of both the credit report information and the property information;
        a treatment model comprising a supervised machine-learned classifier configured to output a loan treatment recommendation for the borrower of the loan, the processor configured to apply the treatment model as a function of the one of the borrower-property clusters, the property information, the loan information, and the real estate market information, the loan treatment recommendation selected from a plurality of possible treatments as one of the possible treatments with a greater value over a period of time, the possible treatments including loan modification and short sale.

2. The system of claim 1 further comprising a display configured to output the loan treatment recommendation.

3. In a computer readable storage medium having stored therein data representing instructions executable by a programmed processor for data analytics in loan processing, the instructions comprising:
    modeling borrower loan behavior from credit values for a borrower;
    modeling property behavior from property characteristics for a property associated with the borrower;
    classifying the borrower into one of a plurality of clusters based on the modeled borrower loan behavior and the modeled property behavior; and
    outputting information based on the one cluster to which the borrower is classified.

4. The computer readable storage medium of claim 3 wherein modeling borrower loan behavior comprises calculating a distress factor, a capacity factor, and a willingness to pay factor from the credit values, the distress, capacity, and willingness factors each comprising one or more metrics, the metrics input as a feature vector for the classifying.

5. The computer readable storage medium of claim 4 wherein the distress factor comprises an indication of debt servicing distress of the borrower and is calculated as a function of trade lines for revolving credit, auto credit, finance company credit, or combinations thereof.

6. The computer readable storage medium of claim 3 wherein modeling the property behavior comprises calculating a property value factor, a combined loan to Value factor, and an appreciation factor from the property characteristics and real estate market information, the property value, combined loan to value, and appreciation factors each comprising one or more metrics, the metrics input as a feature vector for the classifying.

7. The computer readable storage medium of claim 3 further comprising:
    determining a percent chance of default as a function of the one cluster.

8. The computer readable storage medium of claim 3 further comprising:
    outputting a loan treatment recommendation as a function of the classification of the borrower into the one cluster, the loan treatment recommendation comprising one of loan modification, short sale, and foreclosure, the loan modification output where the borrower loan behavior is modeled as able and willing to execute, the short sale output where the property behavior is modeled as able to support short sale, and otherwise outputting foreclosure.

9. A method for data analytics in loan processing, the method comprising:
    receiving, with a computer, a portfolio of loans;
    extracting, with the computer, borrower and property information for the loans of the portfolio;
    applying, with the computer, a machined-trained model estimating survivability, for each of the loans of the portfolio, of a plurality of loan treatments;
    selecting, with the computer, loan treatments for the loans as a function of the survivability;
    calculating, with the computer, a cost for the portfolio as a function of the selected loan treatments; and
    outputting the cost and the selected loan treatments.

10. The method of claim 9 wherein calculating the cost comprises calculating a net present value for the selected loan treatments.

11. The method of claim 9 wherein selecting comprises selecting as a function of a number or percentage of one of the loan treatments available for the portfolio.

* * * * *